United States Patent
Kishigami et al.

(10) Patent No.: US 9,128,182 B2
(45) Date of Patent: Sep. 8, 2015

(54) RADAR DEVICE

(75) Inventors: Takaaki Kishigami, Tokyo (JP); Yoichi Nakagawa, Tokyo (JP); Hirohito Mukai, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 393 days.

(21) Appl. No.: 13/816,045

(22) PCT Filed: Apr. 5, 2012

(86) PCT No.: PCT/JP2012/002407
§ 371 (c)(1),
(2), (4) Date: Feb. 8, 2013

(87) PCT Pub. No.: WO2012/140859
PCT Pub. Date: Oct. 18, 2012

(65) Prior Publication Data
US 2013/0127655 A1    May 23, 2013

(30) Foreign Application Priority Data

Apr. 15, 2011   (JP) .................... 2011-091425

(51) Int. Cl.
*G01S 3/00* (2006.01)
*G01S 13/42* (2006.01)
(Continued)

(52) U.S. Cl.
CPC . *G01S 13/44* (2013.01); *G01S 3/00* (2013.01); *G01S 7/288* (2013.01); *G01S 13/284* (2013.01);
(Continued)

(58) Field of Classification Search
CPC ............. G01S 3/00; G01S 3/74; G01S 7/292; G01S 5/02; G01S 5/0273; G01S 13/06; G01S 13/02; G01S 13/42; G01S 13/34; G01S 13/36; G01S 13/878
USPC ......... 342/107, 118, 127, 133, 139, 146, 147, 342/155–158, 175
See application file for complete search history.

(56) References Cited

U.S. PATENT DOCUMENTS 5,132,688 A    7/1992   Shima et al.
5,457,462 A   10/1995   Mitsumoto et al.
(Continued)

FOREIGN PATENT DOCUMENTS

JP    63-186175 A    8/1988
JP    3-252581 A    11/1991
(Continued)

OTHER PUBLICATIONS

International Search Report, mailed Jun. 19, 2012, for International Application No. PCT/JP2012/002407, 4 pages.

*Primary Examiner* — Peter Bythrow
(74) *Attorney, Agent, or Firm* — Seed IP Law Group PLLC

(57) ABSTRACT

A radar receiver has plural antenna system processors each for performing coherent integration on the basis of correlation values between a reception signal and a transmission signal using correction amounts for phase variations corresponding to plural Doppler frequencies, plural correlation matrix generators for generating, for each of the plural different Doppler frequencies, correlation matrices which are pieces of phase difference information relating to an arrangement of reception antennas on the basis of sets of outputs of the coherent integration, respectively, an adder for adding together outputs of the plural correlation matrix generators, and an incoming direction estimator for estimating an incoming direction of reflection waves on the basis of outputs of the adder.

14 Claims, 30 Drawing Sheets

(51) Int. Cl.
  *G01S 13/00*    (2006.01)
  *G01S 13/44*    (2006.01)
  *G01S 7/288*    (2006.01)
  *G01S 13/58*    (2006.01)
  *G01S 13/28*    (2006.01)
  *G01S 7/292*    (2006.01)
  *G01S 5/02*    (2010.01)
  *G01S 13/06*    (2006.01)
  *G01S 13/36*    (2006.01)
  *G01S 13/02*    (2006.01)

(52) U.S. Cl.
  CPC .............. *G01S 13/42* (2013.01); *G01S 13/582* (2013.01); *G01S 5/02* (2013.01); *G01S 7/292* (2013.01); *G01S 13/06* (2013.01); *G01S 13/36* (2013.01); *G01S 2013/0263* (2013.01)

(56) References Cited

U.S. PATENT DOCUMENTS

| | | | |
|---|---|---|---|
| 6,232,922 B1 * | 5/2001 | McIntosh | 342/453 |
| 6,335,701 B1 * | 1/2002 | Fujisaka et al. | 342/115 |
| 6,489,923 B1 * | 12/2002 | Bevan et al. | 342/378 |
| 2002/0126045 A1 | 9/2002 | Kishigami et al. | |
| 2004/0027282 A1 | 2/2004 | Kishigami et al. | |
| 2004/0178951 A1 * | 9/2004 | Ponsford et al. | 342/192 |
| 2004/0189523 A1 | 9/2004 | Kishigami et al. | |
| 2009/0046001 A1 * | 2/2009 | Beilin et al. | 342/160 |
| 2010/0061427 A1 * | 3/2010 | Lopez-Risueno et al. | 375/150 |
| 2010/0085243 A1 * | 4/2010 | De Gramont et al. | 342/175 |
| 2012/0050103 A1 * | 3/2012 | Revol | 342/357.68 |
| 2013/0127655 A1 * | 5/2013 | Kishigami et al. | 342/152 |
| 2014/0062763 A1 * | 3/2014 | Kishigami et al. | 342/158 |
| 2014/0327567 A1 * | 11/2014 | Kishigami et al. | 342/146 |

FOREIGN PATENT DOCUMENTS

| | | |
|---|---|---|
| JP | 4-102085 A | 4/1992 |
| JP | 5-45449 A | 2/1993 |
| JP | 7-43449 A | 2/1995 |
| JP | 2001-108741 A | 4/2001 |
| JP | 2001-133544 A | 5/2001 |
| JP | 2002-243826 A | 8/2002 |
| JP | 2003-248053 A | 9/2003 |
| JP | 2007-298503 A | 11/2007 |
| JP | 2008-20419 A | 1/2008 |
| JP | 2010-230643 A | 10/2010 |
| JP | 2012-181109 A | 9/2012 |

* cited by examiner

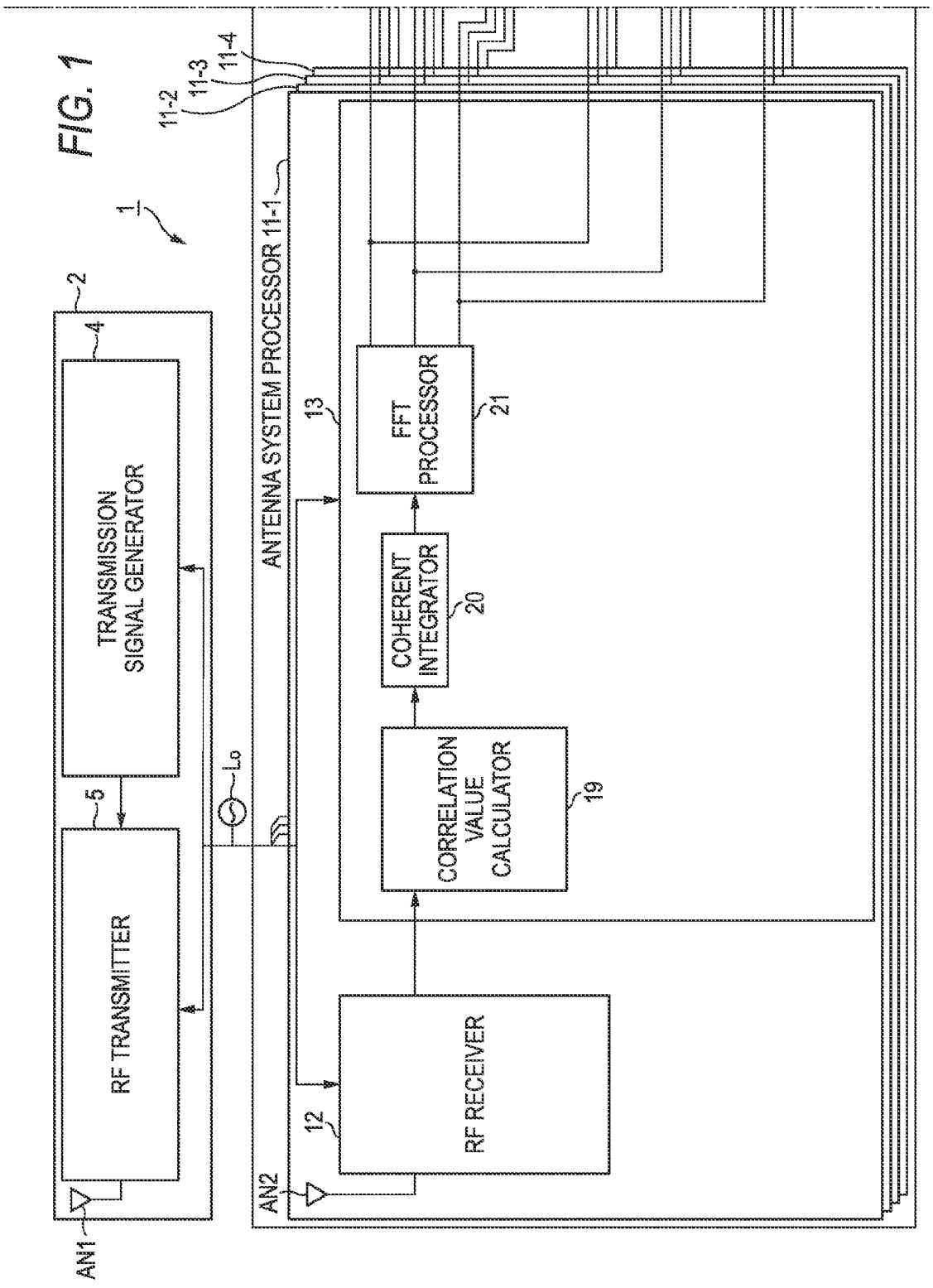

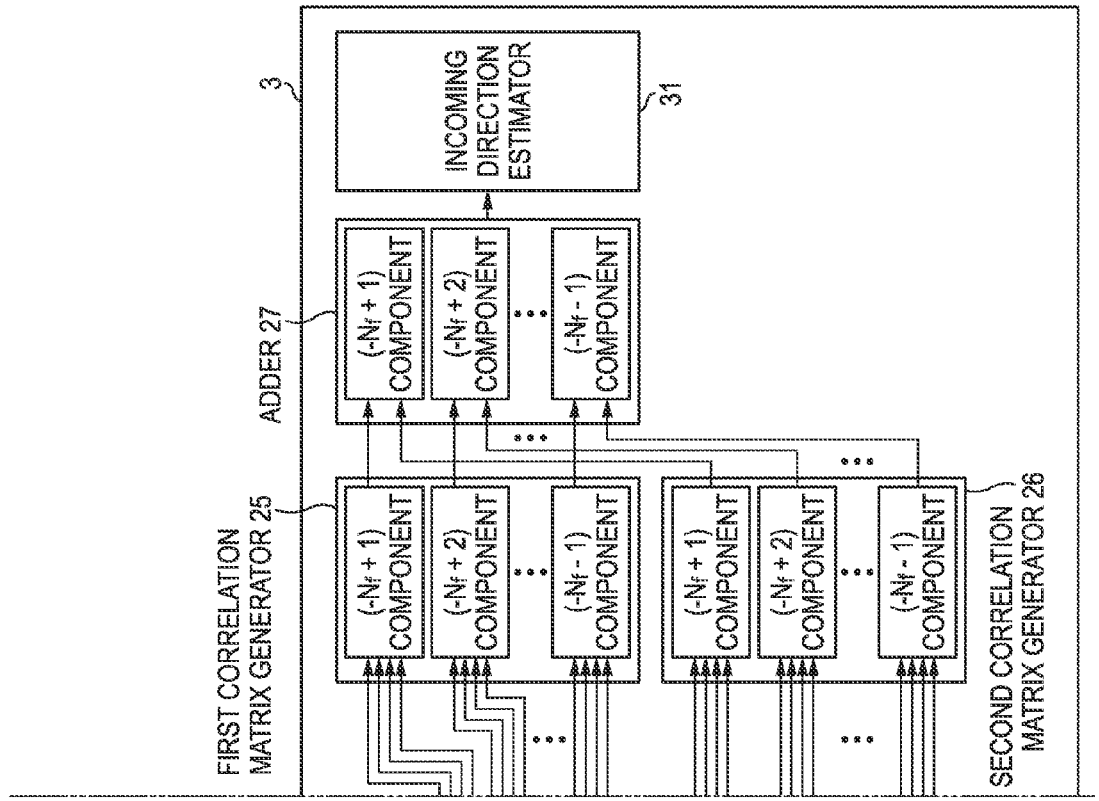
(FIG. 1 CONTINUED)

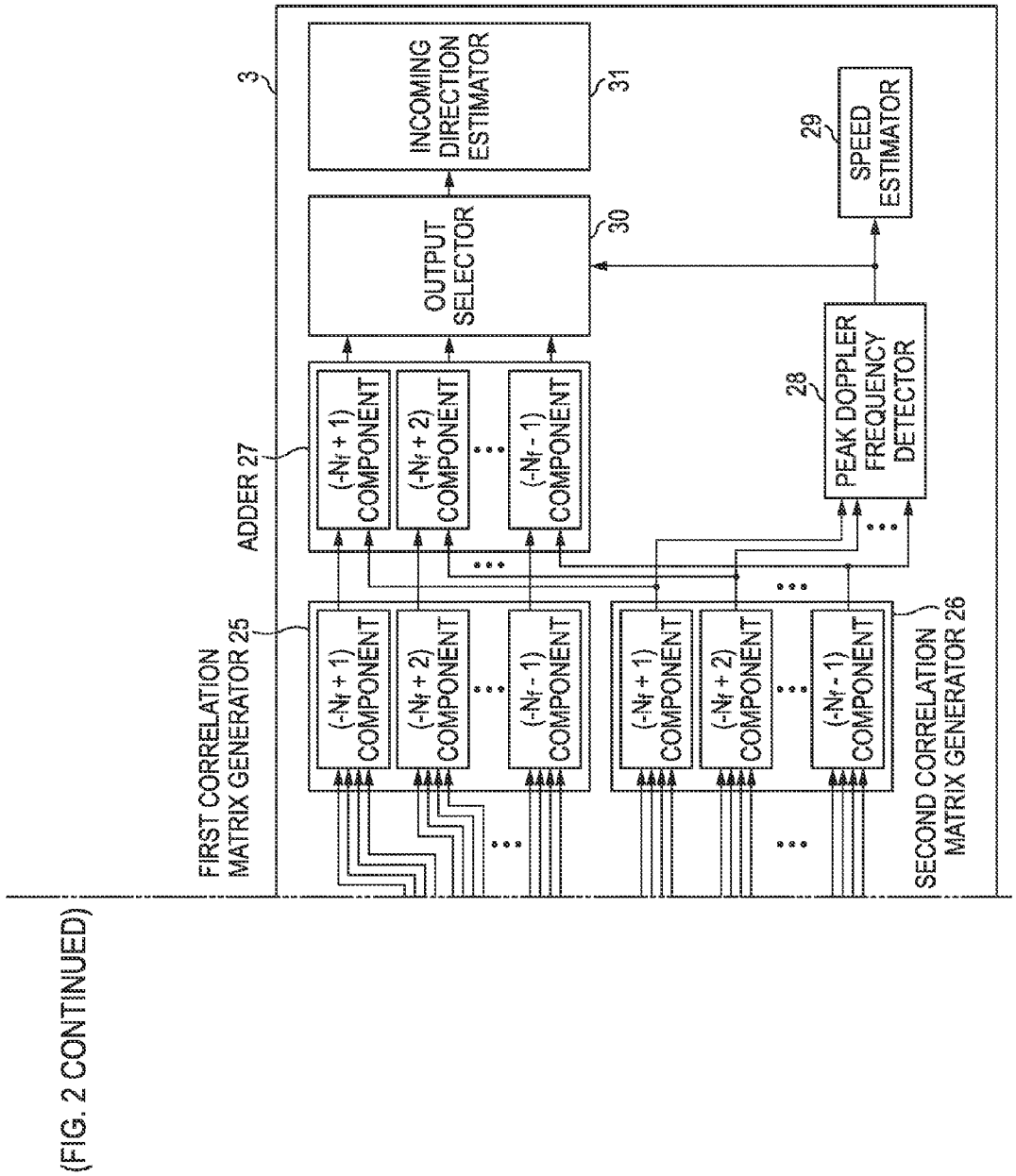
(FIG. 2 CONTINUED)

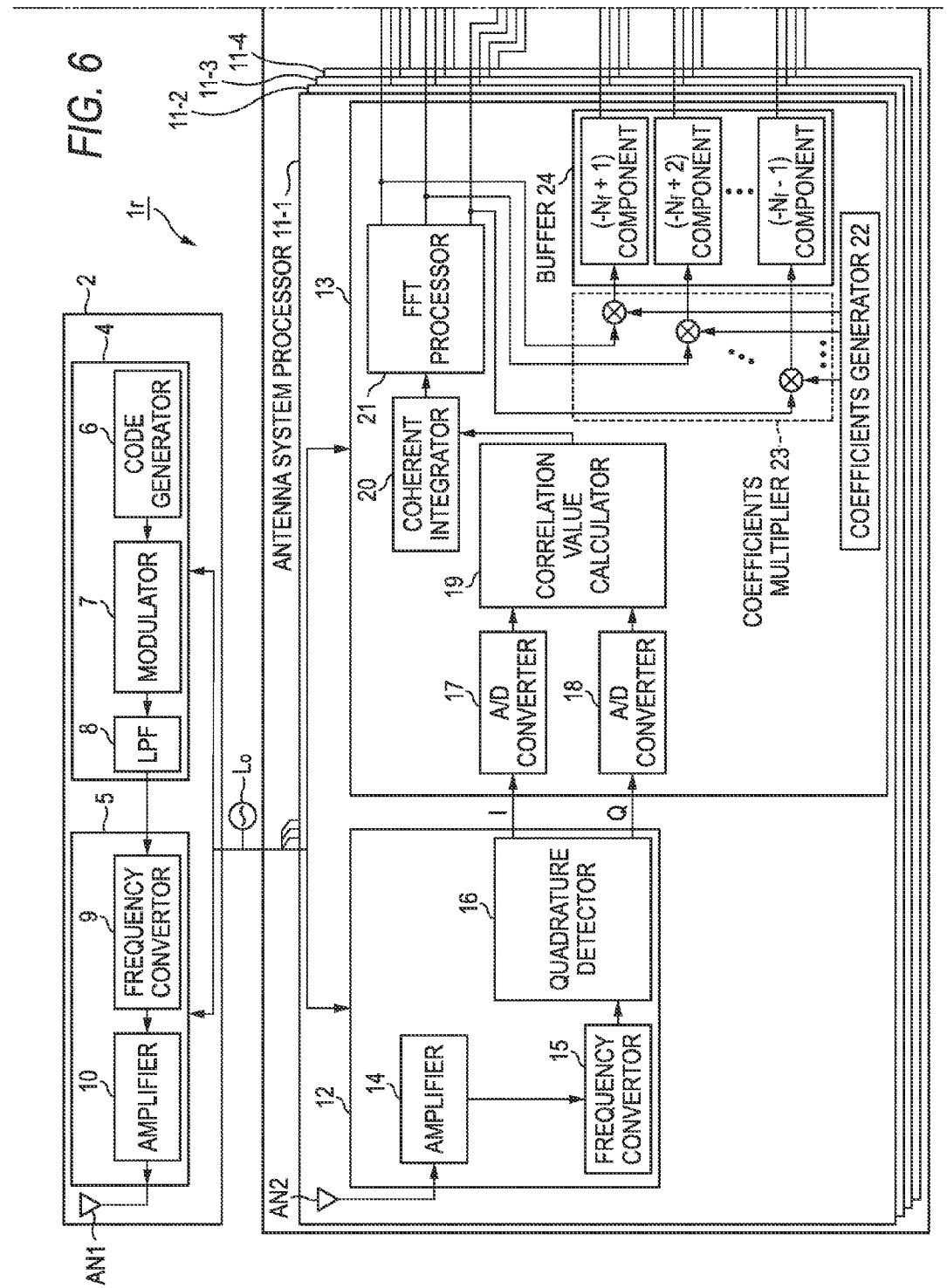

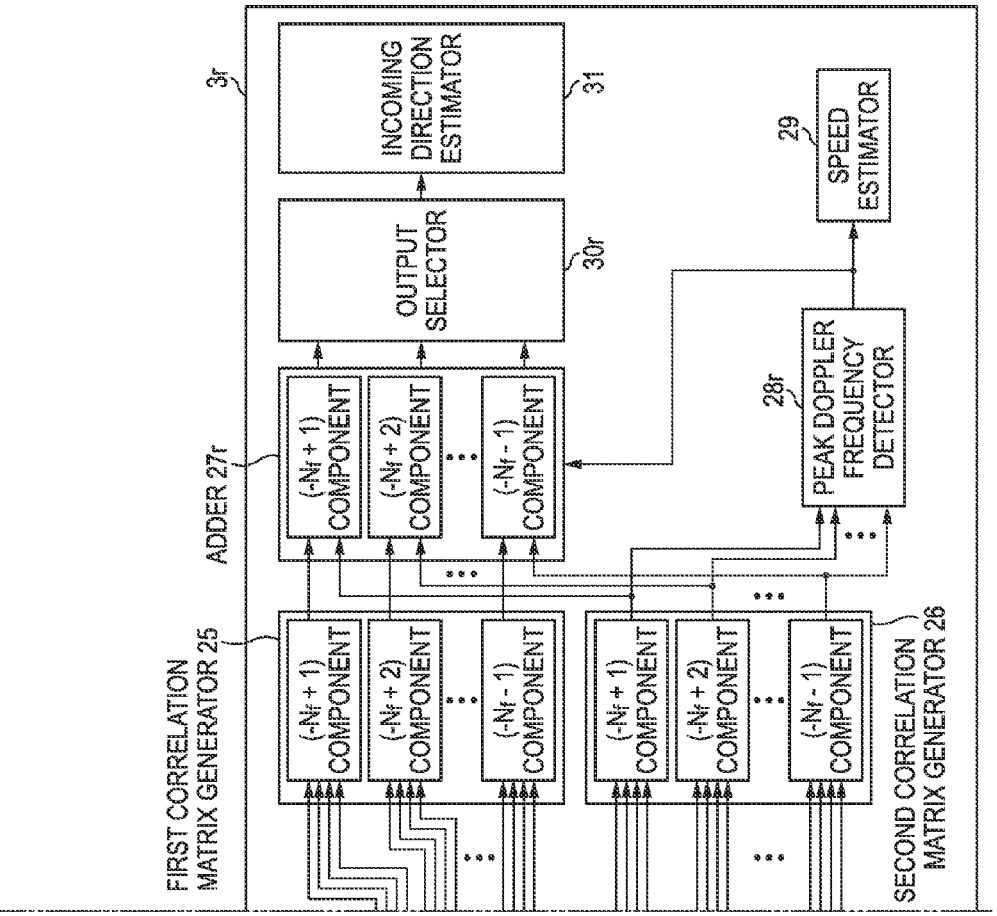

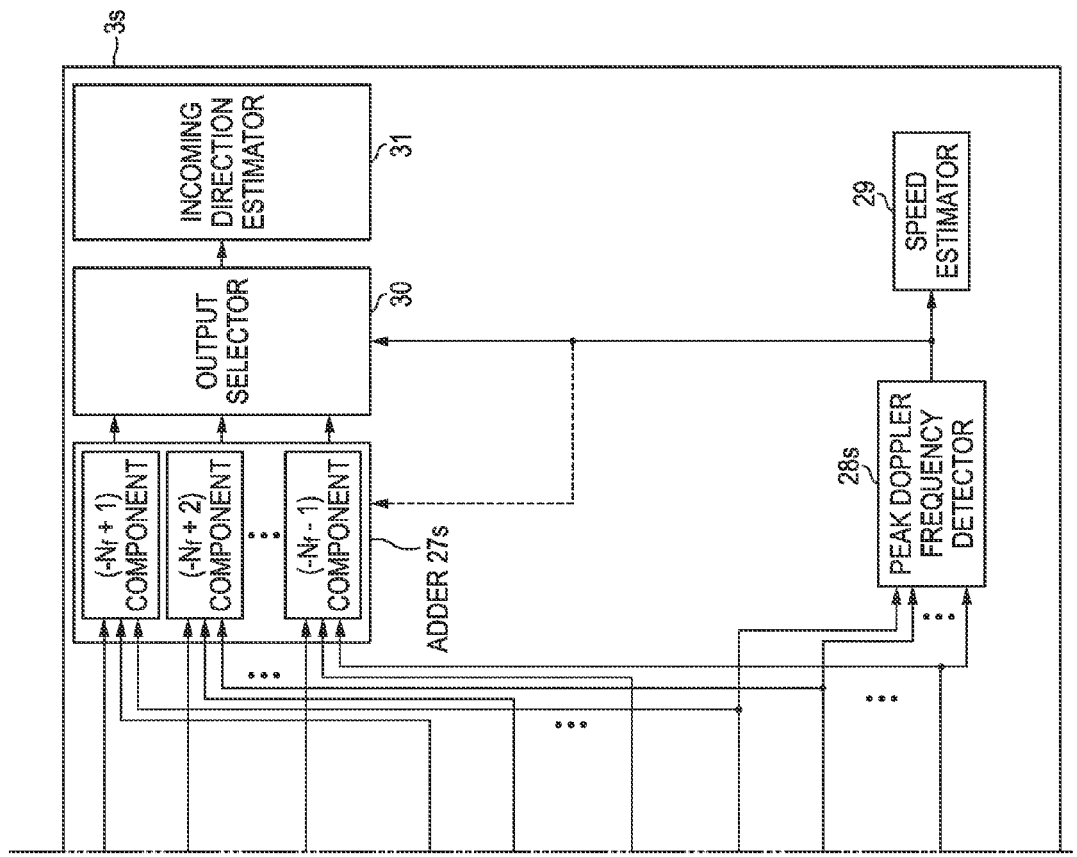

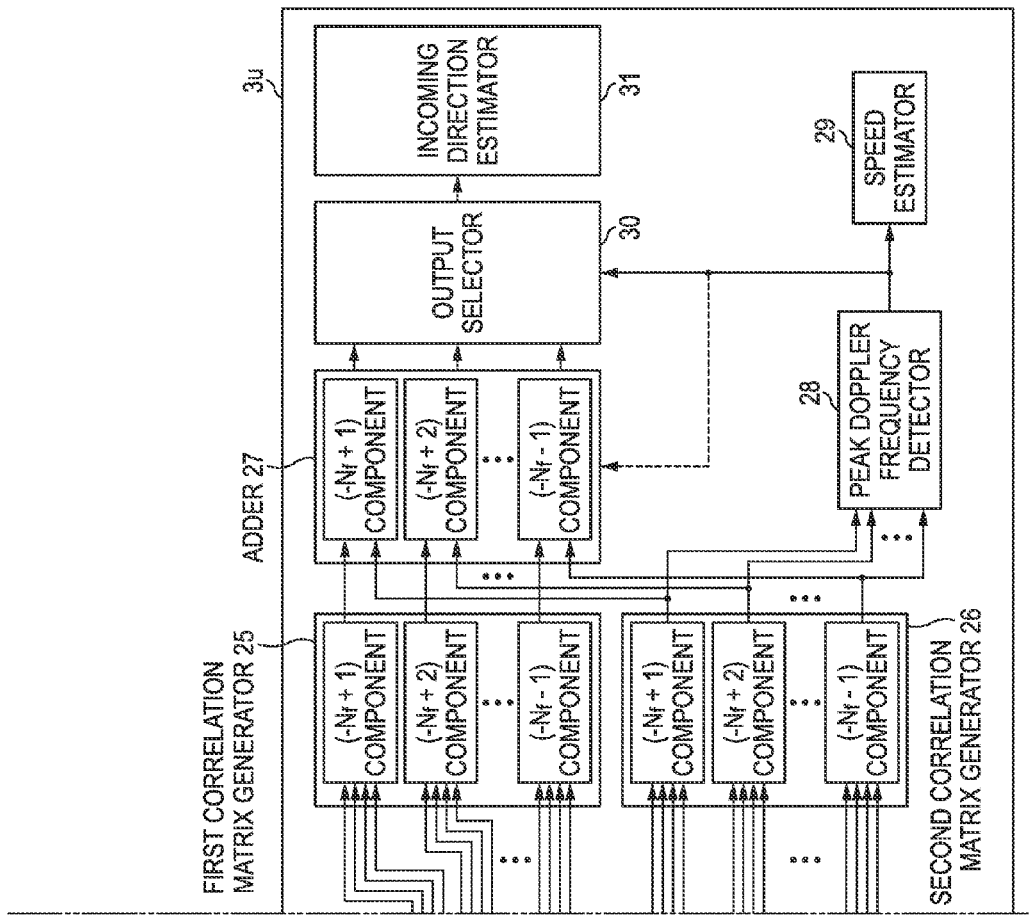

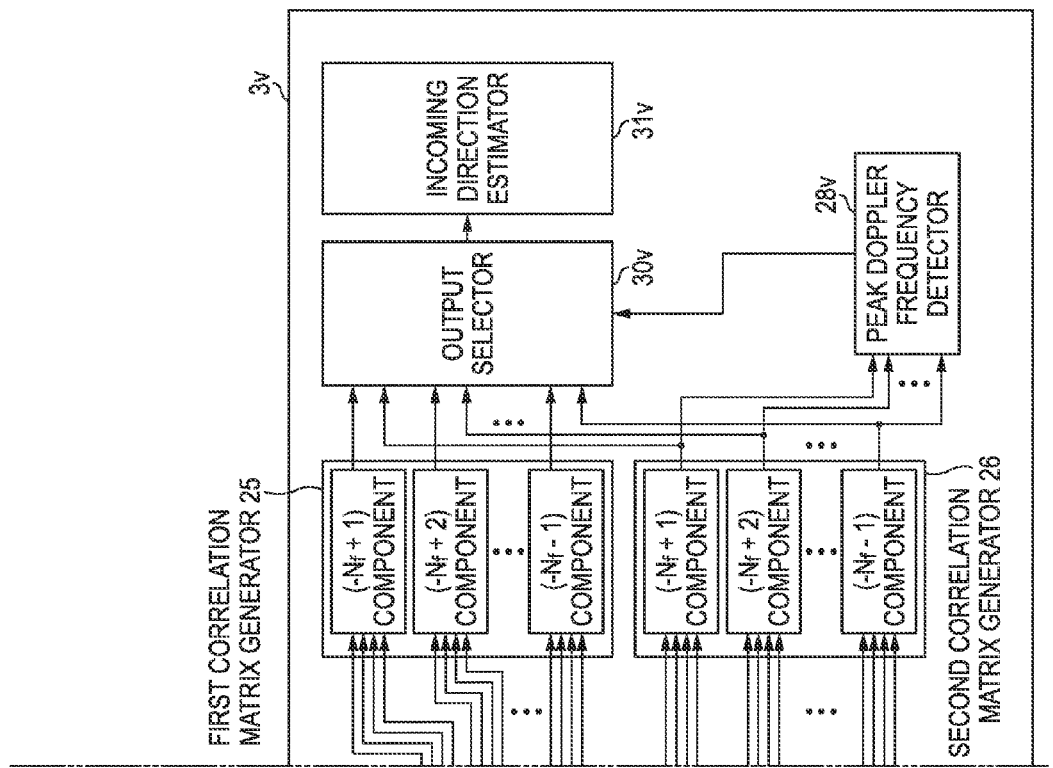

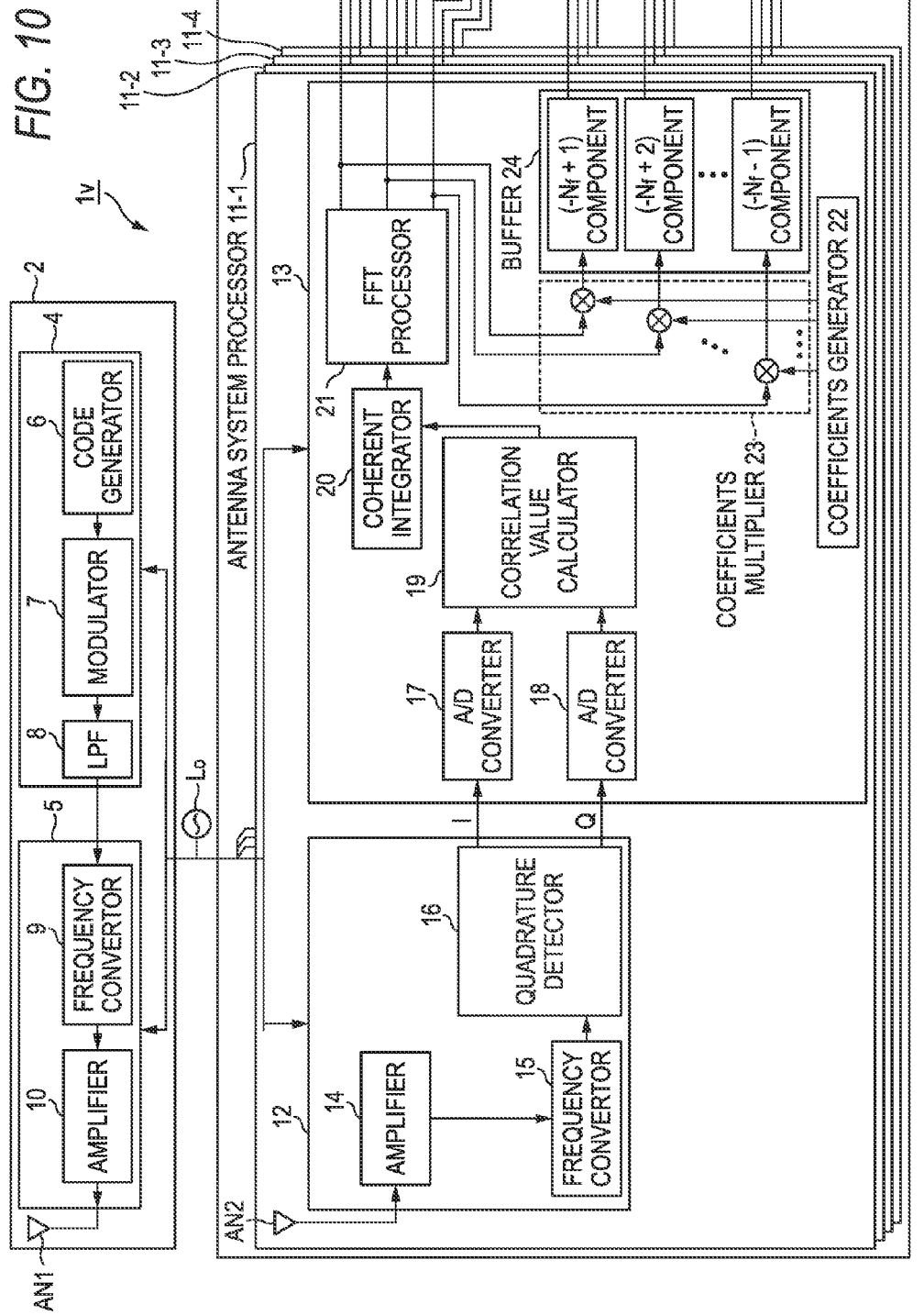

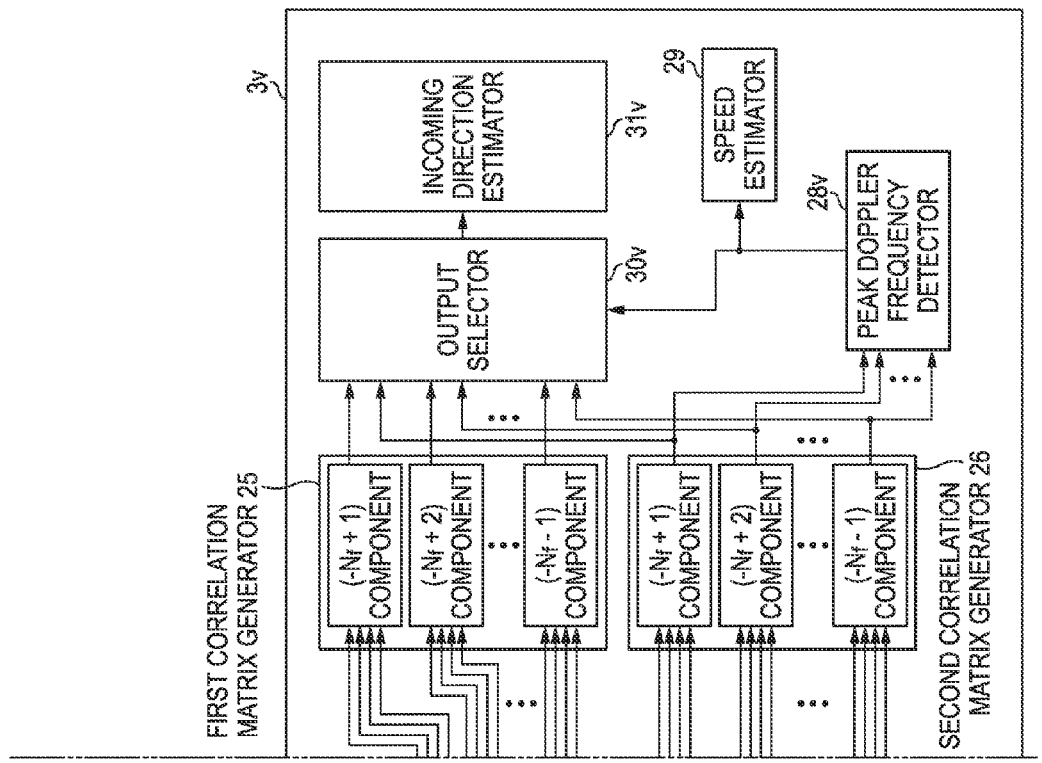
(FIG. 10 CONTINUED)

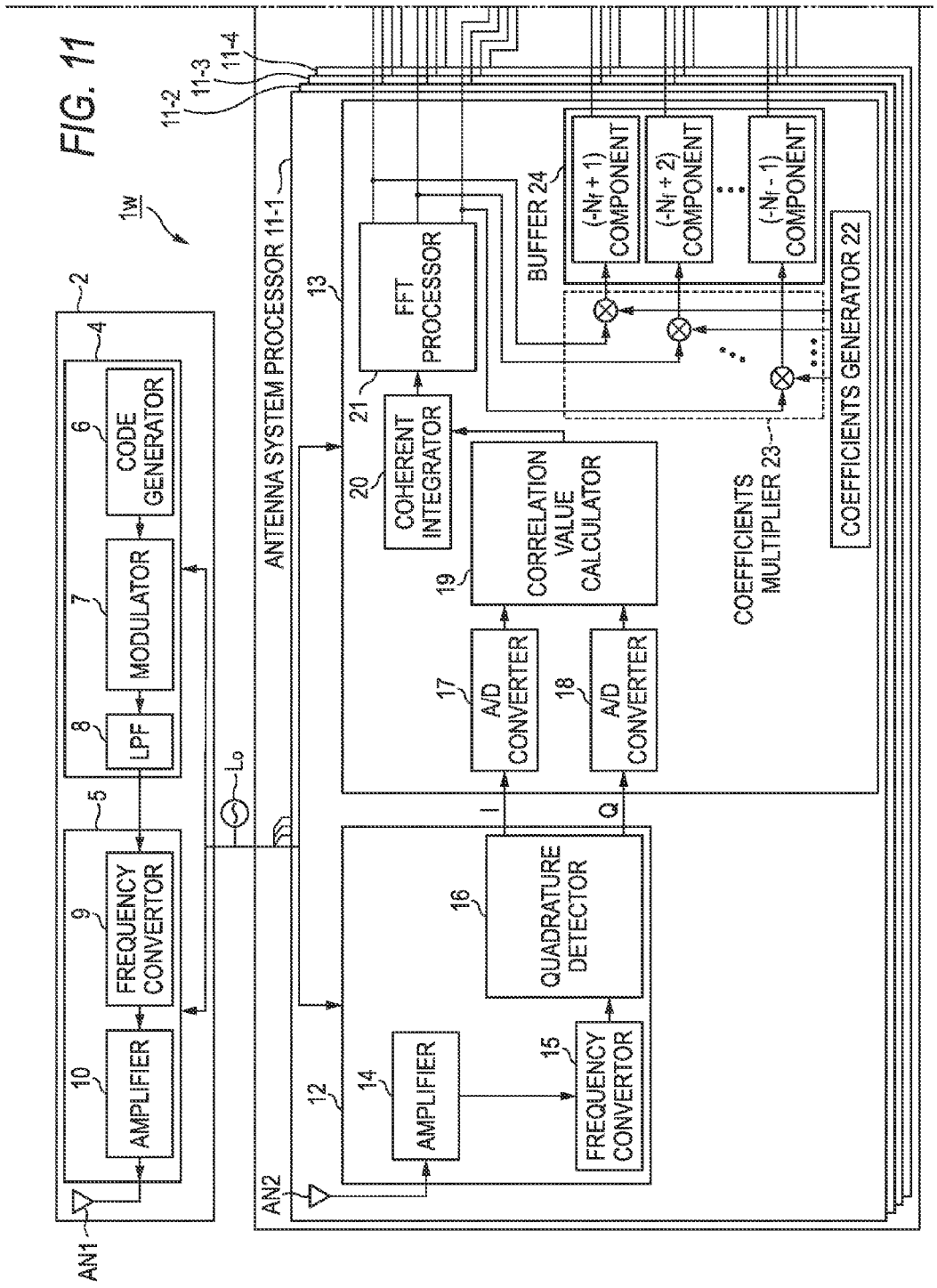

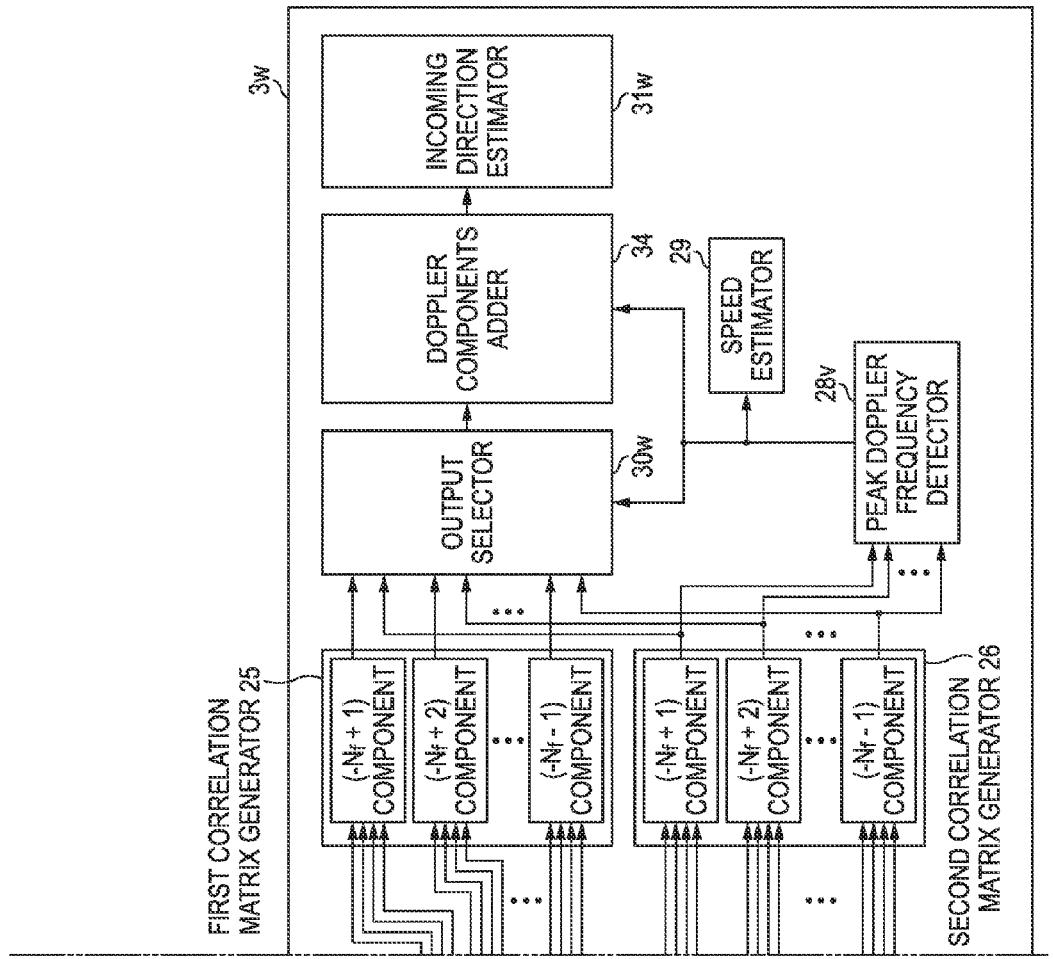
(FIG. 11 CONTINUED)

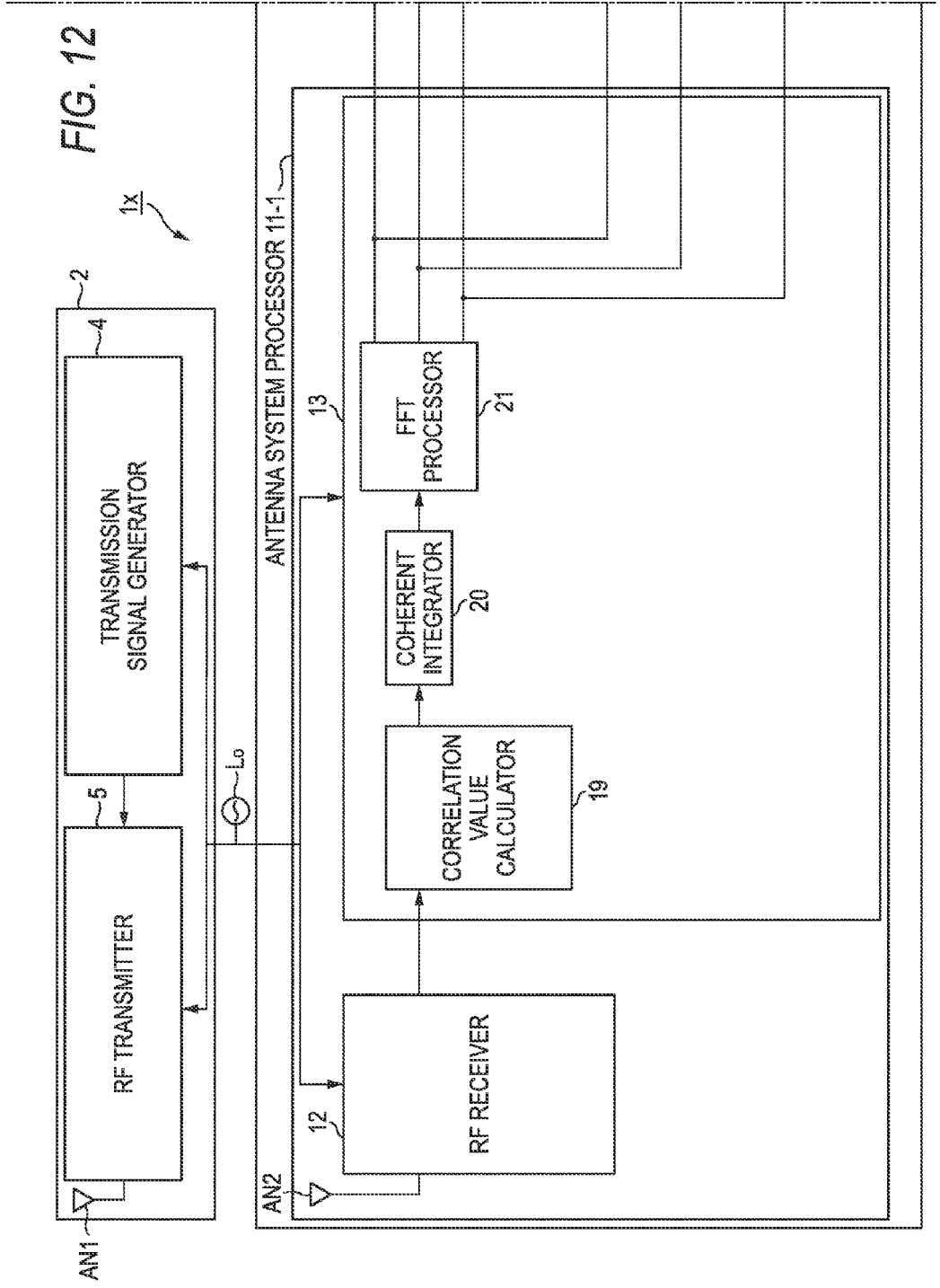

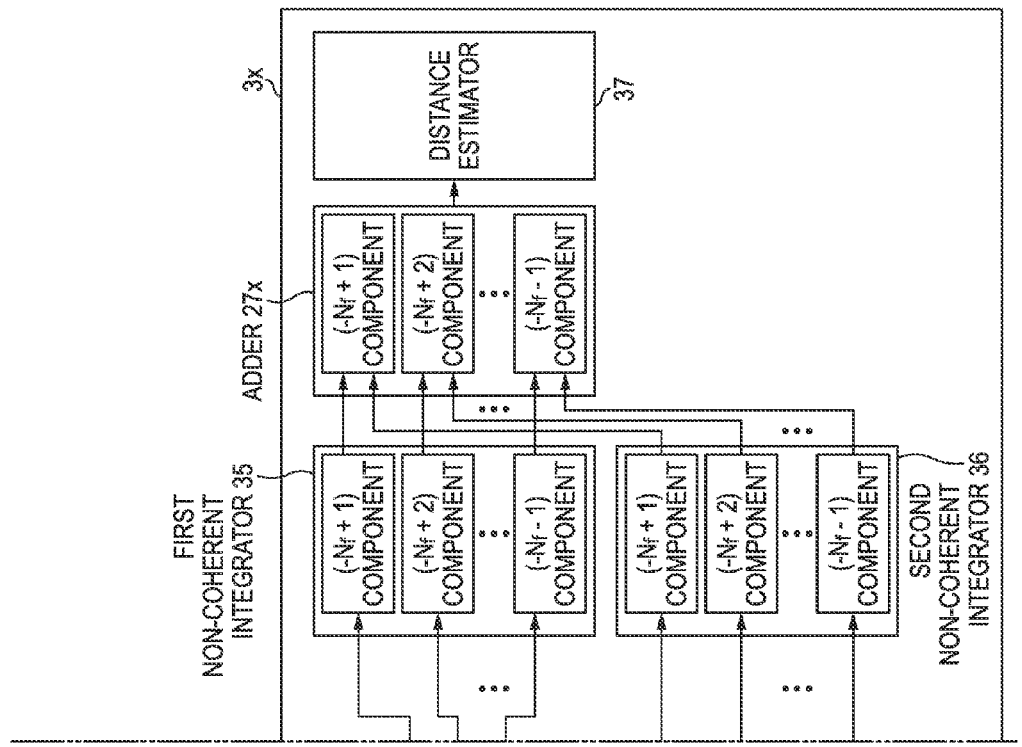
(FIG. 12 CONTINUED)

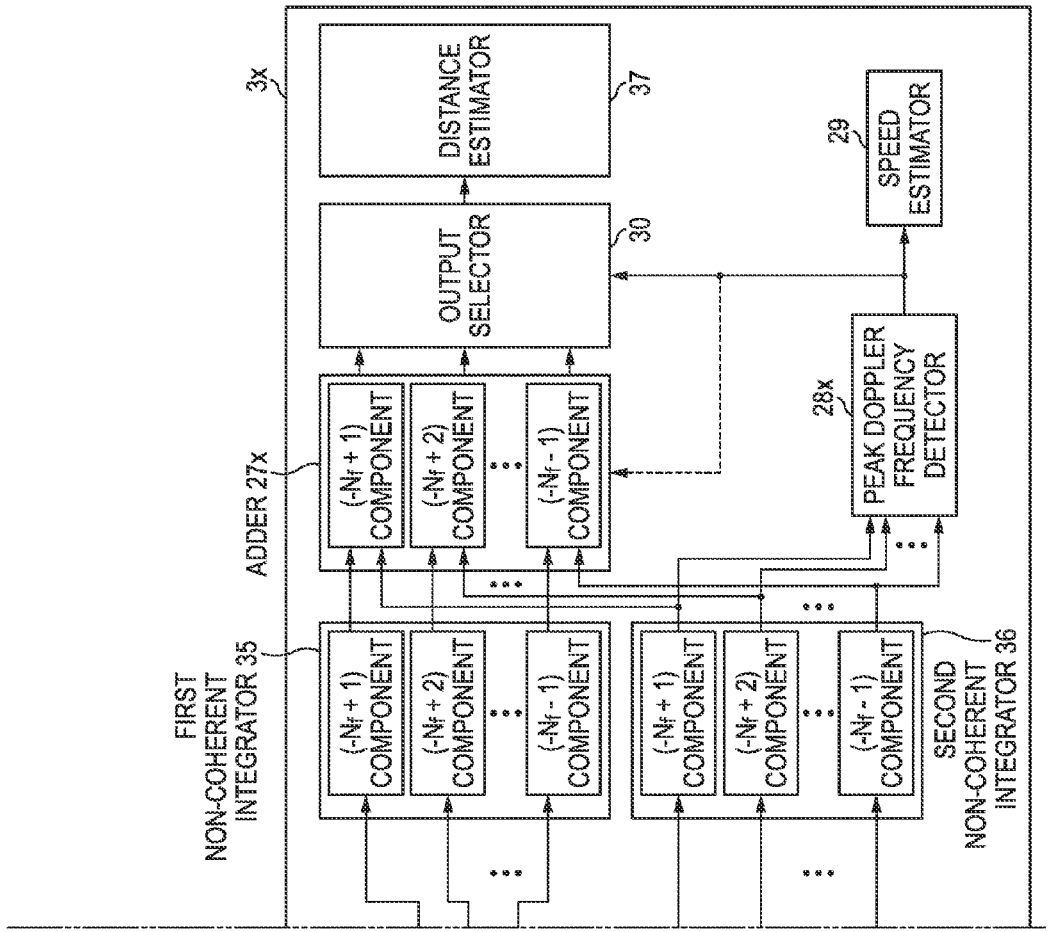
(FIG. 13 CONTINUED)

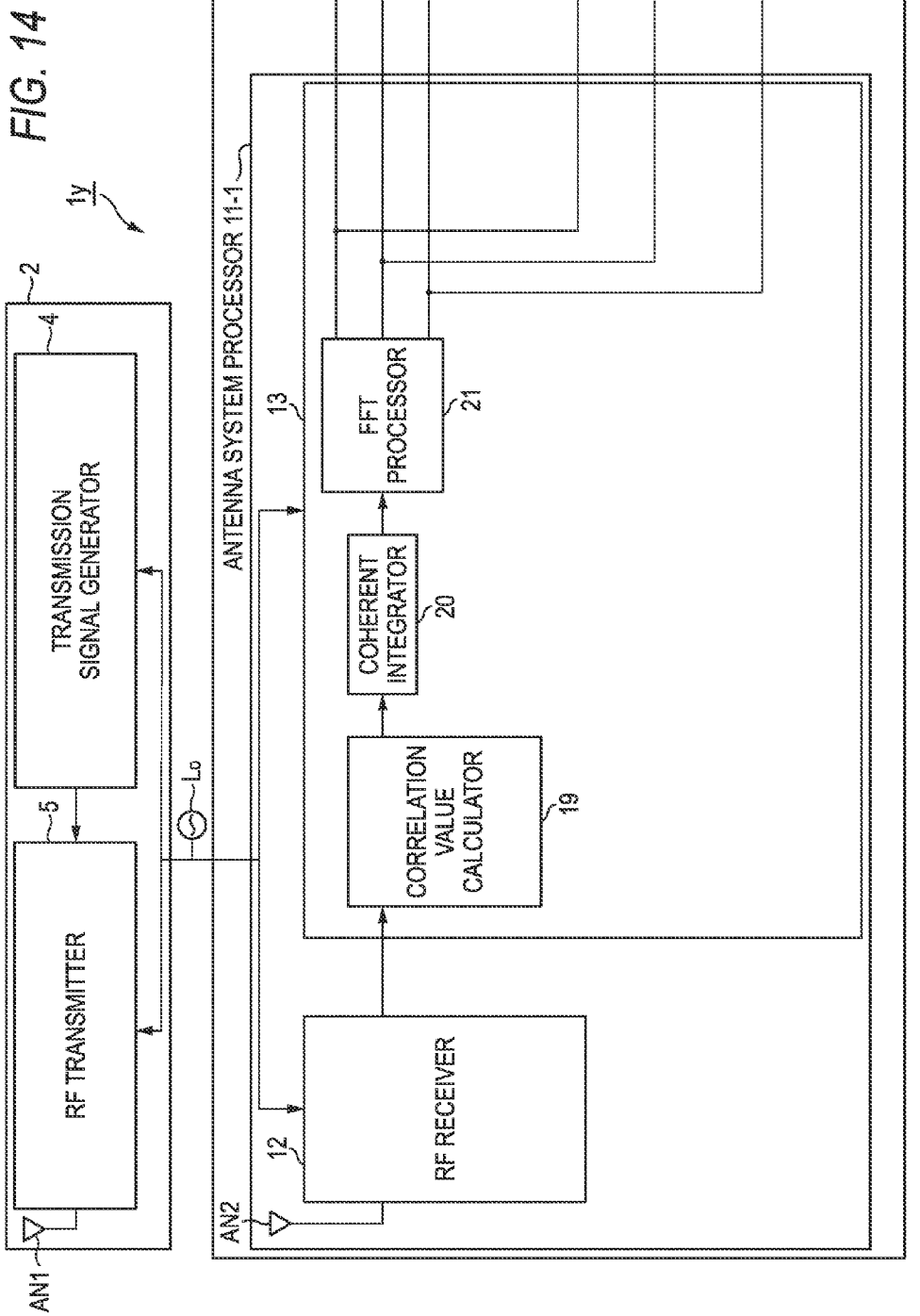

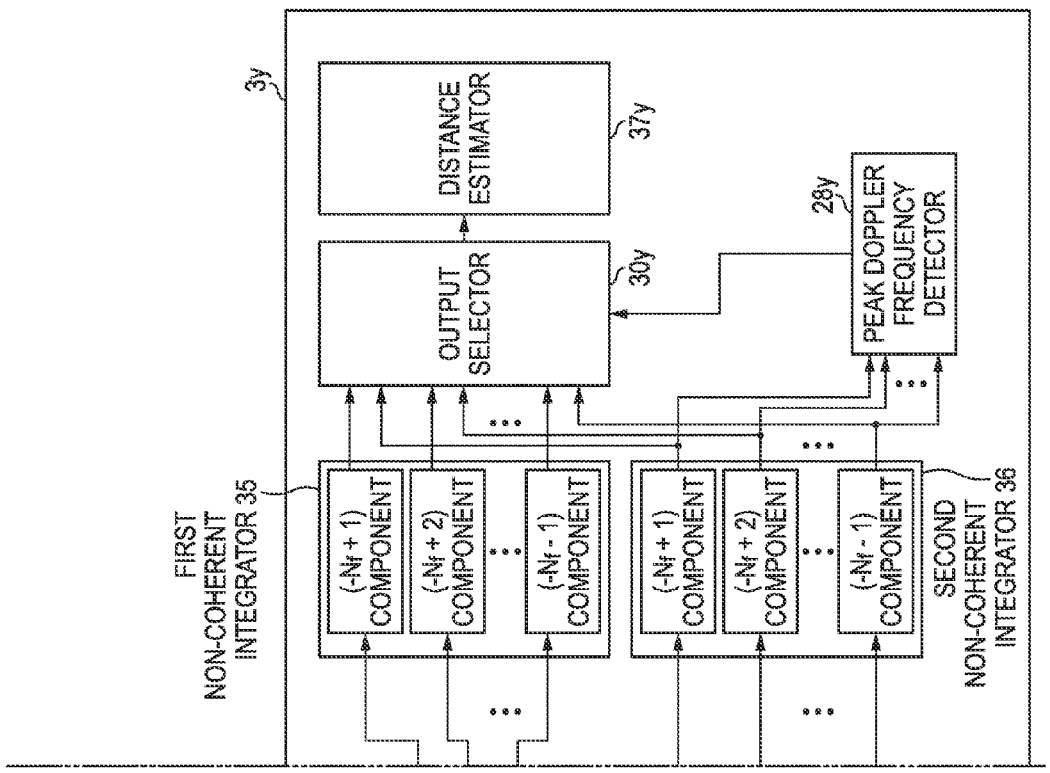
(FIG. 14 CONTINUED)

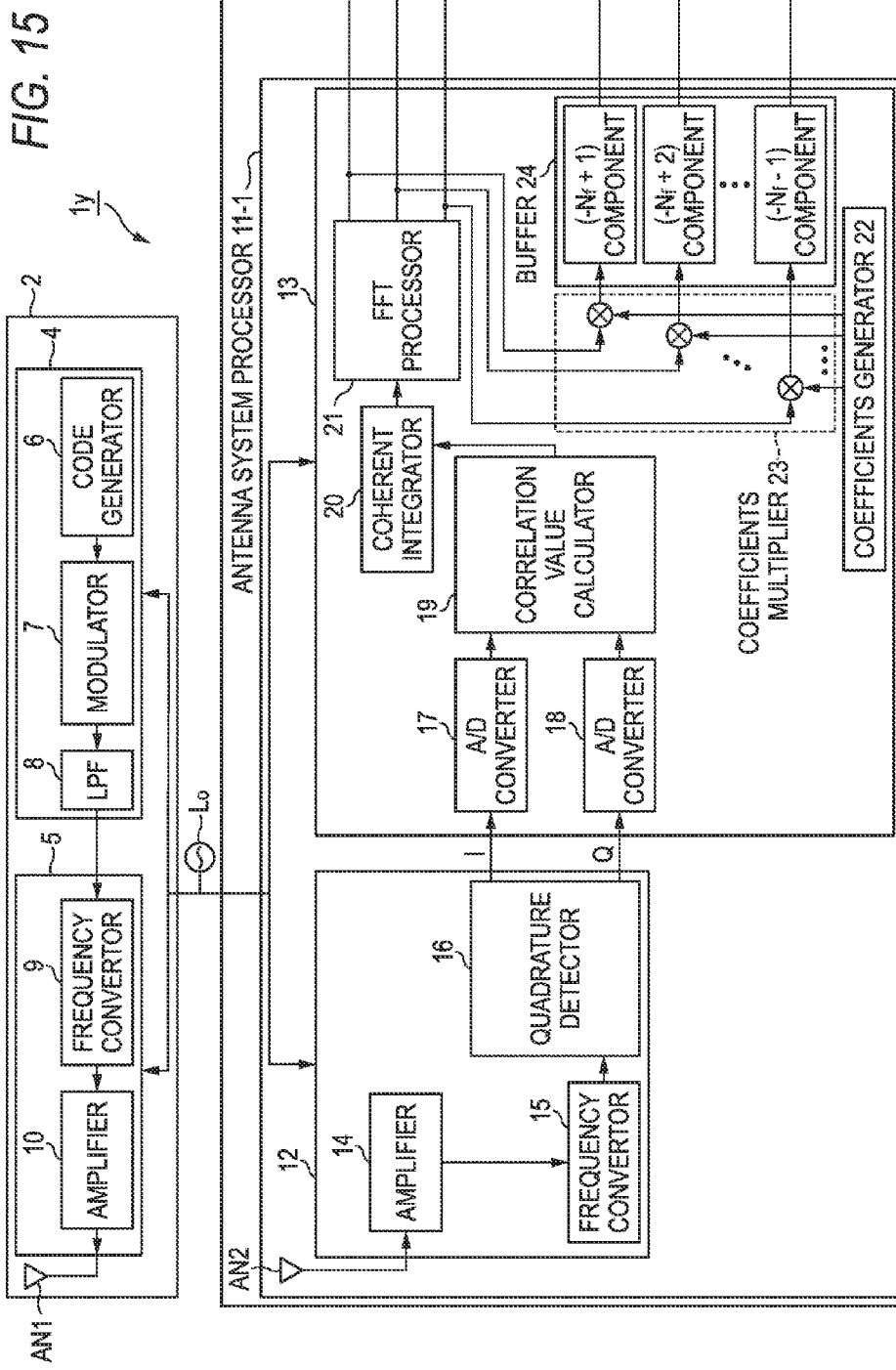

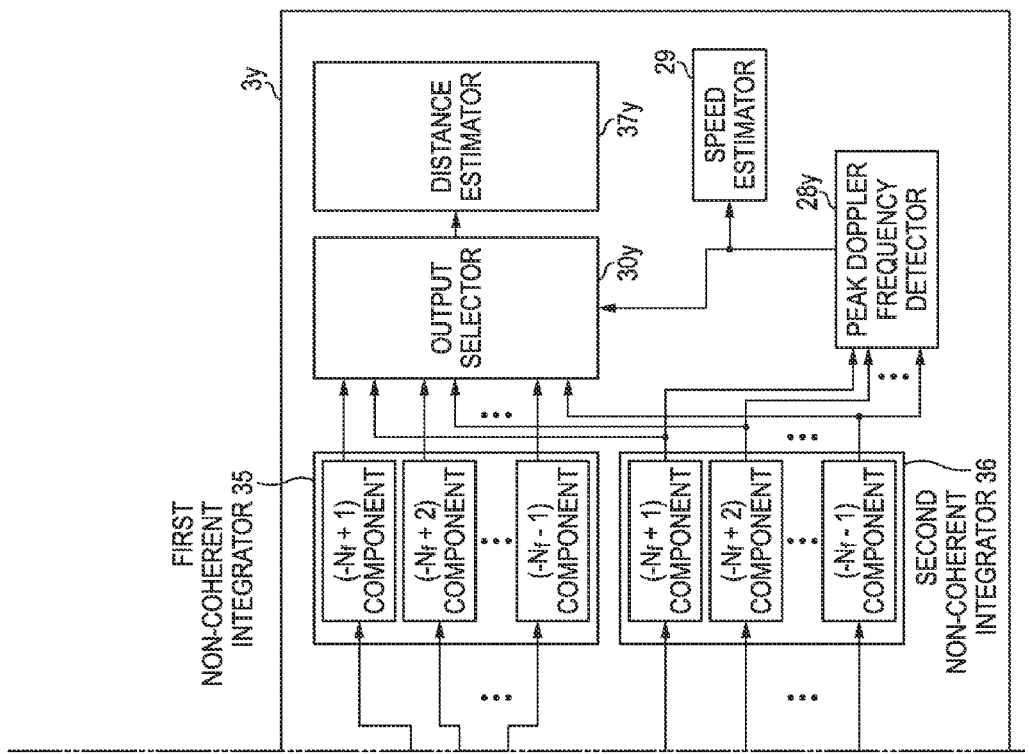
(FIG. 15 CONTINUED)

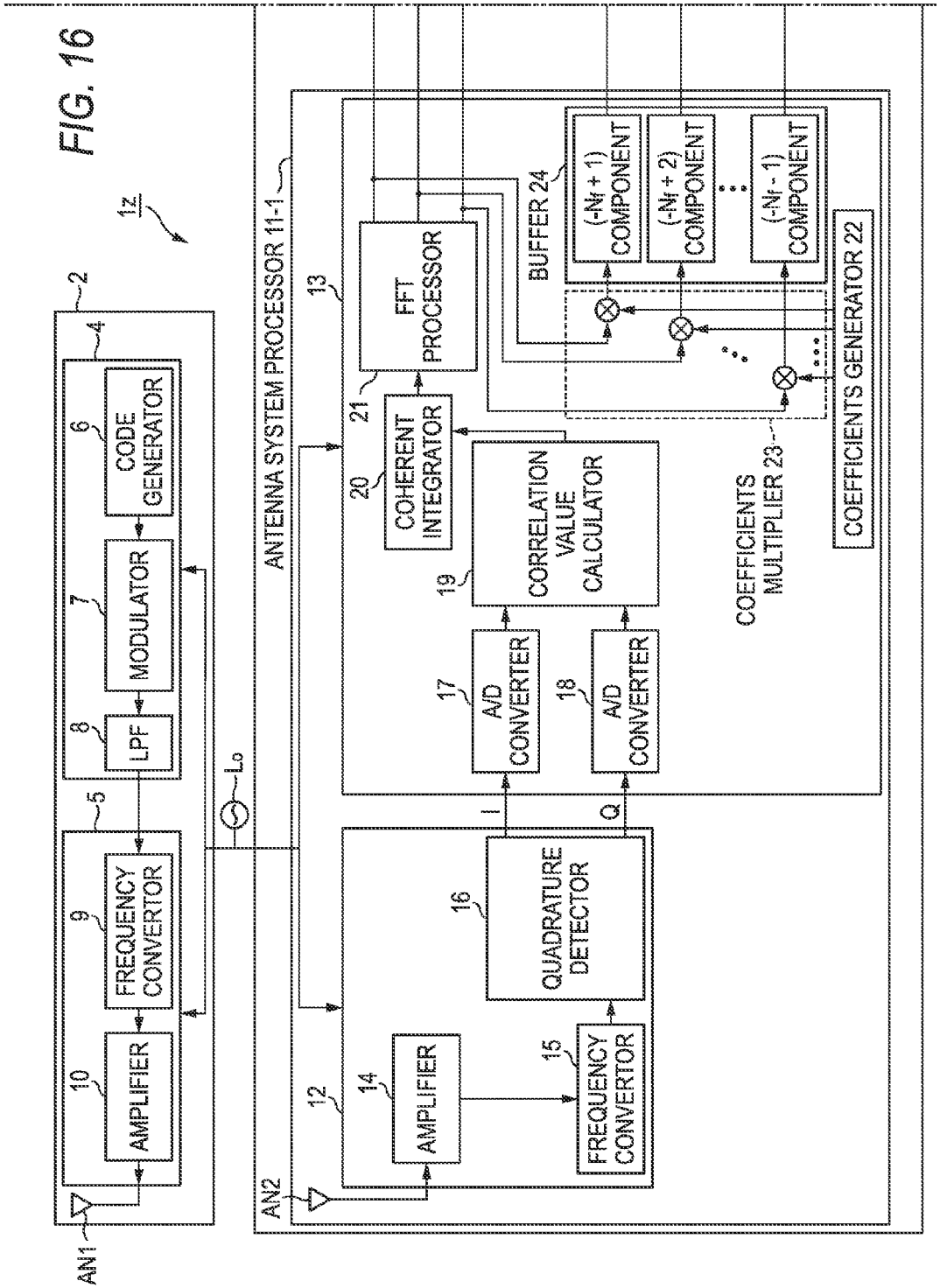

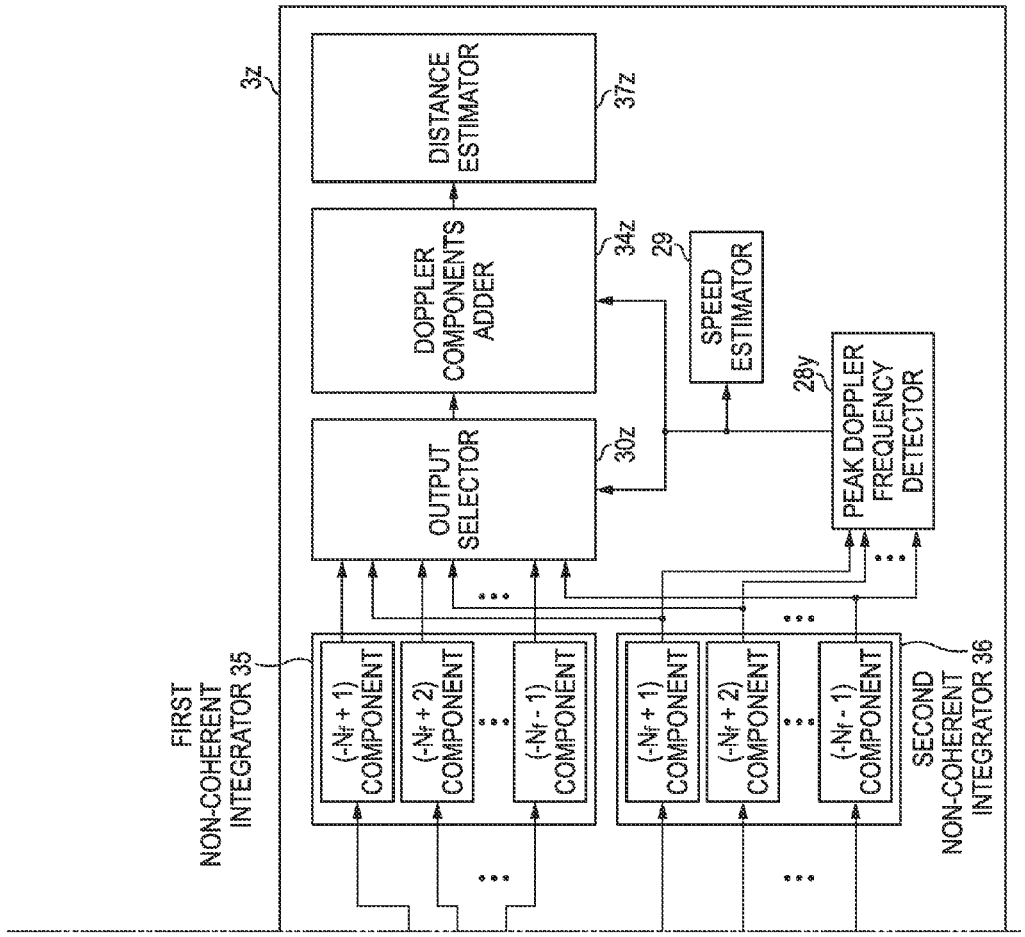
(FIG. 16 CONTINUED)

US 9,128,182 B2

RADAR DEVICE

TECHNICAL FIELD

The present invention relates to a radar device using a pulse signal which detects a target by receiving a pulse signal of reflection waves reflected by the target with an antenna.

BACKGROUND ART

Radar device measures at least one of a distance and a direction of a target from a measuring place by radiating radio waves to the space from the measuring place and receiving a pulse signal of reflection waves reflected by the target. In particular, in recent years, radar device which can detect targets including automobiles and pedestrians by a high-resolution measurement using short-wavelength radio waves including microwaves and millimeter waves have been being developed.

There may occur a case that a radar device receives a signal of a mixture of reflection waves coming from a nearby target and reflection waves coming from a distant target. In particular, where range sidelobes occur due to a signal of reflection waves coming from a nearby target, the range sidelobes and a main lobe of reflection waves coming from a distant target exist in mixture, as a result of which the accuracy of detection of the distant target is lowered in the radar device.

Therefore, radar device using a pulse signal which need to perform high-resolution measurements on plural targets are required to transmit pulse waves or pulse modulation waves having an autocorrelation characteristic with low range sidelobe levels (hereinafter referred to as a low range sidelobe characteristic).

When an automobile and a pedestrian are located at the same distance from a measuring place, a radar device receives a signal that is a mixture of signals of reflection waves coming from the automobile and the pedestrian which have different radar cross sections (RCSs). In general, the radar cross section a pedestrian is smaller than that of an automobile.

Radar devices are required to properly receive signals of reflection waves coming from an automobile and a pedestrian even if they are located at the same distance from a measuring place. The reception signal level of a reflection wave signal varies depending on the distance and the type of a target. Radar devices are required to have such a reception dynamic range as to be able to receive reflection wave signals having various reception signal levels.

In conventional radar device using pulse compression, a technique is known which increases the SNR (signal-to-noise ratio) of reception of reflection waves coming from a target by adding together correlation values calculated by pulse compression processing in the case where a pulse compression code is transmitted repeatedly at a transmission cycle $T_r$. The addition is classified into coherent integration and non-coherent integration (also called incoherent integration).

For example, in a period ($N_c \times T_r$) with high time correlation, I components and Q components of correlation values calculated by pulse compression processing can be separately subjected to coherent integration. The parameter $T_r$ is the pulse transmission cycle (s). As is understood from Formula (1), the coherent integration makes it possible to improve the reception quality by a coherent integration gain $G_c$ (dB) from a reception SNR (dB). The coherent integration gain $G_c$ is calculated according to Equation (2):

[Formula 1]

$$SNR[dB]+G_c[dB] \qquad (1)$$

[Formula 2]

$$G_c=10\log_{10}(N_c)[dB] \qquad (2)$$

The parameter $N_c$, which is the coherent integration number, is set depending on an assumed maximum movement speed of a target. Therefore, as the assumed maximum movement speed of a target increases, the variation of a Doppler frequency included in a signal of reflection waves coming from a target is increased and the period with high time correlation becomes shorter. As the coherent integration number $N_c$ decreases, the coherent integration gain $G_c$ is decreased as seen from Equation (2), that is, the SNR enhancement effect of the coherent integration is decreased as seen from Formula (1).

On the other hand, also in the case of the non-coherent integration, as is understood from Formula (3), the SNR can be increased by adding together amplitude or reception power components of correlation values calculated by pulse compression processing. The parameter $G_d$ is the non-coherent integration gain and is calculated according to Equation (4):

[Formula 3]

$$SNR[dB]+G_d[dB] \qquad (3)$$

[Formula 4]

$$G_d=10\log_{10}(\sqrt{N_d})[dB] \qquad (4)$$

The parameter $N_d$ is the non-coherent integration number. Where the coherent integration number $N_c$ and the non-coherent integration number $N_d$ are the same, as is understood from Equations (2) and (4), the coherent integration contributes more to the gain increase than the non-coherent integration. However, to obtain a gain of ideal coherent integration, it is necessary that the phase component of a reception signal be kept constant in a prescribed range. The range where the coherent integration is possible is thus restricted.

When Fourier transform is performed using $N_f$ correlation values calculated by pulse compression processing at a particular discrete time point for an interval ($N_f \times T_r$) of $N_f$ transmissions of a pulse compression code, a Doppler spectrum included in reflection waves coming from a target can be observed from a Fourier-transformed frequency domain signal. In conventional radar device using pulse compression, a signal component in which the gain is increased by the coherent integration can be detected from a peak frequency component (hereinafter referred to as "peak Doppler spectrum") in a Doppler spectrum. An FFT (fast Fourier transform) or DFT (discrete Fourier transform) algorithm is used for the Fourier transform. Although in the following description Fourier transform will be abbreviated as FFT, the same discussions will hold even if FFT is replaced by DFT.

FFT processing which is performed using $N_f$ correlation values calculated by pulse compression processing at a particular discrete time point for an interval ($N_f \times T_r$) of $N_f$ transmissions of a pulse compression code will be referred to as "coherent integration by FFT" or "FFT coherent integration."

In conventional radar device using pulse compression, where reflection waves from a target include a phase variation due to a Doppler frequency shift that is caused by a movement of the target, coherent integration that conforms to the phase variation due to the Doppler frequency shift is enabled if a peak of a Doppler spectrum is detected by coherent integration by FFT.

In conventional radar device using pulse compression, if the spread of a Doppler spectrum (Doppler spread) is sufficiently small, the coherent integration has a gain increase effect (see Formula (1)) irrespective of the coherent integration interval which corresponds to the FFT size. In particular, in conventional radar device using pulse compression, in the case where the Doppler spectrum can be approximated by a line spectrum, the gain $G_f$ (dB) of the coherent integration effect is obtained as given by Equation (5), where $N_f$ is the FFT coherent integration number:

[Formula 5]

$$G_f=10 \log_{10}(N_f)[dB] \quad (5)$$

To obtain the ideal coherent integration gain given by Equation (5) in conventional radar device using pulse compression, it is necessary that the Doppler spread $\delta_d$ which depends on a phase variation included in reflection waves coming from a target be sufficiently small. That is, in conventional radar device using pulse compression, the coherent integration gain decreases as the Doppler spread $\delta_d$ which depends on a phase variation included in reflection waves coming from a target increases.

FIG. 17(a) shows relationships between Doppler spectrum characteristics and Doppler spreads after FFT. The horizontal axis represents the frequency and the vertical axis represents the Doppler spectrum. FIG. 17(b) shows a relationship between the coherent integration gain and the number of times of coherent integration (integration interval) which corresponds to the FFT size with the Doppler spread as a parameter. The horizontal axis represents the number of times of coherent integration (logarithmic scale) and the vertical axis represents the coherent integration gain.

As seen from FIG. 17(b), when the Doppler spread $\delta_d$ is large, the coherent integration gain starts to be saturated when the number of times of coherent integration is equal to A. When the Doppler spread $\delta_d$ is small, the coherent integration gain starts to be saturated when the number of times of coherent integration is equal to B. Therefore, the number of times of FFT coherent integration corresponding to the saturation start point of the coherent integration gain decreases as the Doppler spread $\delta_d$ becomes large.

In conventional radar device using pulse compression, when the Doppler spread $\delta_d$ is large and the coherent integration gain starts to be saturated early even if the coherent integration number is increased (described above), the SNR can be increased more by using both of coherent integration and non-coherent integration and increasing the number of times of non-coherent integration.

The Doppler spread which is included in reflection waves coming from a target is larger when more reflective objects exist around a place where the target is located or the target itself has more scattering points. And the Doppler spread which is included in reflection waves coming from a target tends to increase as the directivity of a transmission antenna or a reception antenna becomes wider.

In conventional radar device using pulse compression, the following problem arises if the number $N_f$ of times of FFT coherent integration is set as a fixed vale in the case where targets (positioning targets) include a target which produces a large Doppler spread and a target which produces a small Doppler spread and reflection waves coming from the targets thus have a wide range of Doppler spreads.

Where positioning of a target having a large Doppler spread is used as a reference, if the coherent integration number is set smaller than the non-coherent integration number, one cannot enjoy a coherent integration gain which should be obtained in positioning of a target having a small Doppler spread.

Conversely, where positioning of a target having a small Doppler spread is used as a reference, if the coherent integration number is set larger than the non-coherent integration number, the SNR cannot be increased sufficiently in positioning of a target having a large Doppler spread due to saturation of the coherent integration gain (see FIG. 17(b)).

For example, a radar device disclosed in Patent document 1 is known as a countermeasure against the above problem. This radar device is configured so as to be equipped with plural range gates the width of each of which is determined by a pulse width, and to include plural coherent integrators, plural wave detectors, plural non-coherent integrators, and plural threshold detectors in such a manner that they correspond to the respective range gates.

It is also disclosed that, in this radar device, a target is detected for each range by performing, with the plural coherent integrators and the plural non-coherent integrators, plural kinds of integration processing which are different in the ratio between the coherent integration number and the non-coherent integration number and comparing plural signals obtained by these kinds of integration processing with prescribed threshold values with the plural threshold detectors.

PRIOR ART DOCUMENTS

Patent Documents

Patent document 1: JP-A-5-45449

SUMMARY OF THE INVENTION

Problems to be Solved by the Invention

However, in the radar device of Patent document 1, its circuit scale is increased if it is attempted to estimate incoming directions according to a phase difference between signals of received reflection waves coming from targets using an array antenna which is composed of plural antenna elements.

The reason is as follows. Outputs of the plural coherent integrators of the respective range gates include pieces of phase information of signals of reflection waves coming from targets. Since the pieces of phase information are eliminated by the wave detecting units, a configuration is conceivable in which incoming direction estimating units are added on the output side of the plural coherent integrators of the respective range gates. In this configuration, it is necessary to perform incoming direction estimation processing for every combination from the plural coherent integrators and the plural non-coherent integrators, resulting in increase of the circuit scale of the radar device.

Another configuration is conceivable in which incoming direction estimating units are added downstream of the plural threshold detectors of the respective range gates. Where threshold judgment results of the respective threshold detectors are used, it is not estimate an incoming direction for a signal that is smaller than a threshold. However, it is difficult to judge in advance the threshold of what detector among the plural detectors will be satisfied by a reception signal. Incoming directions can be estimated on the basis of detection results of the threshold detectors by storing output data of the plural respective coherent integrators in a memory. In this case, a prescribed increase occurs in the memory capacity and, in addition, the processing delay to acquisition of a result of incoming direction estimation processing is increased.

The present invention has been made in the above circumstances in the art, and an object of the present invention is to provide a radar device in which the coherent integration gain or the non-coherent gain is increased by a simple configuration irrespective of the spread of a Doppler spectrum included in reflection waves coming from a target(s).

Means for Solving the Problems

The invention provides a radar device comprising a radar transmitter that converts a transmission signal into a high-frequency transmission signal and transmits the high-frequency transmission signal from a transmission antenna; and a radar receiver that estimates incoming direction of reflection waves which are produced as a result of reflection, by a target, of the high-frequency transmission signal on the basis of the reflection waves using plural reception antennas, the radar receiver including plural antenna system processors each of which performs coherent integration on the basis of correlation values between a reception signal and the transmission signal using correction amounts for phase variations corresponding to plural different Doppler frequencies; plural correlation matrix generators that generate, for each of the plural different Doppler frequencies, correlation matrices which are pieces of phase difference information relating to an arrangement of the plural reception antennas on the basis of sets of outputs of the coherent integration, respectively; an adder that adds together outputs of the plural correlation matrix generators; and an incoming direction estimator that estimates the incoming direction of the reflection waves coming from the target on the basis of outputs of the adder.

The invention provides a radar device comprising a radar transmitter that converts a transmission signal into a high-frequency transmission signal and transmits the high-frequency transmission signal from a transmission antenna; and a radar receiver that estimates an incoming direction of reflection waves which are produced as a result of reflection, by a target, of the high-frequency transmission signal on the basis of the reflection waves using plural reception antennas, the radar receiver including plural antenna system processors each of which performs coherent integration of a first integration number and coherent integration of a second integration number on the basis of correlation values between a reception signal and the transmission signal using correction amounts for phase variations corresponding to plural different Doppler frequencies; plural correlation matrix generators that generate, for each of the plural different Doppler frequencies, correlation matrices which are pieces of phase difference information relating to an arrangement of the plural reception antennas on the basis of an output of the coherent integration of the first integration number and an output of the coherent integration of the second integration number, respectively; an adder for adding together, for each of the plural different Doppler frequencies, outputs of the plural correlation matrix generators; and an incoming direction estimator that estimates an incoming direction of the reflection waves coming from the target on the basis of outputs of the adder.

The invention provides a radar device comprising a radar transmitter that converts a transmission signal into a high-frequency transmission signal and transmits the high-frequency transmission signal from a transmission antenna; and a radar receiver that estimates an incoming direction of reflection waves which are produced as a result of reflection, by a target, of the high-frequency transmission signal on the basis of the reflection waves using plural reception antennas, the radar receiver including plural antenna system processors each of which performs coherent integration on the basis of correlation values between a reception signal and the transmission signal using correction amounts for phase variations corresponding to plural different Doppler frequencies; plural correlation matrix generators that generate, for each of the plural different Doppler frequencies, correlation matrices which are pieces of phase difference information relating to an arrangement of the plural reception antennas on the basis of plural outputs of the coherent integration; a peak Doppler frequency detector that detects a Doppler spread in a prescribed frequency range including a Doppler frequency which maximizes a coherent integration gain on the basis of an output of one of the plural correlation matrix generators; an output selector for selecting a correlation matrix corresponding to the Doppler frequency which maximizes the coherent integration gain among the generated correlation matrices according to the Doppler spread; and an incoming direction estimator that estimates the incoming direction of the reflection waves coming from the target on the basis of an output of the output selector.

The invention provides a radar device comprising a radar transmitter that converts a transmission signal into a high-frequency transmission signal and transmits the high-frequency transmission signal from a transmission antenna; and a radar receiver that estimates a distance to a target on the basis of reflection waves which are produced as a result of reflection, by the target, of the high-frequency transmission signal, the radar receiver including an antenna system processor that performs coherent integration on the basis of correlation values between a reception signal and the transmission signal using correction amounts for phase variations corresponding to plural different Doppler frequencies; plural non-coherent integrators that performs non-coherent integration for each of the plural different Doppler frequencies on the basis of sets of outputs of the coherent integration, respectively; an adder that adds together outputs of the plural non-coherent integrators; and a distance estimator that estimates a distance to the target on the basis of outputs of the adder.

The invention provides a radar device comprising a radar transmitter that converts a transmission signal into a high-frequency transmission signal and transmits the high-frequency transmission signal from a transmission antenna; and a radar receiver that estimates a distance to a target on the basis of reflection waves which are produced as a result of reflection, by the target, of the high-frequency transmission signal, the radar receiver including an antenna system processor that performs coherent integration of a first integration number and coherent integration of a second integration number on the basis of correlation values between a reception signal and the transmission signal using correction amounts for phase variations corresponding to plural different Doppler frequencies; plural non-coherent integrators that performs non-coherent integration for each of the plural different Doppler frequencies on the basis of outputs of the coherent integration of the first integration number and outputs of the coherent integration of the second integration number, respectively; an adder that adds together, for each of the plural different Doppler frequencies, outputs of the plural non-coherent integrators; and a distance estimator that estimates a distance to the target on the basis of outputs of the adder.

The invention provides a radar device comprising a radar transmitter that converts a transmission signal into a high-frequency transmission signal and transmits the high-frequency transmission signal from a transmission antenna; and a radar receiver that estimates a distance to a target on the basis of reflection waves which are produced as a result of reflection, by the target, of the high-frequency transmission signal, the radar receiver including an antenna system processor that performs coherent integration on the basis of correlation values between a reception signal and the transmission signal using correction amounts for phase variations corresponding to plural different Doppler frequencies; plural non-coherent integrators that performs non-coherent integration for each of the plural different Doppler frequencies on the basis of sets of outputs of the coherent integration, respectively; a peak Doppler frequency/Doppler spread detector that detects a Doppler spread in a prescribed frequency range including a Doppler frequency that maximizes a coherent integration gain on the basis of an output of one of the plural non-coherent integrators; an output selector that selects a non-coherent integration output corresponding to the Doppler frequency that maximizes the coherent integration gain among generated non-coherent integration outputs according to the Doppler spread; and a distance estimator that estimates a distance to the target on the basis of an output of the output selector.

Advantageous Effects of the Invention

The invention can increase the coherent integration gain irrespective of the spread of a Doppler spectrum included in reflection waves coming from a target(s).

BRIEF DESCRIPTION OF THE DRAWINGS

FIG. 1 is a block diagram showing the internal configuration of a radar device according to a first embodiment in a simplified manner.

FIG. 6 is a block diagram showing the internal configuration of a radar device according to a first modification of the first embodiment in detail.

FIG. 10 is a block diagram showing the internal configuration of the radar device according to the second embodiment in detail.

FIG. 11 is a block diagram showing the internal configuration of a radar device according to a first modification of the second embodiment in detail.

FIG. 12 is a block diagram showing the internal configuration of a radar device according to a third embodiment in a simplified manner.

FIG. 14 is a block diagram showing the internal configuration of a radar device according to a fourth embodiment in a simplified manner.

FIG. 15 is a block diagram showing the internal configuration of the radar device according to the fourth embodiment in detail.

FIG. 16 is a block diagram showing the internal configuration of a radar device according to a first modification of the fourth embodiment in detail.

MODE FOR CARRYING OUT THE INVENTION

Figure 2:
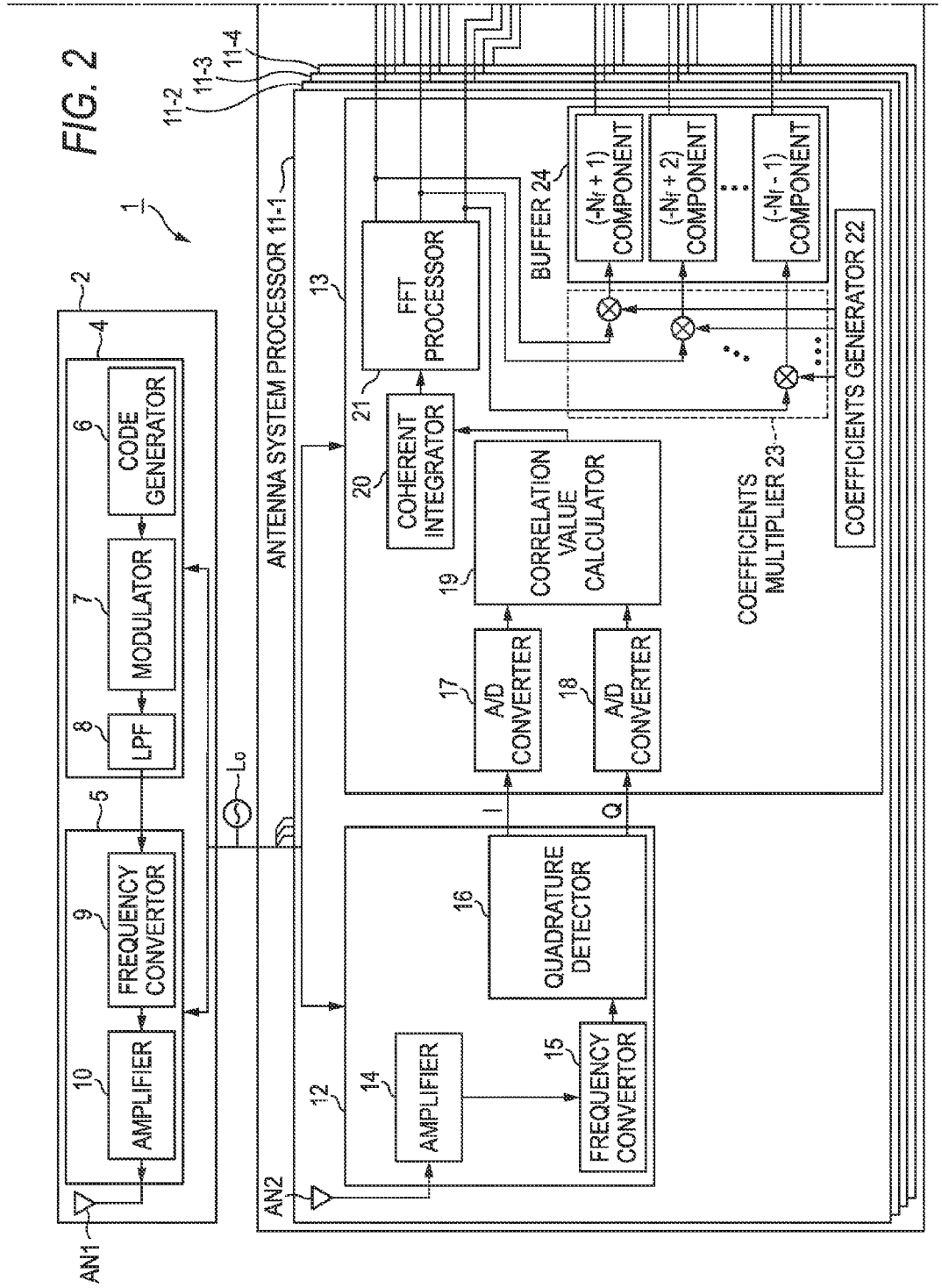
FIG. 2 is a block diagram showing the internal configuration of the radar device according to the first embodiment in detail.

Before the description of radar device according to respective embodiments of the present invention, each of the pulse compression and the complementary code which are techniques as bases of each of the following embodiments will be described briefly.

(Pulse Compression)

First, the pulse compression will be described. For example, pulse compression radars are known which transmit a high-frequency transmission signal using a pulse compression code which includes at least one of a Baker code, an M-series code, and a complementary code as a pulse wave or a pulse modulation wave having the above-described low sidelobe characteristic.

In the pulse compression, first, a radar device transmits a signal having a great pulse width equivalently by pulse-modulating or phase-modulating plural pulse signals generated using an above-kind of pulse compression code. Then, in signal processing performed after reception of reflection waves coming from a target, the radar device demodulates a reception signal, and converts (compresses) the reception signal into a signal having a narrow pulse width like the original signal and calculates correlation values by determining a correlation with the pulse compression code used in the transmission. The pulse compression increases the reception power equivalently, elongates the target detection distance, and, furthermore, increases the detection distance estimation accuracy.

(Complementary Code)

Next, the complementary code will be described. The complementary code is a code which uses plural (e.g., a pair of) complementary code sequences $(a_n, b_n)$ (parameter n=1, 2, . . . , L). The complementary code has a property that range sidelobes are made zero by adding together autocorrelation calculation results, equalized in a delay time $\tau(s)$, of one complementary code sequence $a_n$ and the other complementary code sequence $b_n$. The parameter L represents a code sequence length or merely a code length.

A complementary code generating method is disclosed in the following Non-patent document 1, for example:

(Non-patent document 1) Budisin, S. Z., "New Complementary Pairs of Sequences," Electron. Lett., 26, (13), pp. 881-883 (1990).

Between the complementary code sequences $(a_n, b_n)$, an autocorrelation calculation result of the one complementary code sequence $a_n$ is obtained according to Equation (6). An autocorrelation calculation result of the other complementary code sequence $b_n$ is obtained according to Equation (7). The parameter R represents an autocorrelation calculation result. It is assumed that each of the complementary code sequences $a_n$ and $b_n$ is zero for n>L or n<1 (i.e., $a_n=0$ and $b_n=0$ for n>L or n<1). The asterisk * is a complex conjugate operator.

[Formula 6]

$$R_{aa}(\tau) = \sum_{n=1}^{L} a_n a_{n+\tau}^* \quad (6)$$

[Formula 7]

$$R_{bb}(\tau) = \sum_{n=1}^{L} b_n b_{n+\tau}^* \quad (7)$$

The autocorrelation calculation result $R_{aa}(\tau)$ of the complementary code sequence $a_n$ calculated according to Equation (6) has a peak when the delay time (shift time) $\tau$ is equal to 0 and has range sidelobes for the delay time $\tau$ being not equal to 0. Likewise, the autocorrelation calculation result $R_{bb}(\tau)$ of the complementary code sequence $b_n$ calculated according to Equation (7) has a peak when the delay time $\tau$ is equal to 0 and has range sidelobes for the delay time $\tau$ being not equal to 0.

An addition value of the autocorrelation calculation results $R_{aa}(\tau)$ and $R_{bb}(\tau)$ has a peak when the delay time $\tau$ is equal to 0 and has no range sidelobes (i.e., has values 0) for the delay time $\tau$ being not equal to 0. In the following description, a peak that occurs when the delay time $\tau$ is equal to 0 will be referred to as a main lobe. The relationship between the delay time $\tau$ and the main lobe is expressed as Formula (8):

[Formula 8]

$R_{aa}(\tau) + R_{bb}(\tau) \neq 0$, when $\tau = 0$ $R_{aa}(\tau) + R_{bb}(\tau) = 0$, when $\tau \neq 0$ \quad (8)

By virtue of the above autocorrelation characteristic, the complementary code can reduce the peak sidelobe level with a shorter code length. Therefore, a complementary code having a short code length can reduce the reception dynamic range even in the case where a signal in which reflection waves coming from a nearby target and reflection waves coming from a distant target are mixed together is received.

The peak sidelobe ratio of the complementary code using a Baker code or an M-series code having a code length L is given by 20 $\log_{10}(1/L)$ (dB). Therefore, the complementary code can provide a superior range sidelobe characteristic by increasing the code length L.

EMBODIMENTS OF INVENTION

Next, embodiments of the invention will be described with reference to the drawings.

The following description assumes that radar device according to the invention have plural reception antennas for receiving a signal of reflection waves coming from a target. Although configurations having four reception antennas (array antenna) will be described, the invention is not limited to such a case. The four reception antennas may be four reception antenna elements.

Embodiment 1

Figure 3:
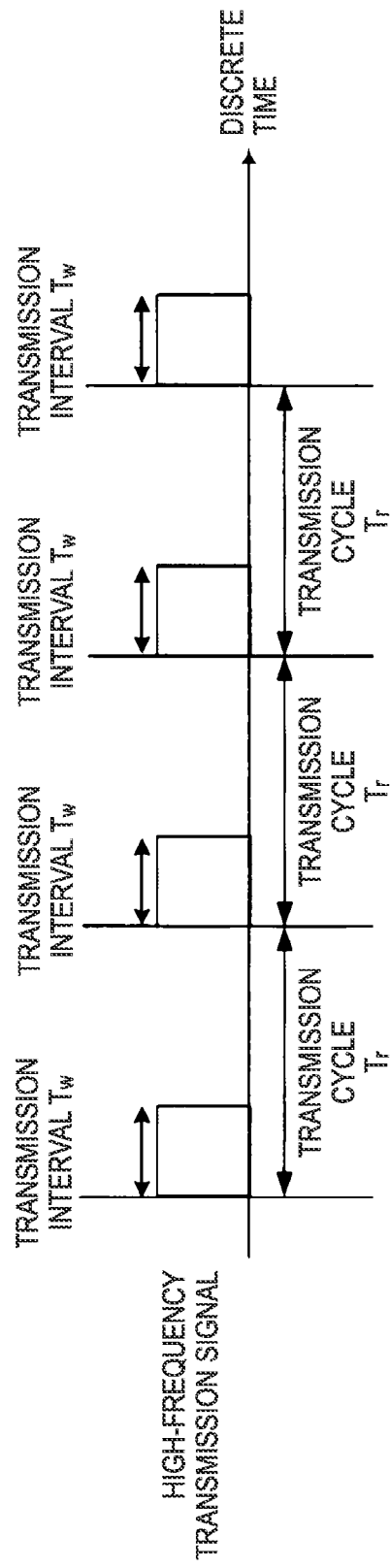
FIG. 3 illustrates a relationship between transmission intervals of high-frequency transmission signals and transmission cycles.
Figure 4:
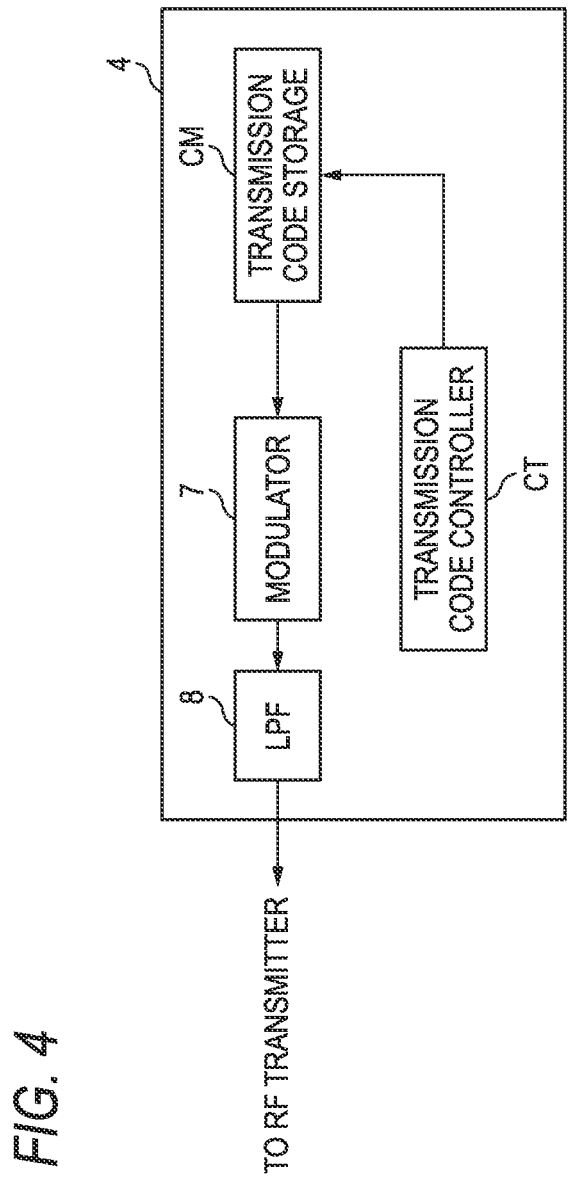
FIG. 4 is a block diagram showing another internal configuration of a transmission signal generator in detail.
Figure 5:
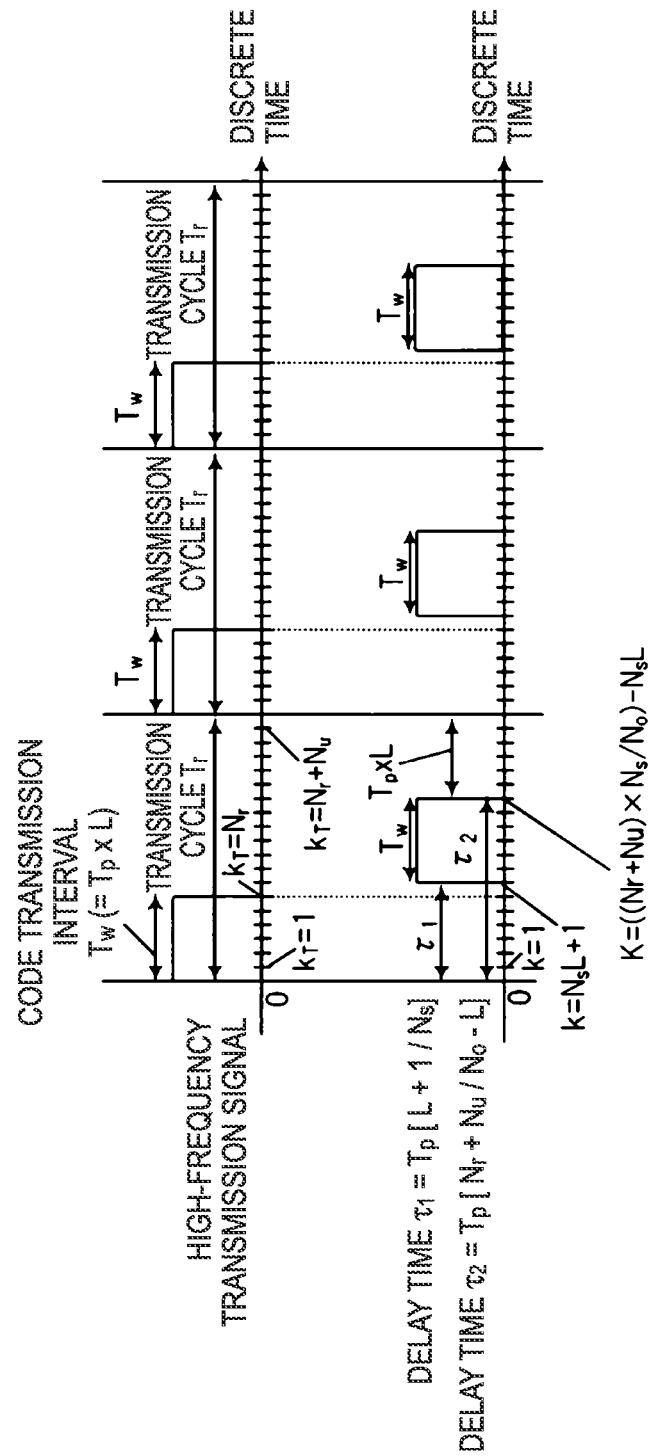
FIG. 5 illustrates a relationship between the transmission intervals of high-frequency transmission signals, the transmission cycles, and measurement ranges.

The configuration and the operation of a radar device 1 according to a first embodiment will be described with reference to FIGS. 1-5. FIG. 1 is a block diagram showing the internal configuration of the radar device 1 according to the first embodiment in a simplified manner. FIG. 2 is a block diagram showing the internal configuration of the radar device 1 according to the first embodiment in detail. FIG. 3 illustrates a relationship between transmission intervals $T_w$ of high-frequency transmission signals and transmission cycles $T_r$. FIG. 4 is a block diagram showing another internal configuration of a transmission signal generator 4 in detail. FIG. 5 illustrates a relationship between the transmission intervals $T_w$ of high-frequency transmission signals, the transmission cycles $T_r$, and measurement ranges.

The radar device 1 transmits (emits) a high-frequency transmission signal generated by a radar transmitter 2 from a transmission antenna AN1. The radar device 1 receives a signal of reflection waves which are a high-frequency transmission signal as reflected by a target(s) with four reception antennas, that is, a reception antenna AN2 and reception antennas AN2 to AN2-4 (not shown; the same applies to the following description) (see FIG. 2). The radar device 1 detects presence/absence of a target(s) by performing signal processing on signals received by the respective reception antennas AN2 to AN2-4.

Each target is an object as a target of detection by the radar device 1 and includes an automobile or a human, for example. This also applies to each of the embodiments described below.

First, the configurations of individual elements of the radar device 1 will be described briefly.

As shown in FIG. 1, the radar device 1 includes the radar transmitter 2 and a radar receiver 3. The radar transmitter 2 has a transmission signal generator 4 and a RF transmitter 5 which is connected to the transmission antenna AN1. The radar transmitter 2 and the radar receiver 3 are connected to a reference signal oscillator $L_o$ and supplied with a signal from the reference signal oscillator $L_o$. The radar transmitter 2 and the radar receiver 3 operate in synchronism with each other.

The radar receiver 3 has D antenna system processors 11-1 to 11-D, a first correlation matrix generator 25, a second correlation matrix generator 26, an adder 27, and an incoming direction estimator 31. The parameter D is a natural number that is larger than or equal to 2. The antenna system processor 11-1 will be described below representatively.

The antenna system processor 11-1 at least has a RF receiver 12 which is connected to the reception antenna AN2, a correlation value calculator 19, a coherent integrator 20, and an FFT processor 21.

(Radar Transmitter)

Next, the configurations of the individual elements of the radar transmitter 2 will be described in detail with reference to FIG. 2.

As shown in FIG. 2, the radar transmitter 2 includes the transmission signal generator 4 and the RF transmitter 5 which is connected to the transmission antenna AN1.

The transmission signal generator 4 includes a code generator 6, a Modulator 7, and an LPF (lowpass filter) 8. Although in FIG. 2 the transmission signal generator 4 includes the LPF 8, the LPF 8 may be provided in the radar transmitter 2 independently of the transmission signal generator 4.

The RF transmitter 5 includes a frequency converter 9 and an amplifier 10.

Next, how the individual elements of the radar transmitter 2 operate will be described in detail.

The transmission signal generator 4 generates a signal by multiplying a reference signal generated by the reference signal oscillator $L_o$ by a prescribed factor. The individual elements of the transmission signal generator 4 operate on the basis of the thus-generated signal. A reference signal generator which generates the reference signal using the reference signal oscillator $L_o$ is not shown.

The transmission signal generator 4 periodically generates a baseband pulse compression signal (transmission signal) $r(k_T, M)$ given by Equation (9) by modulating a code sequence $a_n$ (parameter n=1, 2, ..., L) having a code length L. Parameter L represents the code length of the code sequence $a_n$. The parameter j is the imaginary number unit which satisfies $j^2=-1$.

The baseband transmission signal $r(k_T, M)$ given by Equation (9) represents a transmission signal at a discrete time $k_T$ in an Mth transmission cycle and is an addition result of an in-phase signal component $I_r(k_T, M)$ and a quadrate signal component $Q_r(k_T, M)$ multiplied by the imaginary number unit j.

[Formula 9]

$$r(k_T, M) = I_r(k_T, M) + jQ_r(k_T, M) \quad (9)$$

In, for example, the transmission interval $T_w(s)$ of each transmission cycle $T_r$, the transmission signal generated by the transmission signal generator 4 has $N_o$ samples per pulse code for the code sequence $a_n$ having the code length L. Therefore, each transmission interval $T_w$ shown in FIG. 3 contains $N_r (=N_o \times L)$ samples. In the non-transmission interval $T_r - T_w(s)$ of each transmission cycle $T_r$, the baseband transmission signal includes $N_u$ samples. The parameter $k_T$ is the discrete time.

The code generator 6 generates a transmission code for pulse compression of the code sequence $a_n$ having the code length L every transmission cycle. To exhibit a low range sidelobe characteristic, it is preferable that the transmission code for pulse compression be, for example, a code which includes one of a Baker code and an M-series code in addition to a pair of code sequences constituting a complementary code (described above).

The code generator 6 outputs the generated transmission code of the code sequence $a_n$ to the Modulator 7. In the following description, for the sake of convenience, the transmission code of the code sequence $a_n$ will be written as a transmission code $a_n$.

The code generator 6 generates, as a transmission code $a_n$, a pair of code sequences of a complementary code in transmission cycles Tr in such a manner as to generate a code $P_n$ or $Q_n$ alternately every transmission cycle $T_r$ (each pair of codes $P_n$ and $Q_n$ are generated in two transmission cycles ($2T_r$)).

That is, the code generator 6 generates a code $P_n$ as a pulse compression code $a_n(M)$ in an Mth transmission cycle $T_r$ and generates a code $Q_n$ as a pulse compression code $a_n(M+1)$ in the ensuing, (M+1)th transmission cycle $T_r$. From this time onward, that is, in the (M+2)th and following transmission cycles, the code generator 6 generates codes $P_n$ and $Q_n$ repeatedly using two transmission cycles (Mth transmission cycle and (M+1)th transmission cycle) as a unit.

The Modulator 7 receives the transmission code $a_n$ which is output from the code generator 6. The Modulator 7 generates a baseband transmission signal $r(k_T, M)$ given by Equation (9) by pulse-modulating the received transmission code $a_n$. The pulse modulation is amplitude modulation, ASK (amplitude shift keying), or phase modulation (PSK (phase shift keying)). The Modulator 7 outputs, to the RF transmitter 5, via the LPF 8, a transmission signal $r(k_T, M)$ which is part, in a preset restriction band and lower bands, of the generated transmission signal $r(k_T, M)$.

The RF transmitter 5 generates a signal by multiplying the reference signal generated by the reference signal oscillator $L_o$ by a prescribed factor.

The transmission signal generator 4 and the RF transmitter 5 may generate multiplied signals through multiplication by either different factors or the same factor. The RF transmitter 5 operates on the basis of the multiplied signal.

The frequency converter 9 generates a high-frequency transmission signal in a carrier frequency band by up-converting the transmission signal $r(k_T, M)$ generated by the transmission signal generator 4. The frequency converter 9 outputs the generated high-frequency transmission signal to the amplifier 10.

The amplifier 10 amplifies the high-frequency transmission signal that is output from the frequency converter 9 to a prescribed level, and outputs the amplified high-frequency transmission signal to the transmission antenna AN1. The amplified high-frequency transmission signal is transmitted being emitted to the space from the transmission antenna AN1.

The transmission antenna AN1 transmits the high-frequency transmission signal that is output from the RF transmitter 5 by emitting it to the space. As shown in FIG. 3, the high-frequency transmission signal is transmitted in the transmission intervals $T_w$ of the respective transmission cycles $T_r$ and is not transmitted in the non-transmission internals $T_r - T_w$.

A common signal obtained by multiplying the reference signal generated by the reference signal oscillator $L_o$ by a prescribed factor is supplied to the RF transmitter 5 and RF receivers 12 to 12-4 (not shown; the same applies to the following description) of the respective antenna system processors 11-1 to 11-4. The RF transmitter 5 and the RF receivers 12 to 12-4 operate in synchronism with each other.

It is possible not to provide the above-described code generator 6 in the transmission signal generator 4; instead, as shown in FIG. 4, a transmission code storage CM may be provided which stores, in advance, a transmission code $a_n$ generated by the transmission signal generator 4. Where the transmission signal generator 4 generates a complementary code, it is preferable that a pair of code sequences of a complementary code, for example, a pair of codes $P_n$ and $Q_n$ which are transmitted alternately in transmission cycles, be stored in the transmission code storage CM.

The transmission code storage CM shown in FIG. 4 can not only be applied to the first embodiment but also be applied to each of the following embodiments in the same manner. As shown in FIG. 4, the transmission signal generator 4 includes the transmission code storage CM, a transmission code controller CT, a Modulator 7, and an LPF 8.

As shown in FIG. 4, the transmission code controller CT cyclically reads, from the transmission code storage CM, a transmission code $a_n$ (or transmission codes $P_n$ and $Q_n$ constituting a complementary code) and outputs it to the Modulator 7 every transmission cycle $T_r$ on the basis of a signal obtained by multiplying the reference signal that is output from the reference signal oscillator $L_o$ by a prescribed factor. Ensuing operations will not be described because they are the same as the above-described operations of the Modulator 7 and the LPF 8.

(Radar Receiver)

Next, the configurations of individual elements of the radar receiver 3 will be described in detail with reference to FIG. 2.

The radar receiver 3 has the plural antenna system processors to which the single reception antennas AN2 are connected, respectively, and an array antenna including the plural reception antennas is formed therein. In the radar receiver 3 shown in FIG. 2, the parameter D representing the number of antenna system processors is equal to 4. The parameter D has the same value also in each of radar receivers shown in FIGS. 6-11.

As shown in FIG. 2, the radar receiver 3 includes the four antenna system processors 11-1 to 11-4 which are the same in number as the reception antennas AN2 constituting the array antenna, the first correlation matrix generator 25, the second correlation matrix generator 26, the adder 27, a peak Doppler frequency detector 28, a speed estimator 29, an output selector 30, and the incoming direction estimator 31.

Since the sets of individual elements of the four antenna system processors 11-1 to 11-4 are the same in configuration and operation, in the following description the antenna system processor 11-1 will be described representatively (this also applies to each of the following embodiments). Furthermore, as for the symbols of the individual elements of the antenna system processor 11-1, the RF receiver, for example, is given a symbol "12" instead of "12-1."

The above notation also applies to the individual elements of each of antenna system processors shown in FIGS. 6-11. However, if necessary, when individual elements of another antenna system processor is described, a notation such as "RF receiver 12-2" will be used.

The antenna system processor 11-1 includes the RF receiver 12 which is connected to the reception antenna AN2 and a signal processor 13. The RF receiver 12 includes an amplifier 14, a frequency converter 15, and a quadrature detector 16. The signal processor 13 includes A/D converters 17 and 18, a correlation value calculator 19, a coherent integrator 20, an FFT processor 21, a coefficients generator 22, a coefficients multiplier 23, and a buffer 24. The signal processor 13 operates periodically with each transmission cycle $T_r$ as a signal processing interval.

Next, how the individual elements of the radar receiver 3 operate will be described in detail.

The reception antenna AN2 receives a signal of reflection waves which are produced as a result of reflection, by a target(s), of a high-frequency transmission signal transmitted by the radar transmitter 2. The reception signal received by the reception antenna AN2 is input to the RF receiver 12.

Like the RF transmitter 5, the RF receiver 12 generates a signal by multiplying the reference signal generated by the reference signal oscillator $L_o$ by a prescribed factor. The RF receiver 12 operates on the basis of the generated signal. A reference signal generator which generates the reference signal using the reference signal oscillator $L_o$ is not shown.

The amplifier receives the reception signal in a high-frequency band that is output from the reception antenna AN2, amplifies the level of the reception signal in the high-frequency band, and outputs the amplified reception signal to the frequency converter 15.

The frequency converter 15 receives the amplified reception signal in the high-frequency band that is output from the amplifier 14, down-converting the amplified reception signal in the high-frequency band into a baseband signal, and outputs the down-converted reception signal to the quadrature detector 16.

The quadrature detector 16 receives the baseband reception signal that is output from the frequency converter 15, and generates a baseband reception signal consisting of an in-phase signal and a quadrate signal by quadrature-detecting the received baseband reception signal. The quadrature detector 16 outputs the generated reception signals, that is, the in-phase signal and the quadrate signal, to the A/D converters 17 and 18, respectively.

The A/D converter 17 receives the base band in-phase signal that is output from the quadrature detector 16, and converts the analog in-phase signal into digital data by sampling the base band in-phase signal every discrete time k. The A/D converter 17 outputs the in-phase signal component which is the digital data produced by the conversion done every discrete time k to the correlation value calculator 19 as discrete sample values.

The A/D converter 17 samples the baseband in-phase signal at a rate of $N_s$ per pulse duration $T_p$ ($=T_w/L$) of the transmission signal generated by the transmission signal generator 4. Therefore, the sampling rate of the A/D converter 17 is equal to $N_s/T_p$ and the oversampling number per pulse is equal to $N_s$. Since the A/D converter 17 operates in synchronism with the transmission signal generator 4, the sampling timing of the A/D converter 17 is determined on the basis of a signal that is generated by multiplying the reference signal generated by the reference signal oscillator $L_o$ by a prescribed factor as in the transmission signal generator 4.

In FIGS. 2, 6, and 8-11, input of the reference signal to the A/D converter 17 is omitted.

The A/D converter 18 receives the base band quadrate signal that is output from the quadrature detector 16, and converts the analog quadrate signal into digital data by sampling the base band quadrate signal every discrete time k. The A/D converter 18 outputs the quadrate signal component which is the digital data produced by the conversion done every discrete time k to the correlation value calculator 19 as discrete sample values.

The A/D converter 18 samples the baseband quadrate signal at a rate of $N_s$ per pulse duration $T_p$ ($=T_w/L$) of the transmission signal generated by the transmission signal generator 4. Therefore, the sampling rate of the A/D converter 18 is equal to $N_s/T_p$ and the oversampling number per pulse is equal to $N_s$. Since the A/D converter 18 operates in synchronism with the transmission signal generator 4, the sampling timing of the A/D converter 18 is determined on the basis of a signal that is generated by multiplying the reference signal generated by the reference signal oscillator $L_o$ by a prescribed factor as in the transmission signal generator 4.

In FIGS. 2, 6, and 8-11, input of the reference signal to the A/D converter 18 is omitted.

The RF receiver 12 and the signal processor 13 may use multiplied signals that are generated through multiplication by either different factors or the same factor.

In the following description, a transmission signal at a discrete time $k_T$ in an Mth transmission cycle that is generated through the conversion by the A/D converters 17 and 18 is expressed as a complex signal x(k, M) which is given by Equation (10) using an in-phase signal component I(k, M) and a quadrate signal component Q(k, M). This also applies to each of the following embodiments. In Equation (10), j is the imaginary number unit.

The parameter $k_T$ represents timing of generation of a baseband transmission signal by the Modulator 7. As shown in the first stage of FIG. 5, a discrete time $k_T$ being equal to 0 means a start time of each transmission cycle $T_r$. A discrete time $k_T$ being equal to $N_r$ means an end time of the transmission interval $T_w$ of each transmission cycle $T_r$. Furthermore, a discrete time $k_T$ being equal to $N_r+N_u$ means a time point that is immediately before the end of each transmission cycle $T_r$.

The parameter k represents timing of sampling by the A/D converters 17 and 18. As shown in the second stage of FIG. 5, a discrete time k being equal to 0 means a start time of each transmission cycle $T_r$. A discrete time k being equal to $N_s \times L = N_s \times (N_r/N_o)$ means an end time of the transmission interval $T_w$ of each transmission cycle $T_r$. Furthermore, a discrete time k being equal to $(N_r+N_u) \times (N_s/N_o)$ means a time point that is immediately before the end of each transmission cycle $T_r$.

The discrete time k is counted to the sampling point (k= $(N_r+N_u) \times (N_s/N_o)$) that is immediately before the end of an Mth radar transmission cycle $T_r$ with the start time (k=0) of the Mth radar transmission cycle $T_r$ as a reference, and is reset to the reference value (k=0) at the start time of the ensuing, (M+1)th radar transmission cycle $T_r$. That is, each of the A/D converters 17 and 18 counts the discrete time periodically in synchronism with the transmissions in the respective transmission cycles $T_r$.

Thus, each of the A/D converters 17 and 18 performs sampling periodically at discrete time points from k=0 to k=$(N_r+N_u) \times (N_s/N_o)$. This range of the discrete time k also applies to each of the following embodiments.

[Formula 10]

$$x(k,M)=I(k,M)+jQ(k,M) \quad (10)$$

The correlation value calculator 19 periodically generates the pulse compression code $a_n(M)$ (parameter n=1, 2, ..., L) having the code length L which is transmitted in an Mth transmission cycle $T_r$. The parameter L represents the code length.

The correlation value calculator 19 calculates a correlation value AC(k, M) between the generated pulse compression code $a_n(M)$ and sets of discrete sample values x(k, M) that are output from the respective A/D converters 17 and 18. The correlation values AC(k, M) is a correlation value at the discrete time k in the Mth transmission cycle $T_r$.

More specifically, the correlation value calculator 19 calculates correlation values AC(k, M) according to Equation (11) in each transmission cycle $T_r$ (see FIG. 5), that is, at discrete times k=1 to $(N_r+N_u) \times (N_s/N_o)$. The correlation value calculator 19 outputs the calculated correlation values AC(k, M) to the coherent integrator 20. The asterisk * as a right-side superscript is a complex conjugate operator.

A transmission timing chart of high-frequency transmission signals is shown in the first stage of FIG. 5, and a reception timing chart of signals of reflection waves is shown in the second stage of FIG. 5. Reflection waves are waves which are produced by reflection, by a target, of a high-frequency transmission signal transmitted in a transmission interval $T_w$.

[Formula 11]

$$AC(k, m) = \sum_{n=1}^{L} x(k + N_s(n-1), M) a_n^*(M) \quad (11)$$

The correlation value calculator 19 performs calculations at discrete times k=1 to $(N_r+N_u) \times (N_s/N_o)$. The measurement range (k range) may be narrowed to, for example, k=$N_sL+1$ to $\{(N_r+N_u) \times (N_s/N_o) - N_sL\}$ depending on the range of presence of a target which is a subject of measurement of the radar device 1.

As shown in the second stage of FIG. 2, the discrete time k=$N_sL+1$ means a discrete time that is next to the end time of each transmission interval. The discrete time k=$N_sL+1$ is a start time of reception of a signal of reflection waves that is delayed by approximately a delay time $\tau_1$ from the discrete time k=0. The delay time $\tau_1$ is given by Equation (12):

[Formula 12]

$$\tau_1 = T_p \times \left( \frac{L+1}{N_s} \right) \quad (12)$$

As shown in the second stage of FIG. 5, the discrete time k=$\{(N_r+N_u) \times (N_s/N_o) - N_sL\}$ is a time point that precedes the end time of each transmission cycle $T_r$ by the transmission interval $T_w (=T_p \times L)$. The discrete time k=$\{(N_r+N_u) \times (N_s/N_o) - N_sL\}$ is a start time of reception of a signal of reflection waves that is delayed by approximately a delay time $\tau_2$ from the discrete time k=0. The delay time $\tau_2$ is given by Equation (13):

[Formula 13]

$$\tau_2 = T_p \times \left[ \frac{N_r + N_u}{N_o} - L \right] \quad (13)$$

The correlation value calculator 19 may calculate correlation values AC(k, M) at least in the discrete time range of k=$N_sL+1$ to $\{(N_r+N_u) \times (N_s/N_o) - N_sL\}$. This allows the radar device 1 to reduce the calculation amount of the correlation value calculator 19. That is, the radar device 1 can reduce its power consumption through reduction of the calculation amount of the signal processor 13. The same is true of each of the other antenna system processors 11-2 to 11-4.

Furthermore, where the range of the discrete time k is restricted, in the radar device 1, each transmission interval $T_w$ of a high-frequency transmission signal is out of a target measurement range. Therefore, even if the high-frequency transmission signal goes around into the radar receiver 3 directly, its influence can be eliminated.

Where the measurement range (the range of the discrete time k) is restricted, the operation ranges of the coherent integrator 20, the FFT processor 21, the coefficients generator 22, the coefficients multiplier 23, the buffer 24, the first correlation matrix generator 25, the second correlation matrix generator 26, the adder 27, the peak Doppler frequency detector 28, the speed estimator 29, the output selector 30, and the incoming direction estimator 31 (described later) are also restricted so as to equal to the restricted measurement range.

The coherent integrator 20 performs coherent integration of an integration number $N_p$ according to Equation (14) on the basis of correlation values AC(k, $N_p(m-1)+u$) calculated at respective discrete times k in a period $(T_r \times N_p)$ of plural ($N_p$) transmission cycles $T_r$.

The parameter $N_p$ represents the number of times of integration of the coherent integration performed by the coherent integrator 20. The parameter m is a natural number indicating the position of each of the transmission cycles $T_r$. The parameter u is a natural number of 1 to $N_p$ indicating the coherent integration range of the coherent integrator 20.

[Formula 14]

$$CI(k, m) = \sum_{u=1}^{N_p} AC(k, N_p(m-1) + u) \quad (14)$$

That is, the coherent integrator 20 adds together correlation values from a correlation value AC(k, $N_p(m-1)+1$) calculated in the $\{N_p(m-1)+1\}$th transmission cycle $T_r$ to a correlation value AC(k, $N_p \times m$) calculated in the $(N_p \times m)$th transmission cycle $T_r$ by equalizing their discrete times k. The coherent integrator 20 outputs the coherent integration result CI(k, m) of the integration number $N_p$ to the FFT processor 21.

In the radar device 1, the coherent integration by the coherent integrator 20 makes it possible to increase the SNR in a range where reception signals of reflection waves coming from a target produce large correlation values in the coherent integration range (time range) of $N_p$ times of integration, to thereby increase the accuracy of estimation of an incoming direction of reflection waves. Furthermore, the radar device 1 can increase the accuracy of estimation of a distance to a target.

The FFT processor 21 corrects for respective phase variations corresponding to $(2N_f-1)$ different Doppler frequency components $f_s$ on the basis of $N_c$ coherent integration results $CI(k, N_c(w-1)+1)$ to $CI(k, N_c \times w)$ obtained in a period $(T_r \times N_p \times N_c)$ of plural $(N_p \times N_c)$ transmission cycles $T_r$ (see Equation (15)). Then, the FFT processor 21 performs coherent integration of an integration number $N_c$ (see Equation (16)). The FFT processor 21 outputs the coherent integration result of the integration number $N_c$ to the coefficients multiplier 23 and the first correlation matrix generator 25.

The parameter w is a natural number indicating a position of each set of $(N_p \times N_c)$ transmission cycles $T_r$ in the iterations. A w value being equal to 1 means first to $(N_p \times N_c)$th transmission cycles $T_r$.

That is, the FFT processor 21 outputs a coherent integration result every $(N_p \times N_c)$ transmission cycles $T_r$.

In Equation (16), $N_{ant}$ is a number of 1 to D indicating where each antenna system processor stands in the arrangement of the antenna system processors. Furthermore, in Equation (16), the exponential function is a phase variation cancellation amount (correction amount) corresponding to each of $(2N_f-1)$ different Doppler frequency components $f_s$ for canceling out (correcting for) a phase variation that is mixed into reflection waves because of a target movement. The parameter q is a natural number of 1 to $N_c$ indicating the coherent integration range of the FFT processor 21.

[Formula 15]

$$\vartheta(f_s) = 2\pi f_s (T_r \times N_p) \tag{15}$$

[Formula 16]

$$FT\_CI^{Nant}(k, f_s, w) = \sum_{q=1}^{N_c} CI(k, N_c(w-1)+q)\exp(-j2\pi f_s T_r N_p q) \tag{16}$$

$FT\_CI^{Nant}(k, f_s, w)$ is the wth output of the FFT processor 21 and represents the coherent integration result corresponding to the Doppler frequency component $f_s$ at the discrete time k in the $N_{ant}$th antenna system processor. The parameter k is a number of 1 to $\{(N_r+N_u)\times N_s/N_o\}$. The parameter w is a natural number indicating a position of each set of $(N_p \times N_c)$ transmission cycles $T_r$ in the iterations. A w value being equal to 1 means first to $(N_p \times N_c)$th transmission cycles $T_r$. The parameter $f_s$ takes values $-N_f+1, \ldots, 0, \ldots, N_f+1$.

By calculating Equation (16), the FFT processor 21 obtains coherent integration results $FT\_CI^{Nant}(k,-N_f+1,w)$ to $FT\_CI^{Nant}(k,N_f-1,w)$ of the integration number $N_c$ in the respective periods of $T_r \times N_p \times N_c$ which is $N_p \times N_c$ times the transmission cycle $T_r$.

The coherent integration of Equation (16) corresponds to discrete Fourier transform on the output of the coherent integrator 20 with a sampling interval $T_m \times N_p$ and a sampling frequency $f_m = 1/T_m$. The FFT size of the discrete Fourier transform is equal to the integration number $N_c$ of the coherent integration of the FFT processor 21.

The FFT processor 21 can perform the coherent integration of Equation (16) by performing discrete Fourier transform according to Equation (17) for each positive frequency component and performing discrete Fourier transform according to Equation (18) for the corresponding negative frequency component equivalently.

As in understood from Equation (18), the FFT processor 21 can perform discrete Fourier transform for each negative frequency component by changing the sign of the exponent of the exponential function. Or the FFT processor 21 can likewise perform discrete Fourier transform for the negative frequency components by receiving the outputs of the coherent integrators 20 in opposite order in time.

The parameters $N_c$ and $N_f$ are natural numbers that satisfy Formula (19). Where Formula (19) holds, the FFT processor 21 performs zeroing processing $(CI(k, N_c(w-1)+q+1)=0)$ in the range where the parameter q is larger than $N_c$. The FFT processor 21 can perform fast Fourier transform processing by setting the parameter $N_f$ to a power of 2 and thereby reduce the calculation processing amount. The parameter $f_s$ takes values of 0 to $N_f-1$, and the $f_m$th discrete frequency component corresponds to a Doppler frequency component $f_m/N_f$.

[Formula 17]

$$FT\_CI^{Nant}(k, f_s, w) = \sum_{q=0}^{N_f-1} CI(k, N_c(w-1)+q+1)\exp\left(-j\frac{2\pi}{N_f}f_m q\right) \tag{17}$$

[Formula 18]

$$FT\_CI^{Nant}(k, f_s, w) = \sum_{q=0}^{N_f-1} CI(k, N_c(w-1)+q+1)\exp\left(j\frac{2\pi}{N_f}f_m q\right) \tag{18}$$

[Fomula 19]

$$N_f \geq N_c \tag{19}$$

In the first embodiment, since the coherent integrator 20 is provided immediately upstream of the FFT processor 21, a large coherent integration gain can be obtained through replacement of the parameter $N_c$ by the parameter $N_p \times N$, in Equation (2). Furthermore, the FFT size which corresponds to the parameter $N_c$ can be reduced. That is, the FFT size $(N_c)$ can be reduced while a large coherent integration gain is obtained $(N_p \times N_c)$.

However, another configuration is possible in which the coherent integrator 20 is not provided in the signal processor 13 and the FFT processor 21 performs coherent integration on the basis of correlation values $AC(k, M)$ that are output from the correlation value calculator 19 using the parameter $N_p \times N_c$ (FFT size). With this configuration, the radar device 1 can obtain a high frequency resolution in signal processing on a reception signal received by the reception antenna.

A parameter $N_{max}$ is defined here which represents a unit number of transmission cycles $T_r$ in which the coefficients generator 22 generates coefficients. It is preferable that the parameter $N_{max}$ be equal to the least common multiple of $N_p$ and $N_c$ or its integer multiple (see Equation (21)).

In $N_{max}$ transmission cycles $T_r$, the coefficients generator 22 generates coefficients to be used for further performing, for each Doppler frequency component, coherent integration on outputs of the FFT processor 21 of each of the $(2N_f-1)$ different Doppler frequency components $f_s$ which are obtained in respective sets of $(N_p \times N_c)$ transmission cycles $T_r$ (see Equation (20)). The coefficients generator 22 outputs the coefficients for each Doppler frequency component to the coefficients multiplier 23.

The FFT processor 21 produces an output of each Doppler frequency component $f_s$ every $(N_p \times N_c)$ transmission cycles $T_r$. The parameter w takes values $1, \ldots, D_{pc}$, and a wth coefficient is generated for outputs of the FFT processor 21 which are produced from an $\{(N_p \times N_c) \times (w-1)\}$th transmission cycle $T_r$ to an $\{(N_p \times N_c) \times w\}$th transmission cycle $T_r$ among the $N_{max}$ transmission cycles $T_r$. The parameter $f_s$ takes values $-N_f+1, \ldots, 0, \ldots, N_f-1$.

As a result, $D_{pc}$ outputs are obtained in the $N_{max}$ transmission cycles (see Equation (21)).

Each antenna system processor may be configured so as not to include the coefficients generator 22 but to include a table which is stored with coefficients that were generated by the coefficients generator 22. The coefficients multiplier 23 performs multiplication processing (described below) by reading out the coefficient corresponding to the parameter $f_s$ and w from the table.

[Formula 20]

$$\text{coeff\_dop}(f_s, w) = \exp[-j2\pi f_s T_r N_p N_c (w-1)] \qquad (20)$$

[Formula 21]

$$D_{pc} = N_{max}/(N_p \times N_c) \qquad (21)$$

The coefficients multiplier 23 performs a calculation every $N_{max}$ transmission cycles $T_r$. The FFT processor 21 performs a calculation every $(N_p \times N_c)$ transmission cycles $T_r$.

The coefficients multiplier 23 multiplies, for each discrete time k, by a coefficient that is output from the coefficients generator 22, a value $FT\_CI^{Nant}(k, -N_f+1, D_{pc}(z-1)+w)$ that is output from the FFT processor 21 in an $\{(N_p \times (w-1)\}$th transmission cycle $T_r$ to an $\{(N_p \times N_c) \times w\}$th transmission cycle $T_r$ among an $\{N_{max} \times (z-1)\}$th transmission cycle $T_r$ to an $(N_{max} \times z)$th transmission cycle $T_r$ (see Formula (22)). The parameter w takes values of 1 to $D_{pc}$.

The parameter z indicates a zth iteration among iterations of $N_{max}$ transmission cycles $T_r$. The parameter w means a wth iteration in the case where each set of $N_{max}$ transmission cycles $T_r$ is a repetition of $(N_p \times N_c)$ transmission cycles $T_r$.

The coefficients multiplier 23 outputs a multiplication result of Formula (22) to the buffer 24. The parameter $f_s$ takes values $-N_f+1, \ldots, 0, \ldots, N_f-1$.

[Formula 22]

$$FT\_CI^{Nant}(k, f_s, D_{pc}(z-1)+w) \times \text{coeff\_dop}(f_s, w) \qquad (22)$$

The buffer 24 adds together $D_{pc}$ multiplication results that are output from the coefficients multiplier 23 for each discrete time k while the parameter w varies from 1 to $D_{pc}$ in $N_{max}$ transmission cycles $T_r$. The addition of $D_{pc}$ multiplication results by the buffer 24 corresponds to FFT coherent integration of an integration number $D_{pc}(N_p \times N_c)$.

That is, the buffer 24 outputs, to the second correlation matrix generator 26, a coherent integration result given by Equation (23) which is a result of FFT coherent integration performed in an $\{N_{max}(z-1)\}$th transmission cycle $T_r$ to an $(N_{max} \times z)$th transmission cycle $T_r$. The parameter $f_s$ takes values $-N_f+1, \ldots, 0, \ldots, N_f-1$. The parameter z is a natural number.

[Formula 23]

$$Buf_1^{Nant}(k, f_s, z) = \qquad (23)$$

$$\sum_{w=1}^{D_{pc}} FT\_CI^{Nant}(k, f_s, D_{pc}(z-1)+w) \times \text{coeff\_dop}(f_s, w)$$

The first correlation matrix generator 25 receives the coherent integration results $FT\_CI^{Nant}(k, -N_f+1, w)$ to $FT\_CI^{Nant}(k, N_f-1, w)$ that are output from each FFT processor of each of the antenna system processors 11 to 11-4. The first correlation matrix generator 25 generates a correlation matrix $H_{sub}(k, f_s, w)$ for each discrete time k on the basis of the coherent integration results to detect phase differences between the reception antennas in signals of reflection waves coming from a target (see Equation (24)). In Equation (24), the superscript H is a complex conjugate transposition operator. The parameter $f_s$ takes values $-N_f+1, \ldots, 0, \ldots, N_f-1$.

[Formula 24]

$$H_{sub}(k, f_s, w) = \begin{bmatrix} FT\_CI^1(k, f_s, w) \\ FT\_CI^2(k, f_s, w) \\ \vdots \\ FT\_CI^D(k, f_s, w) \end{bmatrix} \begin{bmatrix} FT\_CI^1(k, f_s, w) \\ FT\_CI^2(k, f_s, w) \\ \vdots \\ FT\_CI^D(k, f_s, w) \end{bmatrix}^H \qquad (24)$$

Furthermore, the first correlation matrix generator 25 adds together $D_{pc}$ multiplication results that have been calculated according to Equation (24) on the basis of outputs of the FFT processor 21 in respective sets of $(N_p \times N_c)$ transmission cycles Tr from an $\{N_{max} \times (z-1)\}$th transmission cycle $T_r$ to an $(N_{max} \times z)$th transmission cycle $T_r$ (see Equation (25)). The first correlation matrix generator 25 outputs an addition value $B_0(k, f_s, z)$ to the adder 27 in each set of $\{N_{max} \times (z-1)\}$th to $(N_{max} \times z)$th transmission cycles $T_r$.

[Formula 25]

$$B_0(k, f_s, z) = \sum_{w=1}^{D_{pc}} H_{sub}(k, f_s, D_{pc}(z-1)+w) \qquad (25)$$

The second matrix generator 26 generates a correlation matrix $B_1(k, f_s, z)$ for each discrete time k on the basis of the coherent integration result $Buf_1^{Nant}(k, f_s, z)$ that is output from the buffer of each of the antenna system processors 11 to 11-4, to detect phase differences between the reception antennas in signals of reflection waves coming from a target (see Equation (26)). In Equation (26), the superscript H is a complex conjugate transposition operator.

Alternative processing is as follows. Each buffer is stored with coherent integration results $Buf_1^{Nant}(k, f_s, z-N_z)$ to $Buf_1^{Nant}(k, f_s, z-1)$ of the integration number $N_{max}$ that were generated in past in $(N_z \times N_{max})$ transmission cycles $T_r$. The second correlation matrix generator 26 may generate a correlation matrix $B_1(k, f_s, z)$ using the coherent integration results stored in each buffer. The parameter $N_z$ is a natural number.

More specifically, the second correlation matrix generator 26 generates a correlation matrix $B_1(k, f_s, z)$ for each discrete time k on the basis of the coherent integration results $Buf_1^{Nant}(k, f_s, z-N_z)$ to $Buf_1^{Nant}(k, f_s, z-1)$ of the integration number $N_{max}$ that were generated in $(N_z \times N_{max})$ transmission cycles $T_r$ (see Equation (27)).

Using the coherent integration results that were generated in the past, the second correlation matrix generator 26 generates a correlation matrix with a larger integration number than the first correlation matrix generator 25. Therefore, when the target movement speed is sufficiently low (i.e., the Doppler spread is small), the radar device 1 can increase the SNR by suppressing noise components and thereby increase the accuracy of estimation of an incoming direction of reflection waves coming from a target.

The generation of a correlation matrix using coherent integration results generated in the past can likewise be applied to each of the following embodiments.

The second correlation matrix generator 26 outputs the correlation matrix $B_1(k, f_s, z)$ to the adder 27 and the peak Doppler frequency detector 28 every $N_{max}$ transmission cycles $T_r$.

[Formula 26]

$$B_1(k, f_s, z) = \begin{bmatrix} Buf_1^1(k, f_s, z) \\ Buf_1^2(k, f_s, z) \\ \vdots \\ Buf_1^D(k, f_s, z) \end{bmatrix} \begin{bmatrix} Buf_1^1(k, f_s, z) \\ Buf_1^2(k, f_s, z) \\ \vdots \\ Buf_1^D(k, f_s, z) \end{bmatrix}^H \quad (26)$$

[Formula 27]

$$B_1(k, f_s, z) = \sum_{z_0 = z - N_z}^{z} \begin{bmatrix} Buf_1^1(k, f_s, z) \\ Buf_1^2(k, f_s, z) \\ \vdots \\ Buf_1^D(k, f_s, z) \end{bmatrix} \begin{bmatrix} Buf_1^1(k, f_s, z) \\ Buf_1^2(k, f_s, z) \\ \vdots \\ Buf_1^D(k, f_s, z) \end{bmatrix}^H \quad (27)$$

The first correlation matrix generator 25 may generate a correlation vector according to Equation (28) instead of Equation (24) using, as a reference phase, a phase of a signal received by the reception antenna of one of the plural antenna system processors 11 to 11-4.

[Formula 28]

$$H_{sub}(k, f_s, w) = \begin{bmatrix} FT\_CI^1(k, f_s, w) \\ FT\_CI^2(k, f_s, w) \\ \vdots \\ FT\_CI^D(k, f_s, w) \end{bmatrix} FT\_CI^1(k, f_s, w)^* \quad (28)$$

Furthermore, the second correlation matrix generator 26 may generate a correlation vector according to Equation (29) or (30) instead of Equation (26) or (27) using, as a reference phase, a phase of a signal received by the reception antenna of one of the plural antenna system processors 11 to 11-4. The processing that each correlation matrix generator generates a correlation vector instead of a correlation matrix may likewise be applied to each of the following embodiments.

[Formula 29]

$$B_1(k, f_s, z) = \begin{bmatrix} Buf_1^1(k, f_s, z) \\ Buf_1^2(k, f_s, z) \\ \vdots \\ Buf_1^D(k, f_s, z) \end{bmatrix} Buf_1^1(k, f_s, z)^* \quad (29)$$

-continued

[Formula 30]

$$B_1(k, f_s, z) = \sum_{z_0 = z - N_z}^{z} \begin{bmatrix} Buf_1^1(k, f_s, z) \\ Buf_1^2(k, f_s, z) \\ \vdots \\ Buf_1^D(k, f_s, z) \end{bmatrix} Buf_1^1(k, f_s, z)^* \quad (30)$$

In Equations (28)-(30), the asterisk * as a superscript is a complex conjugate operator. As a result, the radar device 1 can detect, in a simple manner, phase differences between signals, received by the reception antennas, of reflection waves coming from a target.

The adder 27 adds together the output of the first correlation matrix generator 25 and the output of the second correlation matrix generator 26 according to Equation (31).

More specifically, the adder 27 adds together the correlation matrix $B_0(k, f_s, z)$ which has been calculated by the first correlation matrix generator 25 for each discrete time k for each of $(2N_f - 1)$ different Doppler frequency components $f_s$ and the correlation matrix $B_1(k, f_s, z)$ which has been calculated by the second correlation matrix generator 26 fort each discrete time k for each of $(2N_f - 1)$ different Doppler frequency components $f_s$.

[Formula 31]

$$A(k, f_s, z) = B_0(k, f_s, z) + B_1(k, f_s, z) \quad (31)$$

The adder 27 may add together the correlation matrices that are output from the respective correlation matrix generators after multiplying them by weighting coefficients α that are proportional to the magnitudes of the sets of diagonal elements of the respective matrices (see Equations (32) and (33)). The adder 27 outputs an addition result of Equation (30) or (31) to the output selector 30.

[Formula 32]

$$A(k, f_s, z) = \alpha_0 B_0(k, f_s, z) + \alpha_1 B_1(k, f_s, z) \quad (32)$$

[Formula 33]

$$\sum_{K=0}^{1} \alpha_K = 1 \quad (33)$$

The peak Doppler frequency detector 28 receives the output of the second correlation matrix generator 26, that is, the correlation matrix $B_1(k, f_s, z)$ which is obtained every $N_{max}$ transmission cycles $T_r$ for each of the $(2N_f - 1)$ different Doppler frequency components $f_s$. The peak Doppler frequency detector 28 selects, for each discrete time k, a Doppler frequency component $f_{select}(k, z)$ corresponding to one, having a maximum coherent integration gain, of the correlation matrices $B_1(k, f_s, z)$.

More specifically, the peak Doppler frequency detector 28 selects, according to Equation (34), a Doppler frequency component $f_{select}(k, z)$ corresponding to a correlation matrix whose sum of the diagonal elements which correspond to average reception power components after coherent integration is largest among the received correlation matrices $B_1(k, f_s, z)$. That is, the peak Doppler frequency detector 28 selects, according to Equation (34), a Doppler frequency component $f_{select}(k, z)$ whose sum of the diagonal elements which correspond to average reception power components after coherent integration is largest. In Equation (34), $\text{diag}[B_1(k, f_s, z)]$ is an operator for calculating the sum of the diagonal elements of the correlation matrix $B_1(k, f_s, z)$.

[Formula 34]

$$f_{select}(k, z) = \left\{ \arg f_s \mid \max_{f_s \in -N_f+1, \ldots, N_f-1} \mathrm{diag}[B_1(k, f_s, z)] \right\} \quad (34)$$

The peak Doppler frequency detector 28 outputs the Doppler frequency component $f_{select}(k, z)$ which has been selected for each discrete time k to the speed estimator 29 and the output selector 30.

If the peak Doppler frequency detector 28 judges that diag $[B_1(k, f_s, z)]$ calculated for a discrete time k is lower than a prescribed level, the incoming direction estimator 31 need not estimate an incoming direction of reflection waves coming from a target for the discrete time k.

Alternatively, if judging that diag$[B_1(k, f_s, z)]$ calculated for a discrete time k is lower than the prescribed level, the peak Doppler frequency detector 28 makes the Doppler frequency component $f_{select}(k, z)$ null. As a result, in the radar device 1, redundant calculations for the discrete time k at which no target is detected are made unnecessary and the processing delay of the radar receiver 3 can thereby be reduced.

The peak Doppler frequency detector 28 selects a Doppler frequency component $f_{select}(k, z)$ on the basis of the outputs of the second correlation matrix generator 26. Alternatively, the peak Doppler frequency detector 28 may select a Doppler frequency component $f_{select}(k, z)$ on the basis of the coherent integration results that are input to the second correlation matrix generator 26, the coherent integration results that are input to the first correlation matrix generator 25, or the correlation matrices that are output from the first correlation matrix generator 25. These options relating to the selection of a Doppler frequency component $f_{select}(k, z)$ by the peak Doppler frequency detector 28 likewise apply to each of the following embodiments.

The speed estimator 29 receives the output of the peak Doppler frequency detector 28, that is, the Doppler frequency component $f_{select}(k, z)$ which is selected for each discrete time k.

The speed estimator 29 outputs a relative movement speed $v_d(k, z)$ of a target measured by the radar receiver 3, on the basis of the Doppler frequency component $f_{select}(k, z)$ selected for each discrete time k (see Equation (35)).

[Formula 35]

$$v_d(k, z) = \frac{\lambda}{2} f_{select}(k, z) \quad (35)$$

In Equation (35), the parameter $\lambda$ is the wavelength of a carrier frequency of high-frequency transmission signals that are transmitted from the radar transmitter 2.

The output selector 30 receives, for each discrete time k, the Doppler frequency $f_{select}(k, z)$ that is output from the peak Doppler frequency detector 28 and the addition results (see Equation (31) or (32)) that are output from the adder 27.

The output selector 30 selects, for each discrete time k, an addition result component $A(k, f_{select}(k, z), z)$ corresponding to the Doppler frequency $f_{select}(k, z)$ from the addition results that are input from the adder 27. The output selector 30 outputs the addition result component $A(k, f_{select}(k, z), z)$ selected for each discrete time k to the incoming direction estimator 31.

The incoming direction estimator 31 estimates an incoming direction of reflection waves coming from a target on the basis of the addition result component $A(k, f_{select}(k, z), z)$ that is output from the output selector 30 for each select discrete time k. The calculation that is performed by the incoming direction estimator 31 to estimate an incoming direction of reflection waves coming from a target is a known technique, and can be realized by using the estimation method using an array antenna which is disclosed in the following Non-patent document 2:

(Non-patent document 2) James A. Cadzow, "Direction of Arrival Estimation Using Signal Subspace Modeling," IEEE, Vol. 28, pp. 64-79 (1992).

In the first embodiment, it was described that the peak Doppler frequency detector 28 selects, for each discrete time k, one Doppler frequency component $f_{select}(k, z)$ that maximizes the coherent integration gain on the basis of the outputs of the second correlation matrix generator 26.

Where plural peak Doppler frequencies are detected, the peak Doppler frequency detector 28 may select g(k, z) Doppler frequency components $f_{selectG}(k, z)$. The parameter G is a natural number of 1 to g(k, z).

The output selector 30 outputs, to the incoming direction estimator 31, addition result components $A(k, f_{selectG}(k, z), z)$ corresponding to the g(k, z) respective Doppler frequency components $f_{selectG}(k, z)$ among the addition results supplied from the adder 27 on the basis of the selection results $f_{selectG}(k, z)$ of the peak Doppler frequency detector 28 for each discrete time k.

The incoming direction estimator 31 estimates incoming directions of reflection waves coming from targets for the g(k, z) respective Doppler frequency components $f_{selectG}(k, z)$ on the basis of the respective addition result components $A(k, f_{selectG}(k, z), z)$ that are output from the output selector 30 for each discrete time k.

As described above, each antenna system processor of the radar device 1 generates a value obtained by performing coherent integration on outputs of the correlation value calculator 19 for each frequency component with the FFT processor 21 and a value that is increased in coherent integration number by performing buffering with the buffer 24 after the coherent integration by the FFT processor 21. Furthermore, in the radar device 1, the first correlation matrix generator 25 and the second correlation matrix generator 26 generate correlation matrices for each frequency components using the plural values that are generated by each antenna system processor and are different from each other in coherent integration number. The adder 27 synthesizes incoming angle information by giving the correlation matrices respective weights that are proportional to the magnitudes of the diagonal elements of correlation matrices.

As a result, in the radar device 1, when the Doppler spread included in reflection waves coming from a target is small, the correlation matrix component that is generated by the second correlation matrix generator through coherent integration of a larger coherent integration number becomes dominant in the output of the adder because the FFT coherent integration effect of the integration number $D_{pc}(N_p \times N_c)$ is obtained by the buffer 24. Thus, an incoming angle can be estimated using a signal generated with a larger coherent integration gain.

On the other hand, when the Doppler spread included in reflection waves coming from a target is large, the correlation matrix component that is generated by the second correlation matrix generator through coherent integration of a larger coherent integration number is influenced by saturation of the coherent integration gain and becomes roughly the same in magnitude as the correlation matrix component that is generated by the first correlation matrix generator through coherent integration of a smaller coherent integration number.

Therefore, a correlation matrix as an output of the adder is synthesized by weighting, approximately equally, the correlation matrix component that is the output of the first correlation matrix generator and the correlation matrix component that is the output of the second correlation matrix generator. However, since the noise components contained in the two respective correlation matrices have no correlation, an incoming angle can be estimated with a non-coherent integration effect which suppresses the noise components.

As a result, in the radar device 1, the accuracy of estimation of an incoming direction of reflection waves can be increased by increasing the coherent integration gain or the non-coherent gain with a simple configuration irrespective of the spread of a Doppler spectrum included in reflection waves coming from a target.

Modification 1 of Embodiment 1

In the first embodiment, the peak Doppler frequency detector outputs a Doppler frequency $f_{select}(k, z)$ that maximizes the coherent integration gain to the output selector for each discrete time.

In a first modification of the first embodiment, a peak Doppler frequency detector outputs a Doppler frequency $f_{select}(k, z)$ that maximizes the coherent integration gain to an adder for each discrete time.

FIG. 6 is a block diagram showing the internal configuration of a radar device 1r according to the first modification of the first embodiment in detail. The radar device 1r according to the first modification of the first embodiment is the same in configuration and operation as the radar device 1 according to the first embodiment except for an adder 27r, a peak Doppler frequency detector 28r, and an output selector 30r, and the same elements will not be described below. The elements that are different than in the radar device 1 according to the first embodiment will be described below.

The peak Doppler frequency detector 28r outputs information of a Doppler frequency component $f_{select}(k, z)$ which has been selected for each discrete time k to the adder 27r and the speed estimator 29.

The adder 27r receives the output of the peak Doppler frequency detector 28r, that is, the Doppler frequency component $f_{select}(k, z)$ which has been selected for each discrete time k. The adder 27r adds together correlation matrices, corresponding to the Doppler frequency component $f_{select}(k, z)$ received for each discrete time k, of sets of correlation matrices that are output from the first correlation matrix generator 25 and the second correlation matrix generator 26 (see Equation (36)). The adder 27r outputs an addition correlation matrix corresponding to the Doppler frequency component $f_{select}(k, z)$ to the output selector 30r for each discrete time k.

[Formula 36]

$$A(k, f_{select}(k,z), z) = \alpha_0 B_0(k, f_{select}(k,z), z) + \alpha_1 B_1(k, f_{select}(k,z), z) \quad (36)$$

The output selector 30r outputs, to the incoming direction estimator 31, the correlation matrix received from the adder 27r. In the first modification of the first embodiment, the radar device 1r may be configured so as not to include the output selector 30r. In this case, in the radar device 1r, the processing delay can be reduced by the one caused by the output selector 30r.

If the peak Doppler frequency detector 28r judges that $\text{diag}[B_1(k, f_s, z)]$ calculated for a discrete time k is lower than a prescribed level, The adder 27r need not perform addition processing.

With this measure, in the radar device 1, redundant calculations for the discrete time k at which no target is detected are made unnecessary and the processing delay of the radar receiver 3 can thereby be reduced.

Modification 2 of Embodiment 1

In a second modification of the first embodiment, a second buffer which performs coherent integration in each of plural transmission intervals $N_{sub}$ obtained by dividing the parameter $N_{max}$ is added to the signal processor 13 of the radar device 1 according to the first embodiment.

Furthermore, in the second modification of the first embodiment, a third correlation matrix generator which generates a correlation matrix on the basis of outputs of the second buffer is also added to the radar receiver 3 of the radar device 1 according to the first embodiment. However, the parameters $N_{max}$, $N_{sub}$, and $N_c$ are natural numbers which satisfy Formula (37). Furthermore, it is preferable that $N_{max}/N_{sub}$ be an integer.

[Formula 37]

$$N_{max} > N_{sub} > N_c \quad (37)$$

Figure 7:
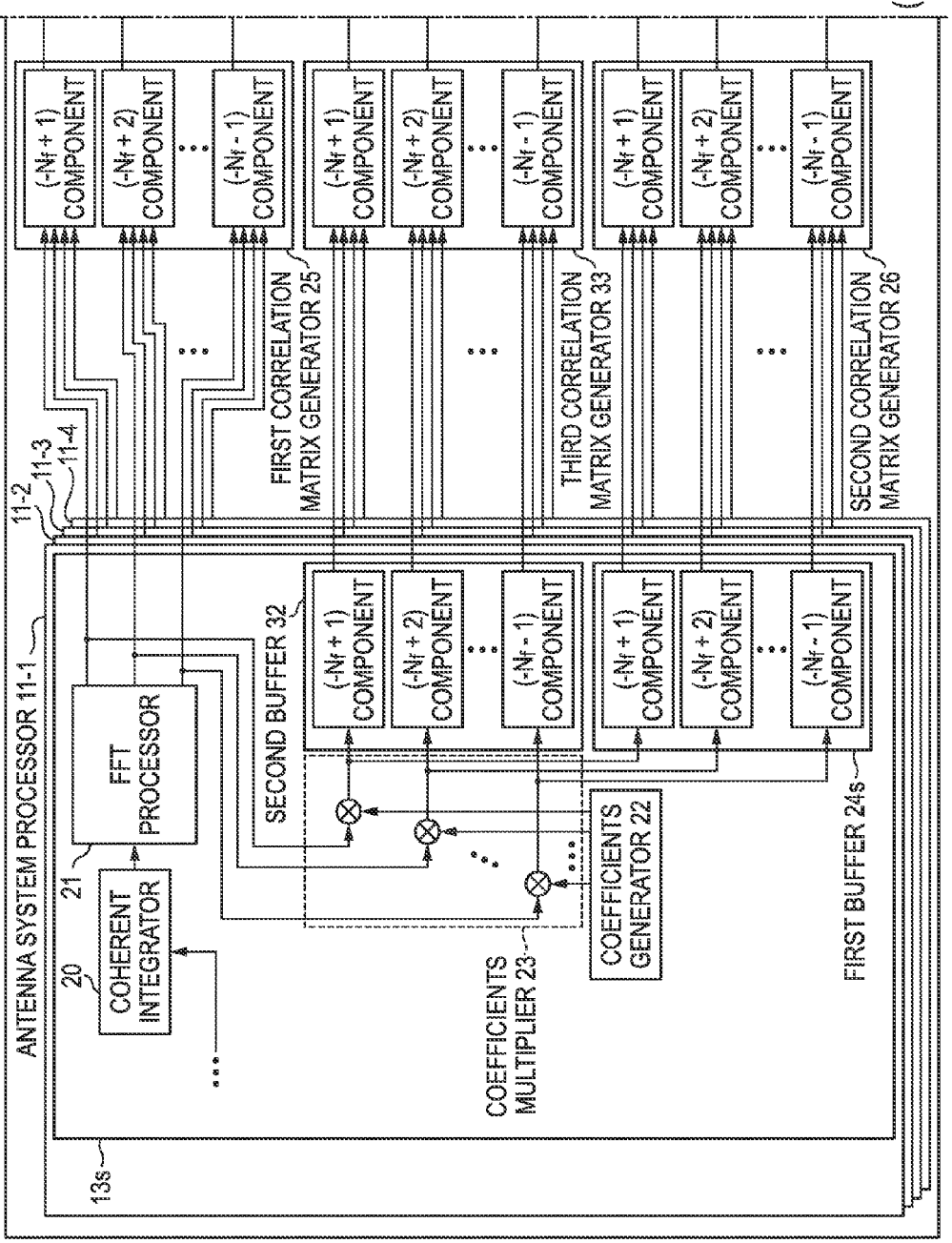
FIG. 7 is a block diagram showing the internal configuration of a radar device according to a second modification of the first embodiment in detail.

FIG. 7 is a block diagram showing the internal configuration of a radar device is according to the second modification of the first embodiment in detail. Those blocks of the radar device 1s which are the same in configuration and operation as the corresponding blocks of the radar device 1 according to the first embodiment are given the same reference symbols as the latter. In the configuration of the radar device 1s, the elements from the radar transmitter 2 and the reference signal oscillator $L_o$ to the coherent integrator 20 of a radar receiver 3s are the same as in the radar device 1 according to the first embodiment and hence are not shown.

In the following description of the configuration and the operation of the radar device 1s, the elements that are the same in configuration and operation as in the radar device 1 will not be described and the elements that are the same in configuration and operation as in the radar device 1 will be described.

As shown in FIG. 7, the radar device 1s includes the radar transmitter 2 which is connected to the transmission antenna AN1 and a radar receiver 3s having antenna system processors 11-1 to 11-4 which are connected to the respective antennas AN2 to AN2-4. The radar transmitter 2 and the radar receiver 3s are connected to the reference signal oscillator $L_o$ (not shown) and supplied with a signal from the reference signal oscillator $L_o$, and hence can operate in synchronism with each other.

(Radar Receiver)

Next, the individual elements of the radar receiver 3s will be described. For example, four array antennas are formed in the radar receiver 3s as in the radar device 1 according to the first embodiment. Furthermore, as in the radar device 1 according to the first embodiment, the reception antennas constituting the array antenna are connected to the respective antenna system processors.

The radar receiver 3s has the plural antenna system processors to which the single reception antennas are connected, respectively, and the array antenna including the plural reception antennas is formed therein.

Next, the configurations of the individual elements of the radar receiver will be described with reference to FIG. 7.

As shown in FIG. 7, the radar receiver 3s includes the four antenna system processors 11-1 to 11-4 which are the same in number as the reception antennas constituting the array antenna, the first correlation matrix generator 25, the second correlation matrix generator 26, a third correlation matrix generator 33, the adder 27s, the peak Doppler frequency detector 28, the speed estimator 29, the output selector 30, and the incoming direction estimator 31.

Each antenna system processor includes the RF receiver 12 which is connected to the reception antenna AN2 and a signal processor 13s. The RF receiver 12 includes the amplifier 14, the frequency converter 15, and the quadrature detector 16. The signal processor 13s includes the A/D converters 17 and 18, the correlation value calculator 19, the coherent integrator 20, the FFT processor 21, the coefficients generator 22, the coefficients multiplier 23, a first buffer 24s, and a second buffer 32. The signal processor 13s operates periodically with each transmission cycle $T_r$ as a signal processing interval.

In FIG. 7, the buffer 24 shown in FIG. 2 is written as the first buffer 24s and hence the latter operates in the same manner as the former. In FIG. 7, the adder 27s and peak Doppler frequency detector 28s operate differently from the corresponding elements used in the first embodiment.

As shown in FIG. 7, multiplication results of outputs of the coefficients multiplier 23 are supplied to the first buffer 24s and the second buffer 32. Outputs of the FFT processor 21 that are produced in an $\{(N_p \times N_c) \times (w-1)\}$th transmission cycle $T_r$ to an $\{(N_p \times N_c) \times w\}$th transmission cycle $T_r$ among an $\{N_{max} \times (z-1)\}$th transmission cycle $T_r$ to an $(N_{max} \times z)$th transmission cycle $T_r$ and coefficients that are output from the coefficients generator 22 are input to the second buffer 32.

The second buffer 32 adds together $D_{pc\_sub}$ multiplication results that are output, for each discrete time k, from the coefficients multiplier 23 in a period when the parameter w varies from 1 to $D_{pc\_sub}$ in each set of $N_{max}$ transmission cycles $T_r$. The parameter $D_{pc\_sub}$ is given by Equation (38).

The addition of $D_{pc\_sub}$ multiplication results by the second buffer 32 corresponds to coherent integration of an integration number $D_{pc\_sub}$. That is, the second buffer 32 outputs, to the third correlation matrix generator 33, a coherent integration result given by Equation (39) which is a result of Floor[$N_{max}/N_{sub}$] times of coherent integration performed by the second buffer 32 in an $\{N_{max} \times (z-1)\}$th transmission cycle $T_r$ to an $(N_{max} \times z)$th transmission cycle $T_r$.

[Formula 38]

$$D_{pc\_sub} = N_{sub} / (N_p \times N_c) \quad (38)$$

[Formula 39]

$$Buf_2^{Nant}(k, f_s, z, y) = \sum_{w=1}^{D_{pc\_sub}} FT\_CI^{Nant}(k, f_s, D_{pc}(z-1) + D_{pc\_sub}(y-1) + w) \times \exp[-j2\pi f_s T_r N_p N_c (D_{pc\_sub}(y-1) + w - 1)] \quad (39)$$

In Equation (39), the parameter y varies from 1 to Floor[$N_{max}/N_{sub}$]. Floor[$N_{max}/N_{sub}$] is an operator for dropping the fractional portion of a real number $N_{max}/N_{sub}$. Where $N_{max}/N_{sub}$ is not an integer, the second buffer 32 performs addition by adjusting the addition intervals in Equation (39) as appropriate so that they overlap with each other.

The third correlation matrix generator 33 generates a correlation matrix $B_2(k, f_s, z)$ for each discrete time k on the basis of the coherent integration result $Buf_2^{Nant}(k, f_s, z, y)$ that is output from the second buffer of each of the antenna system processors 11 to 11-4, to detect phase differences between the reception antennas in signals of reflection waves coming from a target (see Equation (40)). In Equation (40), the superscript H is a complex conjugate transposition operator.

The third correlation matrix generator 33 outputs a correlation matrix $B_2(k, f_s, z)$ to the adder 27s every $N_{max}$ transmission cycles $T_r$.

[Formula 40]

$$B_2(k, f_s, z) = \sum_{y=1}^{Floor[N_{max}/N_{sub}]} \begin{bmatrix} Buf_2^1(k, f_s, z, y) \\ Buf_2^2(k, f_s, z, y) \\ \vdots \\ Buf_2^D(k, f_s, z, y) \end{bmatrix} \begin{bmatrix} Buf_2^1(k, f_s, z, y) \\ Buf_2^2(k, f_s, z, y) \\ \vdots \\ Buf_2^D(k, f_s, z, y) \end{bmatrix}^H \quad (40)$$

The adder 27s adds together the outputs of the first correlation matrix generator 25, the second correlation matrix generator 26, and the third correlation matrix generator 33 according to Equation (41).

More specifically, the adder 27s adds together the correlation matrices $B_0(k, f_s, z)$, $B_1(k, f_s, z)$, and $B_0(k, f_s, z)$ which have been calculated by the first correlation matrix generator 25, the second correlation matrix generator 26, and the third correlation matrix generator 33, respectively, for each of $(2N_f-1)$ different Doppler frequency components $f_s$ for each discrete time k.

[Formula 41]

$$A(k, f_s, z) = \sum_{K=0}^{2} B_K(k, f_s, z) \quad (41)$$

The adder 27s may add together the correlation matrices that are output from the respective correlation matrix generators after multiplying them by weighting coefficients α that are proportional to the magnitudes of the sets of diagonal elements of the respective matrices (see Equations (42) and (43)). The adder 27s outputs an addition result of Equation (41) or (42) to the output selector 30. The operations performed by the output selector 30 and the following elements are the same as in the radar device 1 according to the first embodiment, and hence will not be described.

[Formula 42]

$$A(k, f_s, z) = \sum_{K=0}^{2} \alpha_K B_K(k, f_s, z) \quad (42)$$

[Formula 43]

$$\sum_{K=0}^{2} \alpha_K = 1 \quad (43)$$

Sets of transmission intervals which correspond to respective numbers smaller than the parameter $N_{sub}$ may be provided by dividing the parameter $N_{max}$, and third, fourth, . . . buffers for coherent integration and fourth, fifth, . . . correlation matrix generators for generating correlation matrices on the basis of outputs of the respective buffers may likewise be provided.

With the above features, the radar device 1s can provide, in addition to the advantages of the radar device 1, an advantage that the accuracy of estimation of an incoming direction of reflection waves having a medium Doppler spread in the case where the Doppler spread which is included in reflection waves coming from a target is relatively large and depends on a phase variation. The concept of the second modification of the first embodiment can likewise be applied to each of the following embodiments.

Modification 3 of Embodiment 1

In a third modification of the first embodiment, an FFT processor operates so as to include the coefficients generator 22 and the coefficients multiplier 23 used in the first embodiment.

Figure 8:
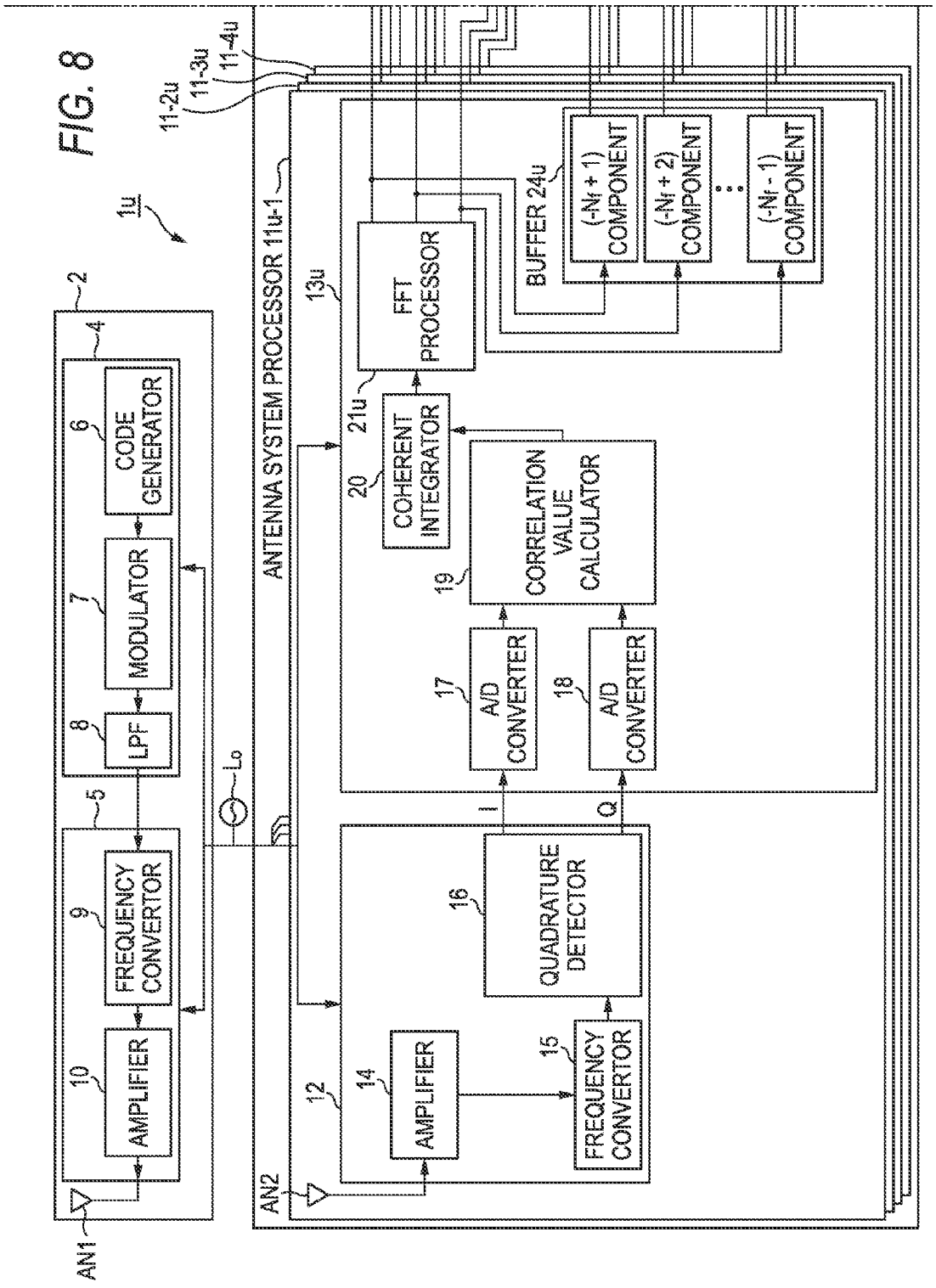
FIG. 8 is a block diagram showing the internal configuration of a radar device according to a third modification of the first embodiment in detail.

FIG. 8 is a block diagram showing the internal configuration of a radar device 1u according to the third modification of the first embodiment in detail. Those blocks of the radar device 1u which are the same in configuration and operation as the corresponding blocks of the radar device 1 according to the first embodiment are given the same reference symbols as the latter. In the following description of the configuration and the operation of the radar device 1u, the elements that are the same in configuration and operation as in the radar device 1 will not be described and the elements that are the same in configuration and operation as in the radar device 1 will be described.

As shown in FIG. 8, the radar device 1u includes the radar transmitter 2 which is connected to the transmission antenna AN1 and a radar receiver 3u having antenna system processors 11u-1 to 11u-4 which are connected to the respective antennas AN2 to AN2-4. The radar transmitter 2 and the radar receiver 3u are connected to the reference signal oscillator $L_o$ and supplied with a signal from the reference signal oscillator $L_o$, and hence can operate in synchronism with each other.

(Radar Receiver)

Next, the individual elements of the radar receiver 3u will be described. For example, four array antennas are formed in the radar receiver 3u as in the radar device 1 according to the first embodiment. Furthermore, as in the radar device 1 according to the first embodiment, the reception antennas constituting the array antenna are connected to the respective antenna system processors.

The radar receiver 3u has the plural antenna system processors to which the single reception antennas are connected, respectively, and the array antenna including the plural reception antennas is formed therein.

Next, the configurations of the individual elements of the radar receiver 3u will be described with reference to FIG. 8.

As shown in FIG. 8, the radar receiver 3u includes the four antenna system processors 11u-1 to 11u-4 which are the same in number as the reception antennas constituting the array antenna, the first correlation matrix generator 25, the second correlation matrix generator 26, the adder 27, the peak Doppler frequency detector 28, the speed estimator 29, the output selector 30, and the incoming direction estimator 31.

Each antenna system processor includes the RF receiver 12 which is connected to the reception antenna AN2 and a signal processor 13u. The RF receiver 12 includes the amplifier 14, the frequency converter 15, and the quadrature detector 16. The signal processor 13u includes the A/D converters 17 and 18, the correlation value calculator 19, the coherent integrator 20, an FFT processor 21u, a buffer 24u. The signal processor 13u operates periodically with each transmission cycle $T_r$ as a signal processing interval.

In FIG. 8, the FFT processor 21u operates differently from the corresponding element used in the first embodiment.

The FFT processor 21u has an FFT size $N_{max}$, and performs FFT processing on $N_c$ coherent integration results CI(k, $N_c$(w−1)+1) to CI(k, $N_c$×w) (a unit of processing) obtained by the coherent integrator 20 at each discrete time k according to Equations (44) and (45) while equalizing their discrete times k through time shifting. It is noted that the FFT processor 21 used in the first embodiment has an FFT size $N_p×N_c$.

A time shift of $N_c$(w−1) is given between outputs of the FFT processor 21u of an $\{(N_p×N_c)×(w−1)\}$th transmission cycle $T_r$ and an $\{(N_p×N_c)×w\}$th transmission cycle $T_r$.

[Formula 44]

$$\text{FT\_CI}^{Nani}(k, f_s, w) = \sum_{q=N_c(w-1)}^{N_{max}-1} CI(k, q+1)\exp\left(-j\frac{2\pi}{N_f}f_m q\right) \quad (44)$$

[Formula 45]

$$\text{FT\_CI}^{Nani}(k, f_s, w) = \sum_{q=N_c(w-1)}^{N_{max}-1} CI(k, q+1)\exp\left(j\frac{2\pi}{N_f}f_m q\right) \quad (45)$$

The buffer 24u adds together $D_{pc}$ multiplication results that are output from the FFT processor 21u for each discrete time k while the parameter w varies from 1 to $D_{pc}$ in $N_{max}$ transmission cycles $T_r$. The addition of $D_{pc}$ multiplication results by the buffer 24u corresponds to coherent integration of an integration number $D_{pc}$. That is, the buffer 24u outputs, to the second correlation matrix generator 26, a coherent integration result given by Equation (46) which is a result of coherent integration performed in an $\{N_{max}×(w-1)\}$th transmission cycle $T_r$ to an ($N_{max}$×w)th transmission cycle $T_r$.

The configurations of the FFT processor 21u and the buffer 24u used in the third modification of the first embodiment can likewise be applied to each of the following embodiments.

[Formula 46]

$$Buf_1^{Nani}(k, f_s, z) = \sum_{w=1}^{D_{pc}} \text{FT\_CI}^{Nani}(k, f_s, D_{pc}(z-1)+w) \quad (46)$$

With the above features, the radar device 1u can provide the same advantages as the radar device 1 according to the first embodiment.

Embodiment 2

In the second embodiment, a peak Doppler frequency detector detects a Doppler spread in a prescribed frequency range centered by a Doppler frequency at which the coherent integration gain is largest. An output selector selects, according to the detected Doppler spread, a correlation matrix generated by one correlation matrix generator as corresponding to one Doppler frequency component.

Figure 9:
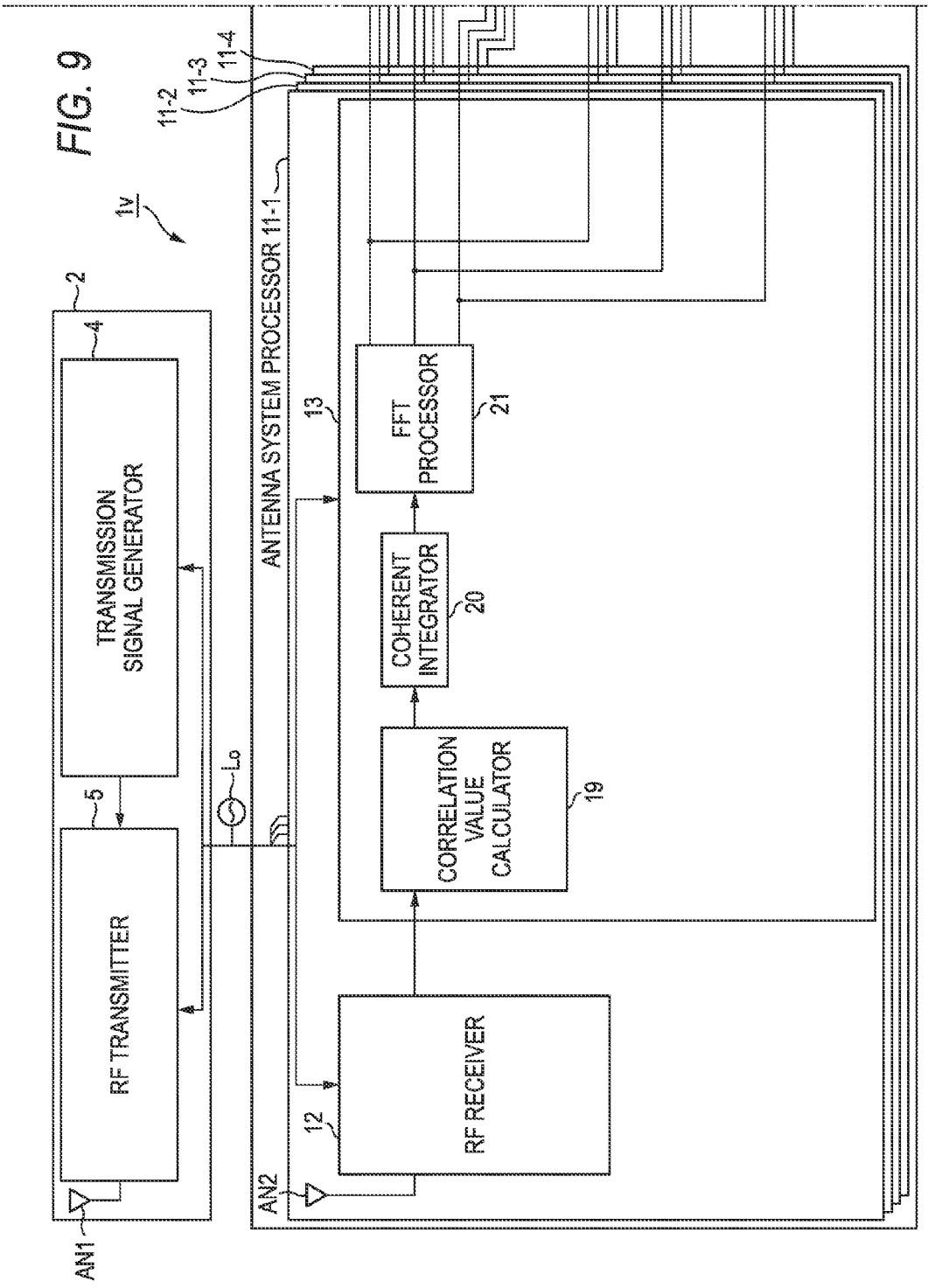
FIG. 9 is a block diagram showing the internal configuration of a radar device according to a second embodiment in a simplified manner.

FIG. 9 is a block diagram showing the internal configuration of a radar device 1v according to the second embodiment in a simplified manner. FIG. 10 is a block diagram showing the internal configuration of the radar device 1v according to the second embodiment in detail. Those blocks of the radar device 1v which are the same in configuration and operation as the corresponding blocks of the radar device 1 according to the first embodiment are given the same reference symbols as the latter. In the following description of the configuration and the operation of the radar device 1*v*, the elements that are the same in configuration and operation as in the radar device 1 will not be described and the elements that are the same in configuration and operation as in the radar device 1 will be described.

As shown in FIG. 9, the radar device 1*v* includes the radar transmitter 2 and a radar receiver 3*v*. The radar transmitter 2 has the transmission signal generator 4 and the RF transmitter 5 which is connected to the transmission antenna AN1. The radar transmitter 2 and the radar receiver 3*v* are connected to the reference signal oscillator $L_o$ and supplied with a signal from the reference signal oscillator $L_o$, and hence operate in synchronism with each other.

The radar receiver 3*v* has D antenna system processors 11-1 to 11-D, the first correlation matrix generator 25, the second correlation matrix generator 26, a peak Doppler frequency detector 28*v*, an output selector 30*v*, and an incoming direction estimator 31*v*. The parameter D is an integer that is larger than or equal to 2. The antenna system processors have the same configuration, and hence the antenna system processor 11-1 will be described representatively.

The antenna system processor 11-1 at least has the RF receiver 12 which is connected to the reception antenna AN2, the correlation value calculator 19, the coherent integrator 20, and the FFT processor 21.

Next, the configurations of the individual elements of the radar receiver 3*v* will be described in detail with reference to FIG. 10.

As shown in FIG. 10, the radar receiver 3*v* includes the four antenna system processors 11-1 to 11-4 which are the same in number as the reception antennas constituting an array antenna, the first correlation matrix generator 25, the second correlation matrix generator 26, the peak Doppler frequency detector 28*v*, the speed estimator 29, the output selector 30*v*, and the incoming direction estimator 31*v*.

Next, how the individual elements of the radar receiver 3*v* operate will be described in detail.

The peak Doppler frequency detector 28*v* receives outputs of the second correlation matrix generator 26, that is, a correlation matrix $B_1(k, f_s, z)$ which is obtained every $N_{max}$ transmission cycles Tr for each of $(2N_f-1)$ different Doppler frequency components $f_s$. The peak Doppler frequency detector 28*v* selects, for each discrete time k, a Doppler frequency component $f_{select}(k, z)$ corresponding to a correlation matrix with a maximum coherent integration gain among the received correlation matrices $B_1(k, f_s, z)$.

More specifically, the peak Doppler frequency detector 28*v* selects a Doppler frequency component $f_{select}(k, z)$ corresponding to a correlation matrix whose sum of the diagonal elements which correspond to average reception power components after coherent integration is largest among the received correlation matrices $B_1(k, f_s, z)$. That is, the peak Doppler frequency detector 28*v* selects a Doppler frequency component $f_{select}(k, z)$ which maximizes the sum of the diagonal elements which correspond to average reception power components after coherent integration, according to Equation (34) for each discrete time k.

The peak Doppler frequency detector 28*v* outputs the Doppler frequency component $f_{select}(k, z)$ which has been selected for each discrete time k to the speed estimator 29 and the output selector 30*v*.

Furthermore, the peak Doppler frequency detector 28*v* detects a spread of a Doppler spectrum (Doppler spread) which is centered by the selected Doppler frequency component $f_{select}(k, z)$ and is in a prescribed frequency range around the Doppler frequency component $f_{select}(k, z)$. The peak Doppler frequency detector 28*v* detects a Doppler spread according to Equation (47) or (48):

[Formula 47]

$$DS(k, f_{select}, z) = \frac{\text{diag}[B_1(f_{select} + \Delta f, z)] + \text{diag}[B_1(k, f_{select} - \Delta f, z)]}{2\text{diag}[B_1(k, f_{select}, z)]} \quad (47)$$

[Formula 48]

$$DS(k, f_{select}, z) = \left[ \frac{\sum_{f_s=f_{select}-\Delta f}^{f_{select}+\Delta f} (f_s - f_{select})^2 \text{diag}[B_1(k, f_s, z)]}{\sum_{f_s=f_{select}-\Delta f}^{f_{select}+\Delta f} \text{diag}[B_1(k, f_s, z)]} \right]^{\frac{1}{2}} \quad (48)$$

Equation (47) is of a method in which a Doppler spread is detected on the basis of values at two points that are spaced from each other by $\pm\Delta f$. Equation (48) is of a method in which a Doppler spread is detected using a Doppler spectrum in a prescribed frequency range of $2\Delta f$.

The peak Doppler frequency detector 28*v* outputs, to the output selector 30*v*, a comparison result $DS\_LEV(k, f_{select}, z)$ between the Doppler spread $DS(k, f_{select}, z)$ calculated according to Equation (47) or (48) and a prescribed value $TH_1$. The comparison result $DS\_LEV(k, f_{select}, z)$ is 1-bit information, for example.

Each of the prescribed value $TH_1$ and a prescribed value $TH_2$ (described later) is a threshold value indicating whether or not increase of SNR is expected by selecting the correlation matrix whose sum of the diagonal elements is largest among the correlation matrices generated for the respective Doppler frequency components.

More specifically, the peak Doppler frequency detector 28*v* outputs a comparison result $DS\_LEV(k, f_{select}, z)$ being "0" to the output selector 30*v* if the Doppler spread $DS(k, f_{select}, z)$ is larger than or equal to the prescribed value $TH_1$ (see Formula (49)).

The peak Doppler frequency detector 28*v* outputs a comparison result $DS\_LEV(k, f_{select}, z)$ being "1" to the output selector 30*v* if the Doppler spread $DS(k, f_{select}, z)$ is smaller than the prescribed value $TH_1$ (see Formula (49)).

[Formula 49]

$DS\_LEV(k,f_{select},z)=0$, when $DS(k,f_{select},z) \geq TH_1$ $DS\_LEV(k,f_{select},z)=1$, when $DS(k,f_{select},z) < TH_1$ \quad (49)

Where the third correlation matrix generator which is used in the second embodiment (see FIG. 7) is provided, the peak Doppler frequency detector 28*v* outputs a comparison result $DS\_LEV(k, f_{select}, z)$ between the Doppler spread $DS(k, f_{select}, z)$ and the prescribed values $TH_1$ and $TH_2$ to the output selector 30*v*. The comparison result $DS\_LEV(k, f_{select}, z)$ is 2-bit information, for example. It is assumed that the prescribed value $TH_1$ is set smaller than the prescribed value $TH_2$.

More specifically, the peak Doppler frequency detector 28*v* outputs a comparison result $DS\_LEV(k, f_{select}, z)$ being "0" to the output selector 30*v* if the Doppler spread $DS(k, f_{select}, z)$ is larger than or equal to the prescribed value $TH_2$ (see Formula (50)).

The peak Doppler frequency detector 28*v* outputs a comparison result $DS\_LEV(k, f_{select}, z)$ being "2" to the output selector 30v if the Doppler spread DS(k, $f_{select}$, z) is larger than or equal to the prescribed value $TH_1$ and smaller than the prescribed value $TH_2$ (see Formula (50)).

The peak Doppler frequency detector 28v outputs a comparison result DS_LEV(k, $f_{select}$, z) being "1" to the output selector 30v if the Doppler spread DS(k, $f_{select}$, z) is smaller than the prescribed value $TH_1$ (see Formula (50)).

[Formula 50]

$$DS\_LEV(k,f_{select},z)=0, \text{when } DS(k,f_{select},z) \geq TH_2$$

$$DS\_LEV(k,f_{select},z)=2, \text{when } TH_1 \leq DS(k,f_{select},z) < TH_2$$

$$DS\_LEV(k,f_{select},z)=1, \text{when } DS(k,f_{select},z) < TH_1 \quad (50)$$

In the second embodiment, where the radar device 1v has $N_H$ correlation matrix generators, the peak Doppler frequency detector 28v compares the Doppler spread DS(k, $f_{select}$, z) with ($N_H$−1) prescribed values TH according to a formula similar to Formulae (49) and (50).

The peak Doppler frequency detector 28v outputs the Doppler spread DS(k, $f_{select}$, z) so that the output selector 30v selects the output of a correlation matrix generator with a smaller coherent integration number when the Doppler spread DS(k, $f_{select}$, z) is larger.

In the radar device 1v according to the second embodiment, the coherent integration number of the first correlation matrix generator 25 is smaller than that of the second correlation matrix generator 26.

The output selector 30v receives, for each discrete time k, the Doppler frequency component $f_{select}$(k, z) and comparison result DS_LEV(k, $f_{select}$, z) that are output from the peak Doppler frequency detector 28v and the correlation matrices corresponding to the respective Doppler frequency components that are output from each correlation matrix generator.

The output selector 30v outputs, for each discrete time k, a correlation matrix $B_{DS\_LEV(k,f_{select},z)}$(k, $f_{select}$, z) among the received correlation matrices to the incoming direction estimator 31v according to the Doppler frequency component $f_{select}$(k, z) and the comparison result DS_LEV(k, $f_{select}$, z) (see Equation (51)).

[Formula 51]

$$A(k,f_{select}(k,z),z)=B_{DS\_LEV(k,f_{select},z)}(k,f_{select},z) \quad (51)$$

If g(k, z) peak Doppler frequencies are detected for a discrete time k, the peak Doppler frequency detector 28v may output g(k, z) Doppler frequency components $f_{selectG}$(k, z). The parameter G is a natural number of 1 to g(k, z).

The peak Doppler frequency detector 28v calculates Doppler spreads DS(k, $f_{selectG}$(k, z),z) for the g(k, z) respective Doppler frequency components $f_{selectG}$(k, z) according to Equation (47) or (48).

Furthermore, the peak Doppler frequency detector 28v outputs comparison results DS_LEV(k, $f_{selectG}$(k, z), z) between the calculated Doppler spreads DS(k, $f_{selectG}$(k, z),z) and a prescribed value TH to the output selector 30v.

If the peak Doppler frequency detector 28v judges that diag[$B_1$(k, $f_s$, z)] calculated for a discrete time k is lower than a prescribed level, the incoming direction estimator 31v need not estimate an incoming direction for a target for the discrete time k.

Alternatively, if judging that diag[$B_1$(k, $f_s$, z)] calculated for a discrete time k is lower than the prescribed level, the peak Doppler frequency detector 28v makes the Doppler frequency component $f_{select}$(k, z) null. As a result, in the radar device 1v, redundant calculations for the discrete time k at which no target is detected are made unnecessary and the processing delay of the radar receiver 3v can thereby be reduced.

The output selector 30v outputs, for each discrete time k, correlation matrices $B_{DS\_LEV(k,f_{select},z)}$(k, $f_{select}$(k,z),z) corresponding to the g(k, z) respective frequency components $f_{selectG}$(k, z) to the incoming direction estimator 31v according to the respective comparison results DS_LEV(k, $f_{selectG}$(k, z), z) and the frequency components $f_{selectG}$(k, z) (output from the peak Doppler frequency detector 28v). If g(k, z)=0, the output selector 30v may make the correlation matrix output "0" for the discrete time k.

The incoming direction estimator 31v receives addition result components A(k, $f_{selectG}$(k, z), z) that are output from the output selector 30v for each discrete time k. The incoming direction estimator 31v estimates incoming directions of reflection waves coming from targets on the basis of the outputs A(k, $f_{selectgg(k,z)}$, z) that are received for each discrete time k.

As described above, each antenna system processor of the radar device 1v generates a value obtained by performing coherent integration on outputs of the correlation value calculator 19 for each frequency component with the FFT processor 21 and a value that is increased in coherent integration number by performing buffering with the buffer 24 after the coherent integration by the FFT processor 21. Furthermore, in the radar device 1v, the first correlation matrix generator 25 and the second correlation matrix generator 26 generate correlation matrices for each frequency components using the plural values that are generated by each antenna system processor and are different from each other in coherent integration number. The peak Doppler frequency detector 28v selects one of the correlation matrices according to the magnitude of a Doppler spread, and estimates an incoming angle using the selected correlation matrix.

As a result, in the radar device 1v, when the Doppler spread included in reflection waves coming from a target is small, the correlation matrix that is generated by the second correlation matrix generator through coherent integration of a larger coherent integration number is selected. Thus, an incoming angle can be estimated using the correlation matrix generated with a larger coherent integration gain.

On the other hand, when the Doppler spread included in reflection waves coming from a target is large, the correlation matrix that is generated by the first correlation matrix generator through coherent integration of a smaller coherent integration number is selected. Thus, an incoming angle can be estimated using the correlation matrix generated with a larger coherent integration gain.

As a result, the radar device 1 can increase the accuracy of estimation of an incoming direction of reflection waves by increasing the coherent integration gain with a simple configuration irrespective of the spread of a Doppler spectrum included in reflection waves coming from a target.

Modification 1 of Embodiment 2

In a first modification of the second embodiment, a Doppler components adder adds together correlation matrices corresponding to respective Doppler frequency components in a prescribed frequency range centered by a Doppler frequency component selected by the peak Doppler frequency detector.

FIG. 11 is a block diagram showing the internal configuration of a radar device 1w according to the first modification of the second embodiment in detail. Those blocks of the radar device 1w which are the same in configuration and operation as the corresponding blocks of the radar device 1v according to the second embodiment are given the same reference symbols as the latter. In the following description of the configuration and the operation of the radar device 1w, the elements that are the same in configuration and operation as in the radar device 1v will not be described and the elements that are the same in configuration and operation as in the radar device 1v will be described.

As shown in FIG. 11, the radar device 1w is different from the radar device 1v in further including a Doppler components adder 34. In FIG. 11, an output selector 30w operates differently from the output selector 30v shown in FIG. 10.

Outputs of the peak Doppler frequency detector 28v are input to the speed estimator 29, the output selector 30w, and the Doppler components adder 34.

The output selector 30w receives, for each discrete time k, a Doppler frequency component $f_{select}(k, z)$ and a comparison result DS_LEV(k, $f_{select}$, z) that are output from the peak Doppler frequency detector 28v and correlation matrices corresponding to the respective Doppler frequency components that are output from each correlation matrix generator.

The output selector 30w outputs, to the Doppler components adder 34, for each discrete time k, correlation matrices that are in a prescribed frequency range [−DF[DS_LEV(k, $f_{select}$, z)], +DF[DS_LEV(k, $f_{select}$, z)]] around the Doppler frequency component $f_{select}(k, z)$ according to the Doppler frequency component $f_{select}(k, z)$ and the comparison result DS_LEV(k, $f_{select}$, z).

The parameter DF[DS_LEV(k, $f_{select}$, z)] has a value that is given by Formula (52). The parameter range_f has a prescribed positive value.

[Formula 52]

$DF[DS\_LEV(k,f_{select},z)]=0$, when $DS\_LEV(k,f_{select},z)=1$ $DF[DS\_LEV(k,f_{select},z)]=$range_$f$, when $DS\_LEV(k,f_{select},z)=0$ (52)

Where the third correlation matrix generator shown in FIG. 7 is provided in the first modification of the second embodiment, the parameter DF[DS_LEV(k, $f_{select}$, z)] has a value that is given by Formula (53). Since the values that are input from the first correlation matrix generator 25 are smaller in coherent integration number than the values that are input from the third correlation matrix generator 33, range_$f_0$ and range_$f_1$ are prescribed positive values and are set so as to satisfy a relationship range_$f_0$>range_$f_1$.

[Formula 53]

$DF[DS\_LEV(k,f_{select},z)]=0$, when $DS\_LEV(k,f_{select},z)=1$ $DF[DS\_LEV(k,f_{select},z)]=0$, when $DS\_LEV(k,f_{select},z)=$range_$f_0$, when $DS\_LEV(k,f_{select},z)=0$ $DF[DS\_LEV(k,f_{select},z)]=$range_$f_1$, when $DS\_LEV(k,f_{select},z)=2$ (53)

The Doppler components adder 34 adds together correlation matrices that are in the prescribed frequency range [−DF[DS_LEV(k, $f_{select}$, z)], +DF[DS_LEV(k, $f_{select}$, z)]] centered by the Doppler frequency component $f_{select}(k, z)$ selected by the peak Doppler frequency detector 28v on the basis of the outputs of the output selector 30w (see Equation (54)).

The Doppler components adder 34 outputs a Doppler components addition result sum_A(k, $f_{select}(k, z)$, z) calculated according to Equation (54) to the incoming direction estimator 31w.

[Formula 54]

$$\text{sum\_A}(k, f_{select}(k, z), z) = \frac{1}{2\text{DS\_LEV}(k, f_{select}, z)+1} \sum_{u=-DF[DS\_LEV(k,f_{select},z)]}^{+DF[DS\_LEV(k,f_{select},z)]} A_{DS\_LEV(k,f_{select},z)}(k, f_{select}(k, z)+u, z) \quad (54)$$

The incoming direction estimator 31w receives the Doppler components addition result component sum_A(k, $f_{select}(k, z)$, z) that is output from the Doppler components adder 34 for each discrete time k. The incoming direction estimator 31w estimates, for each $f_{select}(k, z)$, an incoming direction of reflection waves coming from a target on the basis of the output sum_A(k, $f_{select}(k, z)$, z) that is received for each discrete time k.

With the above features, the radar device 1w can estimate an incoming direction of reflection waves coming from a target so as to use reception signals that extend in a Doppler spread range in the case where the Doppler spread that is detected by the peak Doppler frequency detector is large. Furthermore, in the radar device 1w, the accuracy of estimation of an incoming direction of reflection waves coming from a target can be increased even in the case where the Doppler spread that is detected by the peak Doppler frequency detector is large.

Embodiment 3

Each of the above-described embodiments is directed to a case of estimating an incoming direction of reflection waves coming from a target. Each of the following embodiments will be directed to a case of estimating a distance from a radar device to a target.

In a third embodiment, a radar device 1x, which is based on the configuration of the radar device 1 according to the first embodiment, estimates a distance from the radar device 1x to a target.

Figure 13:
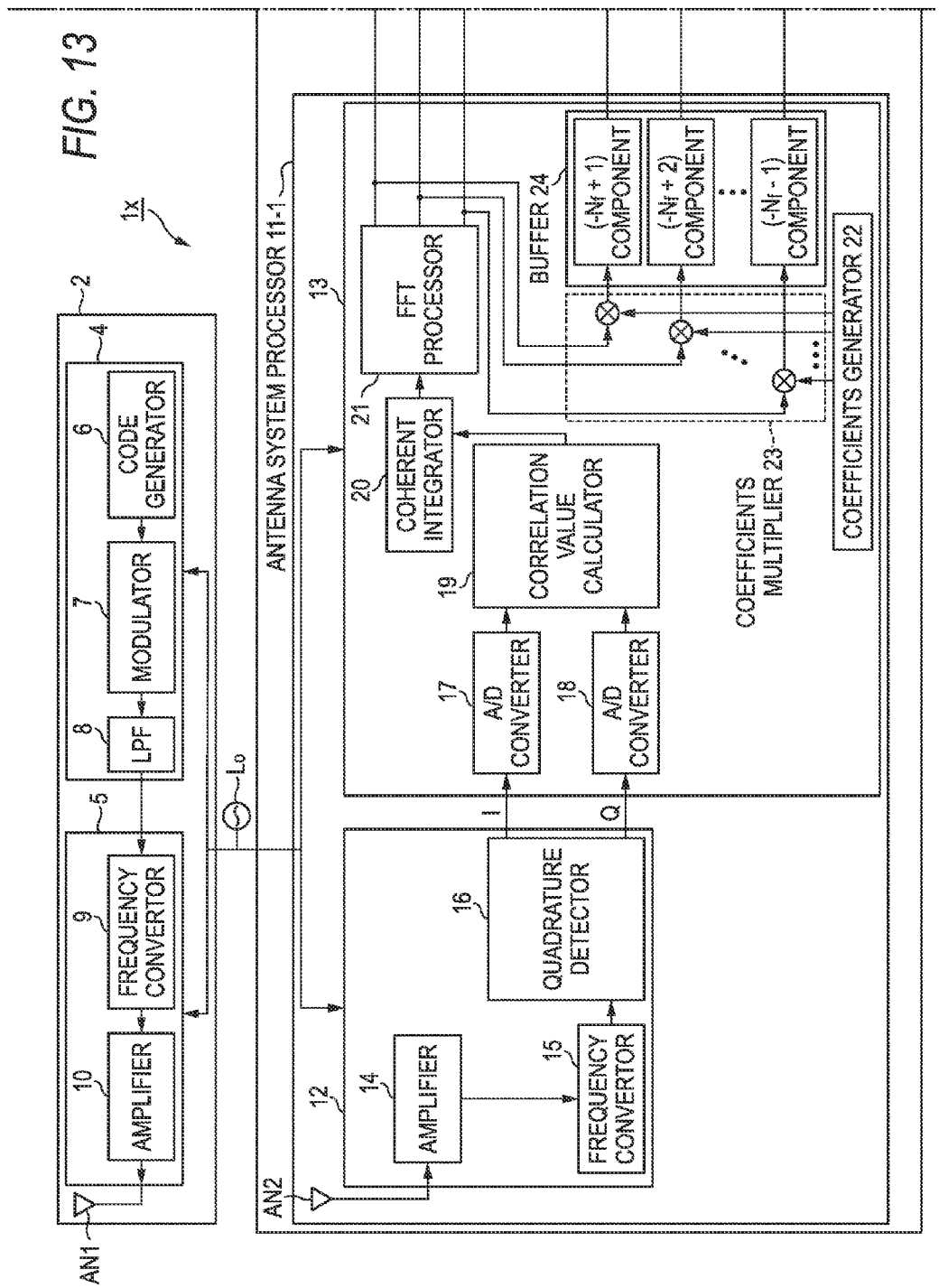
FIG. 13 is a block diagram showing the internal configuration of the radar device according to the third embodiment in detail.
Figure 17:
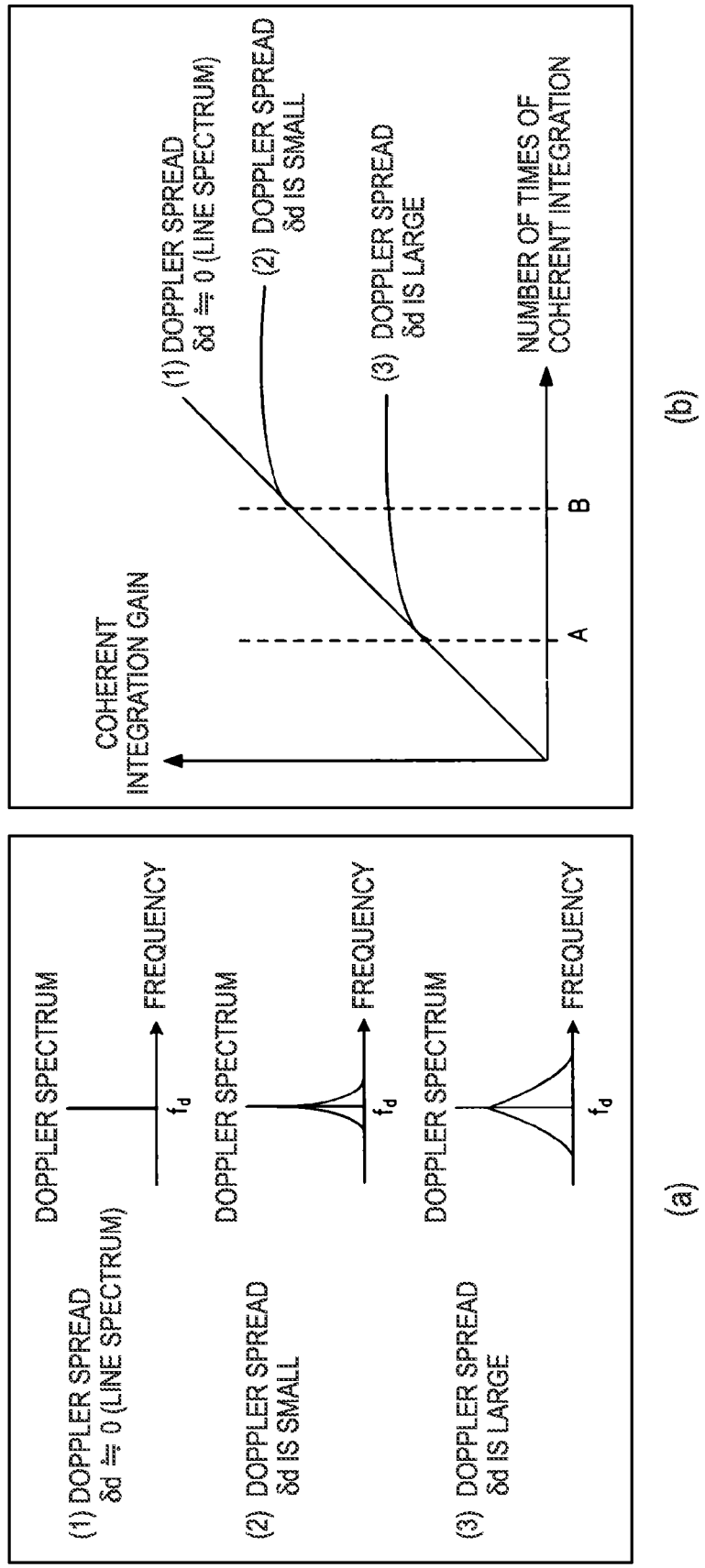
FIG. 17 Part (a) shows relationships between Doppler spectrum characteristics and Doppler spreads after FFT, and part (b) shows a relationship between the coherent integration gain and the number of times of coherent integration (integration interval) which corresponds to the FFT size with the Doppler spread as a parameter.

FIG. 12 is a block diagram showing the internal configuration of the radar device 1x according to the third embodiment in a simplified manner. FIG. 13 is a block diagram showing the internal configuration of the radar device 1x according to the third embodiment in detail. Those blocks of the radar device 1x which are the same in configuration and operation as the corresponding blocks of the radar device 1 according to the first embodiment are given the same reference symbols as the latter. In the following description of the configuration and the operation of the radar device 1x, the elements that are the same in configuration and operation as in the radar device 1 will not be described and the elements that are the same in configuration and operation as in the radar device 1 will be described.

As shown in FIG. 12, the radar device 1x includes the radar transmitter 2 and a radar receiver 3x. The radar transmitter 2 has the transmission signal generator 4 and the RF transmitter 5 which is connected to the transmission antenna AN1. The radar transmitter 2 and the radar receiver 3x are connected to the reference signal oscillator $L_o$ and supplied with a signal from the reference signal oscillator $L_o$, and hence operate in synchronism with each other.

As shown in FIG. 12, the radar receiver 3x has an antenna system processor 11-1, a first non-coherent integrator 35, a second non-coherent integrator 36, an adder 27x, and a distance estimator 37. Although the radar receiver 3x has one or more antenna system processors, only the antenna system processor 11-1 is shown in FIG. 12.

The antenna system processor 11-1, the first non-coherent integrator 35, and the second non-coherent integrator 36 may be provided in plural systems. Where they are provided in plural systems, outputs of the plural second non-coherent integrators 36 are added together by the adder 27x. The non-coherent gain of the adder can thereby be increased further because noise components of the plural systems have no correlation.

The antenna system processor 11-1 at least has the RF receiver 12 which is connected to the reception antenna AN2, the correlation value calculator 19, the coherent integrator 20, and the FFT processor 21.

Next, the configurations of the individual elements of the radar receiver 3x will be described in detail with reference to FIG. 13.

As shown in FIG. 13, the radar receiver 3x includes the antenna system processor 11-1, the first non-coherent integrator 35, the second non-coherent integrator 36, the adder 27x, the peak Doppler frequency detector 28x, the speed estimator 29, the output selector 30x, and the distance estimator 37.

Next, how the individual elements, different than in the radar device 1 according to the first embodiment, of the radar receiver 3x operate will be described in detail.

The first non-coherent integrator 35 receives coherent integration results (see Equation (16)) that are output from the FFT processor 21 of the antenna system processor 11-1. The first non-coherent integrator 35 adds together the squares of $D_{pc}$ coherent integration results that are produced by the FFT processor 21 in respective sets of $(N_p \times N_c)$ transmission cycles $T_r$ of $N_{max}$ transmission cycles $T_r$ (see Equation (55)).

The first non-coherent integrator 35 outputs a square addition value $E_0(k, f_s, z)$ to the adder 27x every $N_{max}$ transmission cycles $T_r$. Equation (55) means a square addition value $E_0(k, f_s, z)$ that is output from the first non-coherent integrator 35 in an $\{N_{max} \times (z-1)\}$th transmission cycle Tr to an $(N_{max} \times z)$th transmission cycle Tr.

[Formula 55]

$$E_0(k, f_s, z) = \sum_{w=1}^{D_{pc}} |FT\_CI(k, f_s, D_{pc}(z-1) + w)|^2 \quad (55)$$

The second non-coherent integrator 36 receives coherent integration results (see Equation (23)) that are output from the buffer 24 of the antenna system processor 11-1. The second non-coherent integrator 36 squares the coherent integration result that is received from the buffer 24 every $N_{max}$ transmission cycles $T_r$ (see Equation (56)). The second non-coherent integrator 36 outputs a square addition value $E_1(k, f_s, z)$ to the adder 27x every $N_{max}$ transmission cycles $T_r$. Equation (56) means a square addition value $E_1(k, f_s, z)$ that is output from the second non-coherent integrator 36 in an $\{N_{max}(z-1)\}$th transmission cycle Tr to an $(N_{max} \times z)$th transmission cycle Tr.

[Formula 56]

$$E_1(k,f_s,z) = |Buf_1(k,f_s,z)|^2 \quad (56)$$

Alternative processing is as follows. Assume that the buffer 24 is stored with coherent integration results ($Buf_1(k, f_s, z-N_z)$ to $Buf_1(k, f_s, z-1)$) of an integration number $N_{max}$ that were generated in past $(N_z \times N_{max})$ transmission cycles $T_r$. The second non-coherent integrator 36 may calculate a square addition value $E_1(k, f_s, z)$ using these stored coherent integration results.

More specifically, the second non-coherent integrator 36 calculates, for each discrete time k, a square addition value $E_1(k, f_s, z)$ on the basis of coherent integration results ($Buf_1(k, f_s, z-N_z)$ to $Buf_1(k, f_s, z-1)$) of an integration number $N_{max}$ that were generated in $(N_z \times N_{max})$ transmission cycles $T_r$ (see Equation (57)).

With this measure, in the radar device 1x, when a target movement speed is sufficiently low, the SNR can be increased by suppressing noise components and the accuracy of estimation of an incoming direction of reflection waves coming from a target can thereby be increased.

The second non-coherent integrator 36 outputs the square addition value $E_1$ to the adder 27x and the peak Doppler frequency detector 28x every $N_{max}$ transmission cycles $T_r$.

[Formula 57]

$$E_1(k, f_s, z) = \sum_{z_0=z-N_z}^{z} |Buf_1(k, f_s, z_0)|^2 \quad (57)$$

The adder 27x adds together the output of the first non-coherent integrator 35 and the output of the second non-coherent integrator 36 according to Equation (58).

More specifically, the adder 27x adds together the square addition value $E_0(k, f_s, z)$ which has been calculated by the first non-coherent integrator 35 for each of $(2N_f - 1)$ different Doppler frequency components $f_s$ for each discrete time k and the square addition value $E_1(k, f_s, z)$ which has been calculated by the second non-coherent integrator 36 for each of the $(2N_f - 1)$ different Doppler frequency components $f_s$ for each discrete time k.

[Formula 58]

$$AE(k,f_s,z) = E_0(k,f_s,z) + E_1(k,f_s,z) \quad (58)$$

The adder 27x may add together the square addition values that are output from the respective non-coherent integrators after multiplying them by weighting coefficients α that are proportional to the magnitudes of the sets of components of the respective square addition values (see Equations (59) and (60)). The adder 27x outputs an addition result of Equation (58) or (59) to the output selector 30x.

[Formula 59]

$$AE(k, f_s, z) = \alpha_0 E_0(k, f_s, z) + \alpha_1 E_1(k, f_s, z) \quad (59)$$

[Formula 60]

$$\sum_{s=0}^{1} \alpha_s = 1 \quad (60)$$

In the third embodiment, in the same manner as shown in FIG. 6, the adder 27x may receive an output of the peak Doppler frequency detector 28x and add together square addition values corresponding to a Doppler frequency component $f_{select}(k, z)$ that is selected for each discrete time k (see Equation (61)). With this measure, in the radar device 1x, the calculation amount of the adder 27x can be reduced.

[Formula 61]

$$AE(k,f_{select}(k,z),z) = \alpha_0 E_0(k,f_{select}(k,z),z) + \alpha_1 E_1(k,f_{select}(k,z),z) \quad (61)$$

The peak Doppler frequency detector 28x receives the output of the second non-coherent integrator 36, that is, the square addition value $E_1(k, f_s, z)$ which is obtained every $N_{max}$ transmission cycles $T_r$ for each Doppler frequency component $f_s$. The peak Doppler frequency detector 28x selects, for each discrete time k, a Doppler frequency component $f_{select}(k, z)$ corresponding to one, having a maximum coherent integration gain, of the received square addition results $E_1(k, f_s, z)$ obtained for the respective Doppler frequency components $f_s$.

More specifically, the peak Doppler frequency detector 28x selects a Doppler frequency component $f_{select}(k, z)$ corresponding to a square addition value whose square addition value components which correspond to average reception power components after coherent integration are largest among the received square addition values $E_1(k, f_s, z)$. That is, the peak Doppler frequency detector 28x selects, according to Equation (62), a Doppler frequency component $f_{select}(k, z)$ corresponding to a square addition value whose square value components which correspond to average reception power components after coherent integration are largest.

[Formula 62]

$$f_{select}(k, z) = \{\arg f_s \mid \max_{f_s \in -N_f+1,\ldots,N_f-1} E_1(k, f_s, z)^2\} \quad (62)$$

The peak Doppler frequency detector 28x outputs the Doppler frequency component $f_{select}(k, z)$ which has been selected for each discrete time k to the speed estimator 29 and the output selector 30x.

If the peak Doppler frequency detector 28x judges that square addition values $E_1(k, f_s, z)$ calculated for a discrete time k are lower than a prescribed level, the distance estimator 37 need not estimate a distance to a target for the discrete time k.

Alternatively, if judging that square addition values $E_1(k, f_s, z)$ calculated for a discrete time k are lower than the prescribed level, the peak Doppler frequency detector 28x makes the Doppler frequency component $f_{select}(k, z)$ null. As a result, in the radar device 1x, redundant calculations for the discrete time k at which no target is detected are made unnecessary and the processing delay of the radar receiver 3x can thereby be reduced.

The adder 27x receives the output of the peak Doppler frequency detector 28x (see FIG. 13). If the peak Doppler frequency detector 28x judges that square addition values $E_1(k, f_s, z)$ calculated for a discrete time k are lower than a prescribed level, the adder 27x need not perform addition processing. As a result, in the radar device 1x, redundant calculations for the discrete time k at which no target is detected are made unnecessary and the processing delay of the radar receiver 3x can thereby be reduced.

The output selector 30 receives, for each discrete time k, the Doppler frequency $f_{select}(k, z)$ that is output from the peak Doppler frequency detector 28x and the addition result or results (see Equation (58), (59), or (60)) that are output from the adder 27x.

The output selector 30 selects, for each discrete time k, a square addition value $AE(k, f_{select}(k, z), z)$ corresponding to the Doppler frequency $f_{select}(k, z)$ from the addition result or results that are input from the adder 27x. The output selector 30 outputs the square addition result $AE(k, f_{select}(k, z), z)$ selected for each discrete time k to the distance estimator 37.

The distance estimator 37 receives the square addition result $AE(k, f_{select}(k, z), z)$ selected by the output selector 30 for each discrete time k. The distance estimator 37 estimates a distance to a target on the basis of the received square addition result $AE(k, f_{select}(k, z), z)$.

More specifically, the distance estimator 37 judges that reflection waves coming from a target exist if the square addition result $AE(k, f_{select}(k, z), z)$ obtained for each discrete time k is larger than a prescribed threshold value. The distance estimator 37 outputs an estimation result by doing conversion into a distance from the radar device to the target according to Equation (63) on the basis of the discrete time k for which it has been judged that reflection waves coming from a target exist.

The prescribed threshold value is set so that the constant false alarm ratio (CFAR) becomes smaller than a prescribed value. In Equation (63), the parameter c is the speed of light (m/s).

$$R(k) = \frac{ckT_w}{2LN_s} \quad (63)$$

Where plural peak Doppler frequencies are detected, the peak Doppler frequency detector 28x may select g(k, z) Doppler frequency components $f_{selectG}(k, z)$. The parameter G is a natural number of 1 to g(k, z).

The output selector 30 outputs, to the distance estimator 37, correlation matrices $A(k, f_{selectG}(k, z), z)$ corresponding to the g(k, z) respective Doppler frequency components $f_{selectG}(k, z)$ among the outputs of the adder 27x on the basis of the selection results $f_{selectG}(k, z)$ of the peak Doppler frequency detector 28x for each discrete time k.

The distance estimator 37 estimates distances to targets for the g(k, z) respective Doppler frequency components $f_{selectG}(k, z)$ on the basis of the respective square addition values $AE(k, f_{selectG}(k, z), z)$ that are output from the output selector 30 for each discrete time k.

With the above features, in the radar device 1x, the accuracy of estimation of an incoming direction of reflection waves can be increased by increasing the coherent integration gain and the non-coherent integration gain irrespective of the spread of a Doppler spectrum included in reflection waves coming from a target.

Modification 1 of Embodiment 3

In a first modification of the third embodiment, a second buffer which performs coherent integration in each of plural transmission intervals $N_{sub}$ obtained by dividing the parameter $N_{max}$ is added to the signal processor 13 of the radar device 1x according to the third embodiment.

Furthermore, in the first modification of the third embodiment, a third non-coherent integrator which generates a square addition value on the basis of outputs of the second buffer is also added to the radar receiver 3x of the radar device 1x according to the third embodiment.

However, the parameters $N_{max}$, $N_{sub}$, and $N_b$ are natural numbers which satisfy Formula (37). Furthermore, it is preferable that $N_{max}/N_{sub}$ be an integer.

How the above-mentioned second buffer and third non-coherent integrator operate of the radar device according to the first modification of the third embodiment will be described below. However, the elements other than the second buffer and the third non-coherent integrator are the same in configuration and operation as in the radar device 1x according to the third embodiment and hence will not be described.

An adder used in the first modification of the third embodiment operates differently from the adder used in the third embodiment, and hence how the adder used in the first modification of the third embodiment operates will also be described.

In the first modification of the third embodiment, outputs of the coefficients multiplier 23 are supplied to the first buffer and the second buffer.

Multiplication results of outputs of the FFT processor 21 that are produced in an $\{(N_p \times N_c) \times (w-1)\}$th transmission cycle $T_r$ to an $\{(N_p \times N_c) \times w\}$th transmission cycle $T_r$ among an $\{N_{max}(z-1)\}$th transmission cycle $T_r$ to an $(N_{max} \times z)$th transmission cycle $T_r$ and coefficients that are output from the coefficients generator 22 are input to the second buffer.

The second buffer adds together $D_{pc\_sub}$ multiplication results that are output, for each discrete time k, from the coefficients multiplier 23 in a period when the parameter w varies from 1 to $D_{pc\_sub}$ in each set of $N_{max}$ transmission cycles $T_r$. The parameter $D_{pc\_sub}$ is given by Equation (38).

The addition processing of the second buffer corresponds to coherent integration of an integration number $D_{pc\_sub}$. That is, the second buffer outputs, to the third non-coherent integrator, a coherent integration result given by Equation (39) which is a result of Floor[$N_{max}/N_{sub}$] times of coherent integration performed by the second buffer in an $\{N_{max} \times (z-1)\}$th transmission cycle $T_r$ to an $(N_{max} \times z)$th transmission cycle $T_r$.

The third non-coherent integrator receives the coherent integration result $Buf_2(k, f_s, z, y)$ which is output from the second buffer of the antenna system processor 11.

The third non-coherent integrator generates a square addition value $E_2(k, f_s, z)$ for each discrete time k on the basis of the received coherent integration results $Buf_2(k, f_s, z, y)$ according to Equation (64).

The third non-coherent integrator outputs the square addition value $E_2(k, f_s, z)$ to the adder 27x every $N_{max}$ transmission cycles $T_r$.

[Equation 64]

$$E_2(k, f_s, z) = \sum_{y=1}^{Floor[N_{max}/N_{sub}]} |Buf_2(k, f_s, z, y)|^2 \qquad (64)$$

The adder 27s receives square addition values that are output from the first non-coherent integrator, the second non-coherent integrator, and the third non-coherent integrator. The adder 27s calculates an addition result of the received outputs of the respective non-coherent integrators according to Equation (65).

More specifically, the adder adds together square addition values $E_0(k, f_s, z)$, $E_1(k, f_s, z)$, and $E_0(k, f_s, z)$ which have been calculated by the first non-coherent integrator 35, the second non-coherent integrator 36, and the third non-coherent integrator, respectively, for each of $(2N_f-1)$ different Doppler frequency components $f_s$ for each discrete time k.

[Formula 65]

$$AE(k, f_s, z) = \sum_{K=0}^{2} E_K(k, f_s, z) \qquad (65)$$

The adder may add together the square addition values that are output from the respective non-coherent integrators after multiplying them by weighting coefficients α that are proportional to the magnitudes of the square addition value components (see Equations (66) and (67)). The adder outputs an addition result of Equation (66) or (67) to the output selector 30x. The operations performed by the output selector 30x and the following elements are the same as in the radar device 1x according to the third embodiment, and hence will not be described.

[Formula 66]

$$AE(k, f_s, z) = \sum_{K=0}^{2} \alpha_K E_K(k, f_s, z) \qquad (66)$$

[Formula 67]

$$\sum_{K=0}^{2} \alpha_K = 1 \qquad (67)$$

Sets of transmission intervals which correspond to respective numbers smaller than the parameter $N_{sub}$ may be provided by dividing the parameter $N_{max}$, and third, fourth, . . . buffers for coherent integration and fourth, fifth, . . . correlation matrix generators for generating correlation matrices on the basis of outputs of the respective buffers may likewise be provided.

With the above features, the radar device according to the second modification of the third embodiment can provide, in addition to the advantages of the radar device 1, an advantage that the accuracy of estimation of an incoming direction of reflection waves having a medium Doppler spread can be increased in the case where the Doppler spread which is included in reflection waves coming from a target is relatively large.

Embodiment 4

In a fourth embodiment, a radar device 1y, which is based on the configuration of the radar device 1v according to the second embodiment, estimates a distance from the radar device 1y to a target.

FIG. 14 is a block diagram showing the internal configuration of the radar device 1y according to the fourth embodiment in a simplified manner. FIG. 15 is a block diagram showing the internal configuration of the radar device 1y according to the third embodiment in detail. Those blocks of the radar device 1y which are the same in configuration and operation as the corresponding blocks of the radar device 1v according to the second embodiment are given the same reference symbols as the latter. In the following description of the configuration and the operation of the radar device 1y, the elements that are the same in configuration and operation as in the radar device 1v will not be described and the elements that are the same in configuration and operation as in the radar device 1v will be described.

As shown in FIG. 14, the radar device 1y includes the radar transmitter 2 and a radar receiver 3y. The radar transmitter 2 includes the transmission signal generator 4 and the RF transmitter 5 which is connected to the transmission antenna AN1. The radar transmitter 2 and the radar receiver 3y are connected to the reference signal oscillator $L_o$ and supplied with a signal from the reference signal oscillator $L_o$, and hence operate in synchronism with each other.

The radar receiver 3y includes an antenna system processor 11-1, a first non-coherent integrator 35, a second non-coherent integrator 36, a peak Doppler frequency detector 28y, an output selector 30y, and a distance estimator 37y. Although the radar receiver 3y has one or more antenna system processors, only the antenna system processor 11-1 is shown in FIG. 14.

The antenna system processor 11-1 at least has the RF receiver 12 which is connected to the reception antenna AN2, the correlation value calculator 19, the coherent integrator 20, and the FFT processor 21.

Next, the configurations of the individual elements of the radar receiver 3y will be described in detail with reference to FIG. 15.

As shown in FIG. 15, the radar receiver 3y includes the antenna system processor 11-1, the first non-coherent integrator 35, the second non-coherent integrator 36, the peak Doppler frequency detector 28y, the speed estimator 29, the output selector 30y, and the distance estimator 37y.

Next, how the individual elements, different than in the radar device 1v according to the second embodiment, of the radar receiver 3y operate will be described in detail.

Since the non-coherent integrator 35 and the second non-coherent integrator 36 operate in the same manners as in the radar device 1x according to the third embodiment, they will not be described.

The peak Doppler frequency detector 28y receives an output of the second non-coherent integrator 36, that is, the square addition value $E_1(k, f_s, z)$ which is obtained every $N_{max}$ transmission cycles $T_r$ for each of the $(2N_f-1)$ Doppler frequency components $f_s$. The peak Doppler frequency detector 28y selects, for each discrete time k, a Doppler frequency component $f_{select}(k, z)$ corresponding to one, having a maximum coherent integration gain, of the received square addition results $E_1(k, f_s, z)$ obtained for the respective Doppler frequency components $f_s$.

More specifically, the peak Doppler frequency detector 28y selects a Doppler frequency component $f_{select}(k, z)$ corresponding to a square addition value select, $E_1(k, f_s, z)$ whose square addition value components which correspond to average reception power components after coherent integration are largest among the received square addition values $E_1(k, f_s, z)$. That is, the peak Doppler frequency detector 28y selects, according to Equation (68), a Doppler frequency component $f_{select}(k, z)$ corresponding to a square addition value whose square addition value components which correspond to average reception power components after coherent integration are largest.

[Formula 68]

$$f_{select}(k, z) = \{\arg f_s \mid \max_{f_s \in -N_f+1,\ldots,N_f-1} \text{diag}[E_1(k, f_s, z)]\} \quad (68)$$

The peak Doppler frequency detector 28y outputs the Doppler frequency component $f_{select}(k, z)$ which has been selected for each discrete time k to the speed estimator 29 and the output selector 30y.

Furthermore, the peak Doppler frequency detector 28y detects a Doppler spread which is centered by the selected Doppler frequency component $f_{select}(k, z)$ and is in a prescribed frequency range around the Doppler frequency component $f_{select}(k, z)$. The peak Doppler frequency detector 28y detects a Doppler spread according to Equation (69) or (70):

[Formula 69]

$$DS(k, f_{select}, z) = \frac{E_1(k, f_{select} + \Delta f, z) + E_1(k, f_{select} - \Delta f, z)}{2E_1(k, f_{select}, z)} \quad (69)$$

[Formula 70]

$$DS(k, f_{select}, z) = \left[\frac{\sum_{f_s=f_{select}-\Delta f}^{f_{select}+\Delta f}(f_s - f_{select})^2 E_1(k, f_s, z)}{\sum_{f_s=f_{select}-\Delta f}^{f_{select}+\Delta f} E_1(k, f_s, z)}\right]^{\frac{1}{2}} \quad (70)$$

Equation (69) is of a method in which a Doppler spread is detected on the basis of values at two points that are spaced from each other by $\pm \Delta f$. Equation (70) is of a method in which a Doppler spread is detected using a Doppler spectrum in a prescribed frequency range of $2\Delta f$.

The peak Doppler frequency detector 28y outputs, to the output selector 30y, a comparison result DS_LEV(k, $f_{select}$, z) between the Doppler spread DS(k, $f_{select}$, z) calculated according to Equation (69) or (70) and a prescribed value $TH_1$. The comparison result DS_LEV(k, $f_{select}$, z) is 1-bit information, for example.

Each of the prescribed value $TH_1$ and a prescribed value $TH_2$ is a threshold value indicating whether or not increase of SNR is expected by selecting the correlation matrix whose sum of the diagonal components is largest among the correlation matrices generated for the respective Doppler frequency components.

More specifically, the peak Doppler frequency detector 28y outputs a comparison result DS_LEV(k, $f_{select}$, z) being "0" to the output selector 30y if the Doppler spread DS(k, $f_{select}$, z) is larger than or equal to the prescribed value $TH_1$ (see Formula (49)).

The peak Doppler frequency detector 28y outputs a comparison result DS_LEV(k, $f_{select}$, z) being "1" to the output selector 30y if the Doppler spread DS(k, $f_{select}$, z) is smaller than the prescribed value $TH_1$ (see Formula (49)).

Where the above-described third correlation matrix generator is provided in the fourth embodiment, the peak Doppler frequency detector 28y outputs a comparison result DS_LEV(k, $f_{select}$, z) between the Doppler spread DS(k, $f_{select}$, z) and the prescribed values $TH_1$ and $TH_2$ to the output selector 30y. The comparison result DS_LEV(k, $f_{select}$, z) is 2-bit information, for example. It is assumed that the prescribed value $TH_1$ is set smaller than the prescribed value $TH_2$.

More specifically, the peak Doppler frequency detector 28y outputs a comparison result DS_LEV(k, $f_{select}$, z) being "0" to the output selector 30y if the Doppler spread DS(k, $f_{select}$, z) is larger than or equal to the prescribed value $TH_2$ (see Formula (50)).

The peak Doppler frequency detector 28y outputs a comparison result DS_LEV(k, $f_{select}$, z) being "2" to the output selector 30y if the Doppler spread DS(k, $f_{select}$, z) is larger than or equal to the prescribed value $TH_1$ and smaller than the prescribed value $TH_2$ (see Formula (50)).

The peak Doppler frequency detector 28y outputs a comparison result DS_LEV(k, $f_{select}$, z) being "1" to the output selector 30y if the Doppler spread DS(k, $f_{select}$, z) is smaller than the prescribed value $TH_1$ (see Formula (50)).

In the fourth embodiment, in the case where the radar device 1y has $N_H$ non-coherent integrators, the peak Doppler frequency detector 28y compares the Doppler spread DS(k, $f_{select}$, z) with $(N_H-1)$ prescribed values TH according to a formula similar to Formulae (49) and (50). The peak Doppler frequency detector 28y outputs the Doppler spread DS(k, $f_{select}$, z) so that the output selector 30y selects the output of a non-coherent integrator with a smaller coherent integration number when the Doppler spread DS(k, $f_{select}$, z) is larger.

In the radar device 1y according to the fourth embodiment, the coherent integration number of the first non-coherent integrator 35 is smaller than that of the second non-coherent integrator 36.

The output selector 30y receives, for each discrete time k, the Doppler frequency component $f_{select}$(k, z) and comparison result DS_LEV(k, $f_{select}$, z) that are output from the peak Doppler frequency detector 28y and the square addition values corresponding to the respective Doppler frequency components that are output from each non-coherent integrator.

The output selector 30y outputs, for each discrete time k, a square addition value $AE_{DS\_LEV(k,f_{select}z)}$(k, $f_{select}$, z) among the received square addition values to the distance estimator 37v according to the Doppler frequency component $f_{select}$(k, z) and comparison result DS_LEV(k, $f_{select}$, z) (see Equation (71)).

[Formula 71]

$$AE(k,f_{select(k,z)},z)=E_{DS\_LEV(k,f_{select},z)}(k,f_{select},z) \quad (71)$$

If g(k, z) peak Doppler frequencies are detected for a discrete time k, the peak Doppler frequency detector 28y may output g(k, z) Doppler frequency components $f_{selectG}$(k, z). The parameter G is a natural number of 1 to g(k, z).

The peak Doppler frequency detector 28y calculates Doppler spreads DS(k, $f_{selectG}$(k, z),z) for the g(k, z) respective Doppler frequency components $f_{selectG}$(k, z) according to Equation (69) or (70).

Furthermore, the peak Doppler frequency detector 28y outputs comparison results DS_LEV(k, $f_{selectG}$(k, z), z) between the calculated Doppler spreads DS(k, $f_{selectG}$(k, z),z) and a prescribed value TH to the output selector 30y.

If the peak Doppler frequency detector 28y judges that a square addition value $E_1$(k, $f_s$, z) calculated for a discrete time k is lower than a prescribed level, the distance estimator 31y need not estimate a distance to a target for the discrete time k.

Alternatively, if judging that a square addition value $E_1$(k, $f_s$, z) calculated for a discrete time k is lower than the prescribed level, the peak Doppler frequency detector 28y makes the Doppler frequency component $f_{select}$(k, z) null. As a result, in the radar device 1y, redundant calculations for the discrete time k at which no target is detected are made unnecessary and the processing delay of the radar receiver 3y can thereby be reduced.

The output selector 30y outputs, for each discrete time k, square addition values $E_{DS\_LEV(k,f_{select}z)}$(k, $f_{select}$(k,z), z) corresponding to the g(k, z) respective frequency components $f_{selectG}$(k, z) to the distance estimator 31y according to the respective comparison results DS_LEV(k, $f_{selectG}$(k, z), z) and the frequency components $f_{selectG}$(k, z) (received from the peak Doppler frequency detector 28y). If g(k, z)=0, the output selector 30y may make the output of the square addition value $E_1$(k, $f_s$, z) "0" for the discrete time k.

The distance estimator 31y receives square addition values AE(k, $f_{selectG}$(k, z), z) that are output from the output selector 30y for each discrete time k. The distance estimator 31y estimates distances to targets on the basis of the square addition values AE(k, $f_{selectG}$(k, z), z) that are received for each discrete time k (see Equation (63)).

As described above, in the radar device 1y, a square addition value with maximum coherent and non-coherent integration gains according to the spread of a Doppler spectrum that is included in reflection waves coming from a target. As a result, in the radar device 1y, the SNR of reception of reflection waves coming from a target is increased and the accuracy of estimation of a distance to a target is thereby increased.

Modification 1 of Embodiment 4

In a first modification of the fourth embodiment, a Doppler components adder adds together correlation matrices corresponding to respective square addition values in a prescribed frequency range centered by a Doppler frequency component selected by the peak Doppler frequency detector.

FIG. 16 is a block diagram showing the internal configuration of a radar device 1z according to the first modification of the fourth embodiment in detail. Those blocks of the radar device 1z which are the same in configuration and operation as the corresponding blocks of the radar device 1y according to the fourth embodiment are given the same reference symbols as the latter. In the following description of the configuration and the operation of the radar device 1z, the elements that are the same in configuration and operation as in the radar device 1y will not be described and the elements that are the same in configuration and operation as in the radar device 1y will be described.

As shown in FIG. 16, the radar device 1z is different from the radar device 1y in further including a Doppler components adder 34z. In FIG. 16, an output selector 30z operates differently from the output selector 30y shown in FIG. 15.

A Doppler frequency component $f_{select}$(k, z) and a comparison result DS_LEV(k, $f_{select}$, z) that are output from the peak Doppler frequency detector 28y are input to the speed estimator 29, the output selector 30z, and the Doppler components adder 34.

The output selector 30z receives, for each discrete time k, the Doppler frequency component $f_{select}$(k, z) and the comparison result DS_LEV(k, $f_{select}$, z) that are output from the peak Doppler frequency detector 28y and square addition values corresponding to the respective Doppler frequency components that are output from each non-coherent integrator.

The output selector 30z outputs, to the Doppler components adder 34z, for each discrete time k, square addition values that are in a prescribed frequency range [−DF [DS_LEV(k, $f_{select}$, z)], +DF[DS_LEV(k, $f_{select}$, z)]] around the Doppler frequency component $f_{select}$(k, z) according to the Doppler frequency component $f_{select}$(k, z) and the comparison result DS_LEV(k, $f_{select}$, Z).

The parameter DF[DS_LEV(k, $f_{select}$, z)] has a value that is given by Formula (52). The parameter range_f has a prescribed positive value.

Where the above-described third correlation matrix generator is provided in the first modification of the fourth embodiment, the parameter DF[DS_LEV(k, $f_{select}$, z) has a value that is given by Formula (53). Since the values that are input from the first correlation matrix generator 35 are smaller in coherent integration number than the values that are input from the third correlation matrix generator, range_$f_0$ and range_$f_1$ are prescribed positive values and are set so as to satisfy a relationship range_$f_0$>range_$f_1$.

The Doppler components adder 34z adds together square addition values that are in the prescribed frequency range [−DF[DS_LEV(k, $f_{select}$, z)], +DF[DS_LEV(k, $f_{select}$, z)]] centered by the Doppler frequency component $f_{select}$(k, z) selected by the peak Doppler frequency detector 28y on the basis of the outputs of the output selector 30z (see Equation (72)).

The Doppler components adder 34z outputs an addition result calculated according to Equation (72) to the distance estimator 31y.

[Formula 72]

$$\text{sum\_E}(k, f_{select}(k, z), z) = \frac{1}{2\text{DS\_LEV}(k, f_{select}, z) + 1} \sum_{u=-DF(DS\_LEV(k,f_{select},z))}^{+DF[DS\_LEV(k,f_{select},z)]} E_{DS\_LEV(k,f_{select},z)}(k, f_{select}(k, z) + u, z) \quad (72)$$

The distance estimator 37z receives the output sum_E(k, $f_{select}$, (k, z), z) that is output from the Doppler components adder 34z for each discrete time k. The distance estimator 37z estimates, for each $f_{select}$(k, z), a distance to a target on the basis of the output sum_E(k, $f_{select}$(k, z), z) that is received for each discrete time k.

With the above features, the radar device 1z can estimate a distance to a target so as to use reception signals that extend in a Doppler spread range in the case where the Doppler spread that is detected by the peak Doppler frequency detector is large. As a result, in the radar device 1z, the accuracy of estimation of a distance to a target can be increased even in the case where the Doppler spread that is detected by the peak Doppler frequency detector is large.

Although the various embodiments have been described above with reference to the drawings, it goes without saying that the radar device according to the invention is not limited to those examples. It is apparent to those skilled in the art that various changes and modifications can be conceived without departing from the scope of the claims, and the technical scope of the invention should naturally encompass them.

The present application is based on the Japanese Patent Application No. 2010-091425 filed on Apr. 15, 2011, the disclosure of which is incorporated herein by reference.

INDUSTRIAL APPLICABILITY

The present invention is useful in realizing radar device in which the coherent integration gain or the non-coherent gain is increased and the accuracy of estimation of an incoming direction of reflection waves or a distance is thereby increased by a simple configuration irrespective of the spread of a Doppler spectrum included in reflection waves coming from a target(s).

DESCRIPTION OF REFERENCE NUMERALS AND SIGNS 1, 1r, 1s, 1u, 1v, 1w, 1x, 1y, 1z: Radar device
2: Radar transmitter
3, 3r, 3s, 3u, 3v, 3w, 3x, 3y, 3z: Radar receiver
4: Transmission signal generator
5: RF transmitter
6: Code generator
7: Modulator
8: LPF
9, 15: Frequency converter
10, 14: Amplifier
11-1, 11-2, 11-3, 11-4, 11u-1, 11u-2, 11u-3, 11u-4: Antenna system processor
12: RF receiver
13, 13s, 13u: Signal processor
16: Quadrature detector
17, 18: A/D converter
19: Correlation value calculator
20: Coherent integrator
21, 21u: FFT processor
22: Coefficients generator
23: Coefficients multiplier
24, 24u: buffer
24s: First buffer
25: First correlation matrix generator
26: Second correlation matrix generator
27, 27r, 27s, 27x: adder
28, 28r, 28v, 28x, 28y: Peak Doppler frequency detector
29: Speed estimator
30, 30r, 30v, 30w, 30y, 30z: Output selector
31, 31v, 31w: Incoming direction estimator
32: Second buffer
33: Third correlation matrix generator
34, 34z: Doppler components adder
35: First non-coherent integrator
36: Second non-coherent integrator
37, 37y, 37z: Distance estimator

The invention claimed is:

1. A radar device comprising:
a radar transmitter that converts a transmission signal into a high-frequency transmission signal and transmits the high-frequency transmission signal from a transmission antenna; and
a radar receiver that estimates an incoming direction of reflection waves which are produced as a result of reflection, by a target, of the high-frequency transmission signal on the basis of the reflection waves using plural reception antennas,
wherein the radar receiver includes:
plural antenna system processors, each of which performs coherent integration on the basis of correlation values between a reception signal and the transmission signal using correction amounts for phase variations corresponding to plural different Doppler frequencies;
plural correlation matrix generators that generate, for each of the plural different Doppler frequencies, correlation matrices which are pieces of phase difference information relating to an arrangement of the plural reception antennas on the basis of sets of outputs of the coherent integration, respectively;
an adder that adds together outputs of the plural correlation matrix generators; and
an incoming direction estimator that estimates the incoming direction of the reflection waves coming from the target on the basis of outputs of the adder.

2. The radar device according to claim 1,
wherein each of the plural antenna system processors performs coherent integration of a first integration number and coherent integration of a second integration number on the basis of the correlation values between the reception signal and the transmission signal using the correction amounts for phase variations corresponding to the plural different Doppler frequencies;
wherein the plural correlation matrix generators generate, for each of the plural different Doppler frequencies, the correlation matrices on the basis of an output of the coherent integration of the first integration number and an output of the coherent integration of the second integration number, respectively; and
wherein the adder adds together, for each of the plural different Doppler frequencies, outputs of the plural correlation matrix generators.

3. A radar device comprising:
a radar transmitter that converts a transmission signal into a high-frequency transmission signal and transmits the high-frequency transmission signal from a transmission antenna; and
a radar receiver that estimates an incoming direction of reflection waves which are produced as a result of reflection, by a target, of the high-frequency transmission signal on the basis of the reflection waves using plural reception antennas,
wherein the radar receiver includes:
plural antenna system processors, each of which performs coherent integration on the basis of correlation values between a reception signal and the transmission signal using correction amounts for phase variations corresponding to plural different Doppler frequencies;
plural correlation matrix generators that generate, for each of the plural different Doppler frequencies, correlation matrices which are pieces of phase difference information relating to an arrangement of the plural reception antennas on the basis of plural outputs of the coherent integration;
a peak Doppler frequency detector that detects a Doppler spread in a prescribed frequency range including a Doppler frequency which maximizes a coherent integration gain on the basis of an output of one of the plural correlation matrix generators;
an output selector that selects a correlation matrix corresponding to the Doppler frequency which maximizes the coherent integration gain among the generated correlation matrices according to the Doppler spread; and
an incoming direction estimator that estimates the incoming direction of the reflection waves coming from the target on the basis of an output of the output selector.

4. The radar device according to claim 1, further comprising:
a peak Doppler frequency detector that selects a Doppler frequency which maximizes a coherent integration gain on the basis of an output of one of the plural correlation matrix generators; and
an output selector that selects a correlation matrix corresponding to the Doppler frequency detected by the peak Doppler frequency detector from the outputs of the adder.

5. The radar device according to claim 1, further comprising:
a peak Doppler frequency detector that selects a Doppler frequency which maximizes a coherent integration gain on the basis of an output of one of the plural correlation matrix generators,
wherein the adder adds together correlation matrices corresponding to the Doppler frequency detected by the peak Doppler frequency detector among sets of outputs of the plural correlation matrix generators.

6. The radar device according to claim 1, wherein each of the plural antenna system processors includes:
a reception antenna that receives the reflection waves coming from the target;
an RF receiver that converts a signal of the received reflection waves into a baseband reception signal;
an A/D converter that converts the converted reception signal into digital data;
a correlation value calculator that calculates a correlation value between the digital data of the converted reception signal and the transmission signal every transmission cycle of the high-frequency transmission signal;
a coherent integrator that performs coherent integration on the basis of a first prescribed number of calculated correlation values; and
an FFT processor that performs coherent integration on the basis of a second prescribed number of outputs of the coherent integration using correction amounts for phase variations corresponding to the plural different Doppler frequencies.

7. The radar device according to claim 6, wherein each of the plural antenna system processors further includes:
a coefficients generator that generates, for each of the plural different Doppler frequencies, coefficients for coherent integration of a third prescribed number of outputs of the FFT processor;
a coefficients multiplier that multiplies the outputs of the FFT processor by the coefficients generated for each of the plural different Doppler frequencies; and
a buffer that performs coherent integration on the basis of a third prescribed number of outputs of the coefficients multiplier.

8. The radar device according to claim 3, further comprising:
a Doppler components adder that adds together correlation matrices in a prescribed frequency range including the Doppler frequency which maximizes the coherent integration rain on the basis of outputs of the output selector.

9. The radar device according to claim 3, wherein the peak Doppler frequency detector selects a Doppler frequency on the basis of diagonal elements of correlation matrices generated for the plural respective Doppler frequencies by one of the plural correlation matrix generator.

10. The radar device according to claim 3, further comprising:
a speed estimator that calculates a relative movement speed of the target on the basis of the Doppler frequency detected by the peak Doppler frequency detector.

11. The radar device according to claim 7, wherein each of the plural antenna system processors further includes a second buffer which performs coherent integration on the basis of a fourth prescribed number of outputs of the FFT processor; and
wherein the radar receiver further includes a third correlation matrix generator that generates, for each of the plural different Doppler frequencies, a correlation matrix which is phase difference information relating to an arrangement of the plural reception antennas on the basis of outputs of the coherent integration of the second buffers.

12. A radar device comprising:
a radar transmitter that converts a transmission signal into a high-frequency transmission signal and transmits the high-frequency transmission signal from a transmission antenna; and
a radar receiver that estimates a distance to a target on the basis of reflection waves which are produced as a result of reflection, by the target, of the high-frequency transmission signal,
wherein the radar receiver includes:
an antenna system processor that performs coherent integration on the basis of correlation values between a reception signal and the transmission signal using correction amounts for phase variations corresponding to plural different Doppler frequencies;
plural non-coherent integrators that perform non-coherent integration for each of the plural different Doppler frequencies on the basis of sets of outputs of the coherent integration, respectively;

an adder that adds together outputs of the plural non-coherent integrators; and a distance estimator that estimates the distance to the target on the basis of outputs of the adder.

13. The radar device according to claim 12, wherein the antenna system processor performs coherent integration of a first integration number and coherent integration of a second integration number on the basis of the correlation values between the reception signal and the transmission signal using the correction amounts for phase variations corresponding to plural different Doppler frequencies;

wherein plural non-coherent integrators perform non-coherent integration for each of the plural different Doppler frequencies on the basis of outputs of the coherent integration of the first integration number and outputs of the coherent integration of the second integration number, respectively; and wherein the adder adds together, for each of the plural different Doppler frequencies, outputs of the plural non-coherent integrators.

14. A radar device comprising:

a radar transmitter that converts a transmission signal into a high-frequency transmission signal and transmits the high-frequency transmission signal from a transmission antenna; and a radar receiver that estimates a distance to a target on the basis of reflection waves which are produced as a result of reflection, by the target, of the high-frequency transmission signal, wherein the radar receiver includes:

an antenna system processor that performs coherent integration on the basis of correlation values between a reception signal and the transmission signal using correction amounts for phase variations corresponding to plural different Doppler frequencies;

plural non-coherent integrators that perform non-coherent integration for each of the plural different Doppler frequencies on the basis of sets of outputs of the coherent integration, respectively;

a peak Doppler frequency/Doppler spread detector that detects a Doppler spread in a prescribed frequency range including a Doppler frequency which maximizes a coherent integration gain on the basis of an output of one of the plural non-coherent integrators;

an output selector that selects a non-coherent integration output corresponding to the Doppler frequency which maximizes the coherent integration gain among generated non-coherent integration outputs according to the Doppler spread; and a distance estimator that estimates a distance to the target on the basis of an output of the output selector.

* * * * *